(12) United States Patent
Marsh et al.

(10) Patent No.: US 11,121,389 B2
(45) Date of Patent: Sep. 14, 2021

(54) METHOD AND CONTROLLER FOR OPERATING POWER CELLS USING MULTIPLE LAYERS OF CONTROL

(71) Applicant: Encite LLC, Burlington, MA (US)

(72) Inventors: Stephen A. Marsh, Carlisle, MA (US); Lawrence W. Hill, North Eastham, MA (US)

(73) Assignee: ENCITE LLC, Burlington, MA (US)

( * ) Notice: Subject to any disclaimer, the term of this patent is extended or adjusted under 35 U.S.C. 154(b) by 54 days.

(21) Appl. No.: 16/267,236

(22) Filed: Feb. 4, 2019

(65) Prior Publication Data

US 2019/0273276 A1    Sep. 5, 2019

Related U.S. Application Data

(60) Continuation of application No. 15/782,633, filed on Oct. 12, 2017, now Pat. No. 10,199,671, which is a
(Continued)

(51) Int. Cl.
*H01M 8/00* (2016.01)
*H01M 8/0662* (2016.01)
(Continued)

(52) U.S. Cl.
CPC .......... *H01M 8/0662* (2013.01); *B82Y 30/00* (2013.01); *H01M 8/0289* (2013.01); *H01M 8/0432* (2013.01); *H01M 8/0438* (2013.01); *H01M 8/0488* (2013.01); *H01M 8/0491* (2013.01); *H01M 8/0494* (2013.01); *H01M 8/04302* (2016.02); *H01M 8/04365* (2013.01);
(Continued)

(58) Field of Classification Search
CPC ............. H01M 8/1097; H01M 8/2415; H01M 8/0491; H01M 8/0432; H01M 8/04302; H01M 8/241
See application file for complete search history.

(56) References Cited

U.S. PATENT DOCUMENTS 4,248,941 A    2/1981    Louis et al.
4,460,444 A    7/1984    Maskalick
(Continued)

FOREIGN PATENT DOCUMENTS

AT    393 045 B    7/1991
DE    199 14 681 A1    10/2000
(Continued)

OTHER PUBLICATIONS

About.com, "Fuel Cells—Part 1: Types and How They Operate" (Apr. 4, 1999), <http://energyindustry.about.com/industry/energyindustry/library/weekly/aa040499.htm>.
(Continued)

*Primary Examiner* — Cynthia H Kelly
*Assistant Examiner* — Monique M Wills
(74) *Attorney, Agent, or Firm* — Hamilton, Brook, Smith & Reynolds, P.C.

(57) ABSTRACT

A method of cleaning power cells in an array of power cells, comprising coupling at least one first power cell to second power cells in an array of power cells and causing the second power cells to drive the at least one first power cell with a voltage to clean catalyst on the at least one first power cell.

11 Claims, 38 Drawing Sheets

Related U.S. Application Data division of application No. 14/609,939, filed on Jan. 30, 2015, now Pat. No. 9,819,037, which is a continuation of application No. 11/713,460, filed on Mar. 2, 2007, now Pat. No. 8,980,492.

(60) Provisional application No. 60/778,584, filed on Mar. 2, 2006, provisional application No. 60/778,563, filed on Mar. 2, 2006.

(51) Int. Cl.

| | |
|---|---|
| *H01M 8/0289* | (2016.01) |
| *H01M 8/0432* | (2016.01) |
| *H01M 8/0438* | (2016.01) |
| *H01M 8/04858* | (2016.01) |
| *H01M 8/04828* | (2016.01) |
| *H01M 8/04537* | (2016.01) |
| *H01M 8/04746* | (2016.01) |
| *H01M 8/1004* | (2016.01) |
| *H01M 8/1097* | (2016.01) |
| *H01M 8/241* | (2016.01) |
| *B82Y 30/00* | (2011.01) |
| *H01M 8/04302* | (2016.01) |
| *H01M 8/1286* | (2016.01) |
| *H01M 8/249* | (2016.01) |
| *H01M 8/1018* | (2016.01) |
| *H01M 8/24* | (2016.01) |

(52) U.S. Cl.
CPC ... *H01M 8/04552* (2013.01); *H01M 8/04582* (2013.01); *H01M 8/04619* (2013.01); *H01M 8/04753* (2013.01); *H01M 8/1004* (2013.01); *H01M 8/1097* (2013.01); *H01M 8/241* (2013.01); *H01M 8/1286* (2013.01); *H01M 8/2405* (2013.01); *H01M 8/249* (2013.01); *H01M 8/2415* (2013.01); *H01M 2008/1095* (2013.01); *H01M 2300/0082* (2013.01); *Y02E 60/50* (2013.01)

(56) References Cited

U.S. PATENT DOCUMENTS

| | | | |
|---|---|---|---|
| 5,023,150 A | 6/1991 | Takabayashi | |
| 5,141,824 A | 8/1992 | Hirota | |
| 5,364,711 A | 11/1994 | Yamada et al. | |
| 5,401,589 A | 3/1995 | Palmer et al. | |
| 5,559,638 A | 9/1996 | Aoki et al. | |
| 5,677,073 A | 10/1997 | Kawatsu | |
| 5,811,062 A | 9/1998 | Wegeng et al. | |
| 5,919,583 A | 7/1999 | Grot et al. | |
| 5,945,231 A | 8/1999 | Narayanan et al. | |
| 6,093,500 A | 7/2000 | Margiott et al. | |
| 6,248,461 B1 | 6/2001 | Abe et al. | |
| 6,299,744 B1 | 10/2001 | Narayanan et al. | |
| 6,312,845 B1 | 11/2001 | Scortichini | |
| 6,312,846 B1 | 11/2001 | March | |
| 6,387,556 B1 | 5/2002 | Fuglevand et al. | |
| 6,432,284 B1 | 8/2002 | Narayanan et al. | |
| 6,442,699 B1* | 8/2002 | Nakajima | G06F 1/3228 713/320 |
| 6,465,119 B1 | 10/2002 | Koripella et al. | |
| 6,472,090 B1 | 10/2002 | Colbow et al. | |
| 6,692,851 B2 | 2/2004 | Keskula et al. | |
| 6,699,866 B2 | 3/2004 | Cuny et al. | |
| 6,815,110 B2 | 11/2004 | Marsh | |
| 6,841,290 B2 | 1/2005 | Klitsner et al. | |
| 6,936,360 B2 | 8/2005 | Margiott et al. | |
| 6,991,866 B2 | 1/2006 | Marsh | |
| 7,029,779 B2 | 4/2006 | Marsh | |
| 7,547,485 B2 | 6/2009 | Otsuka | |
| 7,655,056 B2 | 2/2010 | Devos | |
| 8,431,281 B2 | 4/2013 | Marsh | |
| 8,518,594 B2 | 8/2013 | Marsh | |
| 8,834,700 B2 | 9/2014 | Marsh | |
| 8,962,166 B2 | 2/2015 | Marsh | |
| 8,980,492 B2 | 3/2015 | Marsh et al. | |
| 9,406,955 B2 | 8/2016 | Marsh | |
| 9,819,037 B2 | 11/2017 | Marsh et al. | |
| 10,199,671 B2 | 2/2019 | Marsh et al. | |
| 2002/0009623 A1 | 1/2002 | St. Pierre et al. | |
| 2002/0045082 A1 | 4/2002 | Marsh | |
| 2002/0122972 A1 | 9/2002 | Klitsner et al. | |
| 2003/0022033 A1 | 1/2003 | Stimming et al. | |
| 2003/0039874 A1 | 2/2003 | Jankowski et al. | |
| 2003/0082431 A1 | 5/2003 | Klitsner et al. | |
| 2003/0138685 A1 | 7/2003 | Jankowski et al. | |
| 2003/0203248 A1 | 10/2003 | Bruck et al. | |
| 2004/0033398 A1 | 2/2004 | Kearl et al. | |
| 2004/0048128 A1 | 3/2004 | Jankowski et al. | |
| 2004/0053100 A1 | 3/2004 | Stanley et al. | |
| 2004/0146764 A1 | 7/2004 | Tsai et al. | |
| 2005/0060876 A1 | 3/2005 | Marsh | |
| 2005/0130021 A1 | 6/2005 | Marsh | |
| 2005/0136293 A1 | 6/2005 | Baker | |
| 2005/0142406 A1 | 6/2005 | Obata et al. | |
| 2005/0255339 A1 | 11/2005 | Tsai et al. | |
| 2006/0110636 A1 | 5/2006 | Marsh | |
| 2007/0042241 A1 | 2/2007 | Matsuo et al. | |
| 2007/0116994 A1 | 5/2007 | Marsh | |
| 2007/0154743 A1 | 7/2007 | Zhang et al. | |
| 2007/0248848 A1 | 10/2007 | Marsh | |
| 2007/0251829 A1 | 11/2007 | Marsh | |
| 2007/0287043 A1 | 12/2007 | Marsh et al. | |
| 2008/0044697 A1 | 2/2008 | Hirashige et al. | |
| 2008/0292920 A1 | 11/2008 | Marsh | |
| 2009/0286114 A1 | 11/2009 | Visco et al. | |
| 2010/0092817 A1 | 4/2010 | Lienkamp et al. | |
| 2014/0030621 A1 | 1/2014 | Marsh | |
| 2014/0038074 A1 | 2/2014 | Marsh | |
| 2014/0072834 A1 | 3/2014 | Marsh | |
| 2015/0140458 A1 | 5/2015 | Marsh et al. | |
| 2018/0131024 A1 | 5/2018 | Marsh et al. | |

FOREIGN PATENT DOCUMENTS

| | | |
|---|---|---|
| EP | 0788172 A1 | 8/1997 |
| JP | 60-020468 A | 2/1985 |
| JP | 06-319287 A | 11/1994 |
| JP | 07-0201348 A | 8/1995 |
| JP | H0831442 A | 2/1996 |
| JP | H10144334 A | 5/1998 |
| JP | 2010-216461 A | 8/1998 |
| JP | 2001-086691 A | 7/2001 |
| JP | 2002-514345 A | 5/2002 |
| JP | 2002-352832 | 12/2002 |
| JP | 2002-544649 A | 12/2002 |
| JP | 2003-187822 A | 7/2003 |
| JP | 2004-079537 A | 3/2004 |
| JP | 2004-120831 A | 4/2004 |
| JP | 2004-513486 A | 4/2004 |
| JP | 2004-342440 | 12/2004 |
| JP | 2004-342551 | 12/2004 |
| JP | 2004-364387 A | 12/2004 |
| JP | 2005-085509 A | 3/2005 |
| JP | 2005-522821 A | 7/2005 |
| JP | 2005-243479 | 8/2005 |
| JP | 2005-527943 A | 9/2005 |
| JP | 2005-293901 A | 10/2005 |
| JP | 2006-351343 A | 12/2006 |
| WO | 1998/42038 | 9/1998 |
| WO | 99/19929 | 4/1999 |
| WO | 00/45457 | 8/2000 |
| WO | 00/69007 | 11/2000 |
| WO | 00/74162 A1 | 12/2000 |
| WO | 01/54217 A3 | 7/2001 |
| WO | 2002/37591 A1 | 5/2002 |
| WO | 2003/067696 A2 | 8/2003 |
| WO | 03/075113 A | 9/2003 |
| WO | 03/083975 A | 9/2003 |

(56) References Cited

FOREIGN PATENT DOCUMENTS

| WO | 03/083975 A2 | 10/2003 |
|---|---|---|
| WO | 2004/054028 A1 | 6/2004 |
| WO | 2007-103104 | 9/2007 |

OTHER PUBLICATIONS

About.com, "Fuel Cells—Part 2: Uses" (Apr. 25, 1999), <http://energyindustry.about.com/industry/energyindustry/library/weekly/aa042599.htm>.

Choi, Woojin, et al., "An Advanced Power Converter Topology to Significantly Improve the CO Tolerance of the PEM Fuel Cell Power Systems," IEEE vol. 2, 1185-1191; Oct. 3, 2004.

Extended European Search Report, Application No. 11 185 602.7, dated Dec. 19, 2012.

Extended European Search Report, EP Application No. 11177895.7, entitle "Power Cell Architecture And Control Of Power Generator Arrays", dated Jun. 13, 2013.

Fuel Cells 2000, "The Online Fuel Center Information Center", (visited Oct. 22, 1999) <http://www.fuelcells.org>.

International Search Report and Written Opinion, Int'l App No. PCT/US2007/005255, entitled "Method and Apparatus for Controlling Arrays of Micro-Power Generators,", dated Jan. 29, 2008.

International Preliminary Report on Patentability, International Application No. PCT/US2007/005255, dated Sep. 2, 2008.

National Resources Defense Council, "Reports: Choosing Clean Power, Bringing the Promise of Fuel Cells to New York", (visited Oct. 22, 1999) <http://www.nrdc.org/nrdcpro/ccp/ccpinx.html>.

Notice of Allowance and Fees Due, U.S. Appl. No. 12/220,787, filed Jul. 28, 2008, dated Dec. 21, 2012.

Notice of Allowance for U.S. Appl. No. 14/052,695, "Method And Apparatus For Electro-Chemical Reaction", dated Feb. 19, 2014.

Office Action for U.S. Appl. No. 13/849,929, "Methods Of Operating Fuel Cells", dated Nov. 15, 2013.

Office Action for U.S. Appl. No. 13/932,593, "Power Cell And Power Chip Architecture", dated Dec. 17, 2013.

Office Action for U.S. Appl. No. 14/052,695, "Method And Apparatus For Electro-Chemical Reaction", dated Nov. 18, 2013.

Office Action, U.S. Appl. No. 12/220,787, filed Jul. 28, 2008, dated Jul. 2, 2012.

Office Action, U.S. Appl. No. 12/220,787, dated Mar. 17, 2009.

Office Action, U.S. Appl. No. 12/220,787, dated Oct. 6, 2009.

Sasaki, Satoshi and Karube, Isao, "The development of microfabricated biocatalytic fuel cells," Trends in Biotechnology 17(2):50-52 (1999).

Supplementary European Search Report, EP Application No. 11 177 893.2, entitled "Power Cell Architecture And Control Of Power Generator Arrays", dated May 7, 2013.

Supplementary European Search Report, EP Application No. 11 177 900.5, entitled "Power Cell Architecture And Control Of Power Generator Arrays", dated May 28, 2013.

The Way Things Work: An Illustrated Encyclopedia of Technology, vol. 1, "Fuel Cell", p. 52-53, Simon and Schuster, New York, 1967.

International Preliminary Report on Patentability, International Application No. PCT/US2000/031825, entitled "Fuel Cell and Power Chip Technology,", dated Mar. 28, 2002.

International Search Report and Written Opinion, Int'l App No. PCT/US2000/031825, entitled "Fuel Cell and Power Chip Technology,", dated Dec. 10, 2001.

\* cited by examiner

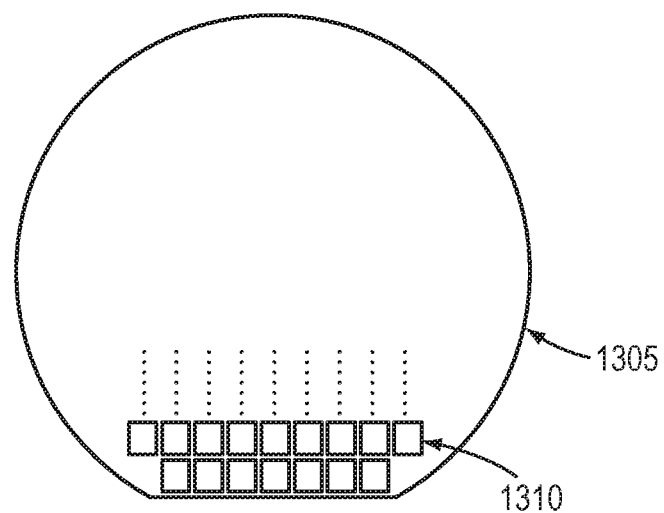
FIG. 13
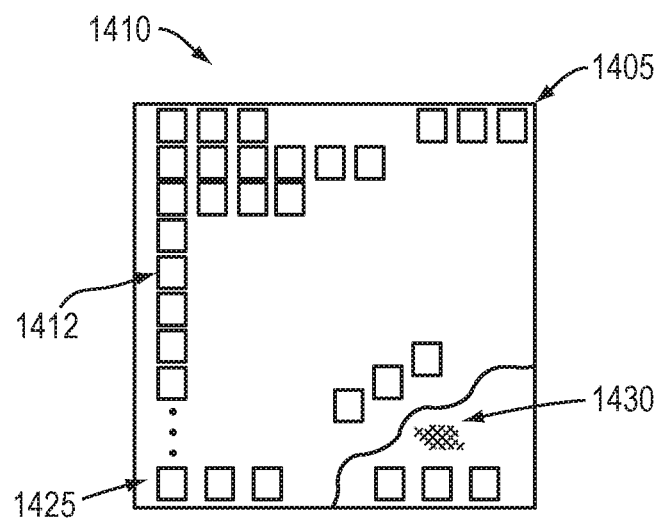
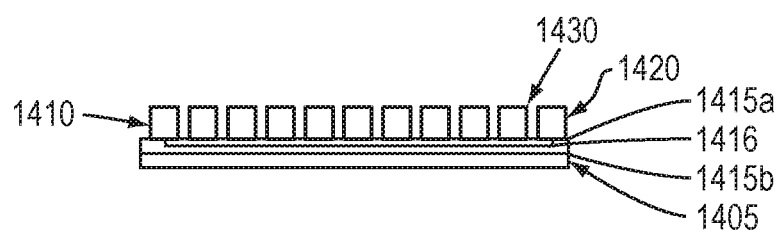
FIG. 14

SINGLE CELL  ▫  .00027 WATTS  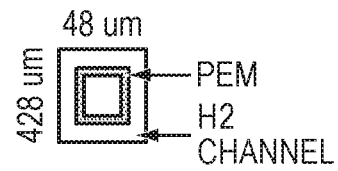
• TIMES 4,868  ▫  1.32 WATTS  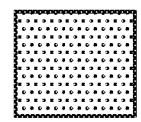  1 cm²
• ADD HEIGHT  ▫  1.32 WATTS    1 cm x 1cm x 1mr
• TIMES 8 UNITS PER cm  10.56 WATTS  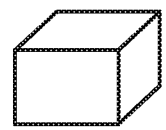  1 cm x 1cm x 1cm
• TIMES 1000  ▫  10,560 WATTS  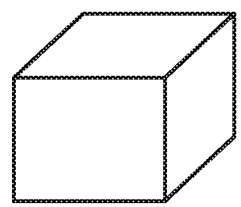  1 LITER
FIG. 21

|  |  | GRAMS PER cm² |
|---|---|---|
| • CASE LID | 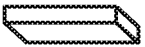 | .033 |
| • POLYMER LID | 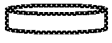 | .018 |
| • PEM | 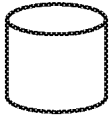 | .005 |
| • SUBSTRATE |  | .111 |
- FOR ONE cm² OF MATERIAL    1.32 WATTS        .167 GRAMS
- TIMES 6 cm² PER GRAM    7.91 WATTS    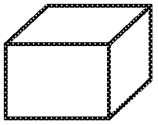    1 GRAM
- TIMES 1000                         7,910 WATTS    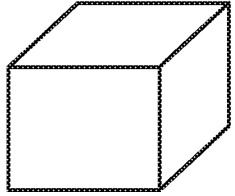    1 KILOGRAM
FIG. 22

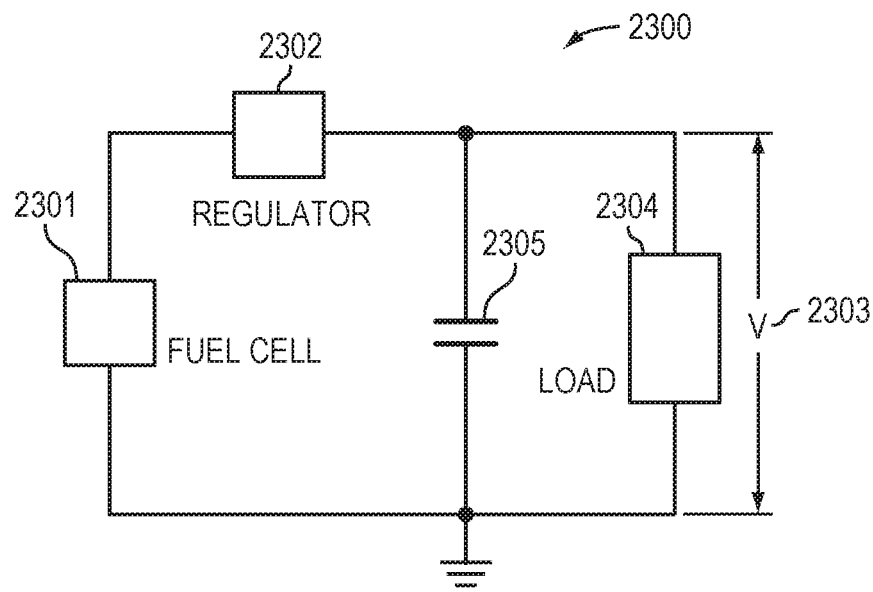
FIG. 23 PRIOR ART
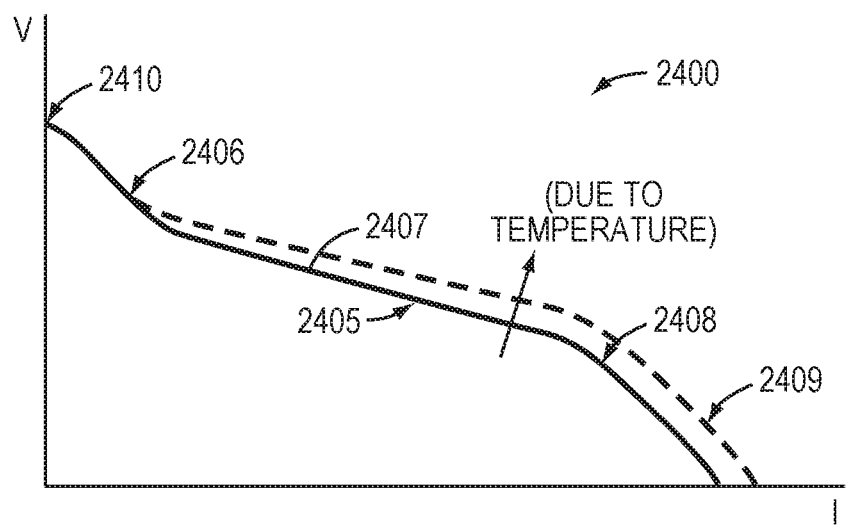
FIG. 24 V - I CURVE

METHOD AND CONTROLLER FOR OPERATING POWER CELLS USING MULTIPLE LAYERS OF CONTROL

RELATED APPLICATIONS

This application is a Continuation of U.S. application Ser. No. 15/782,633 filed Oct. 12, 2017, which is a Divisional of U.S. application Ser. No. 14/609,939 filed Jan. 30, 2015, now U.S. Pat. No. 9,819,037 issued Nov. 14, 2017, which is a Continuation of U.S. application Ser. No. 11/713,460 filed Mar. 2, 2007, now U.S. Pat. No. 8,980,492 issued Mar. 17, 2015, which claims the benefit of U.S. Provisional Application No. 60/778,584, filed Mar. 2, 2006 and U.S. Provisional Application No. 60/778,563, filed Mar. 2, 2006. The entire teachings of the above applications are incorporated herein by reference.

BACKGROUND OF THE INVENTION

Electro-chemical fuel cells are not new. Invented in 1839 by William Robert Grove, electro-chemical fuel cells have recently been the subject of extensive development. As environmental concerns mount and energy legislation toughens, development of "green" energy sources becomes more justified as a course of action, if not required.

Within the last decade, development has addressed various types of fuel cells designed to address various applications and corresponding power levels, ranging from large stationary power plants (kilowatts to megawatts), to transportation (bus, automobile, scooter), and to smaller electronic devices (laptops, cell phones, PDAs).

In U.S. Pat. Nos. 6,312,846 and 6,815,110, Marsh describes an approach to Proton Exchange Membrane (PEM) fuel cells fabricated on a semiconductor substrate. Using conventional semiconductor fabrication methods, such fuel cells can be made extremely small, in very great quantity, and at very low cost on a single substrate.

SUMMARY OF THE INVENTION

An embodiment of the present invention includes a method or corresponding apparatus of operating power cells by dynamically controlling generation of power by at least a subset of power cells among a plurality of power cells in a presence of fuel and oxidant through electrical control of at least one electrical element coupled to at least a subset of the plurality of power cells.

The at least one electrical element may be a plurality of switches coupled to the power cells in an arrangement configured to connect the power cells in series or parallel. Dynamically controlling the generation of power includes opening and closing the switches to control aggregate output voltage, current, or both by the plurality of power cells. Controlling the generation of power may be performed in an open- or closed-loop manner to an arbitrary operating state within a range of operating states physically possible by the plurality of power cells. Sensors may feed back a representation of the power to control the at least one electrical element to regulate the power output by the plurality of power cells. By sensing a power draw of a load and feeding back a representation of the power draw, a controller may control the generation of power dynamically to an amount sufficient to support the power draw but with reduced excess power compared to generating the power in an absence of feeding back the representation of the power draw. Further, the controller may dynamically produce power with a voltage or current waveform as a function of an input voltage or current waveform, proportional or inversely proportional to the input voltage or current waveform, as a linear function of the input voltage or current waveform, or as a non-linear function of the input voltage or current waveform. Internal or external electronics element(s) may present a representation of a waveform, and the controller may control an array as a function of the representation. The voltage or current waveform may be adjusted to compensate for effects of a load.

In another embodiment, a method of operating a plurality of power cells includes configuring a first bank of power cells in series combination to produce an output voltage and current to provide power to a load and dynamically configuring at least one second bank of power cells, configured to produce substantially the same output voltage as the first bank, in parallel with the first bank to provide power as a function of a combination of the voltage and current produced by the first bank and the at least one second bank.

Each bank may include multiple power cells in parallel, optionally statically or dynamically configured.

In yet another embodiment, a controller controls an array of power cells to generated output power by dynamically configuring a number of power cells in an array of power cells in series or parallel combination; coarsely tune the output power by dynamically configuring the series combination of the power cells and finely tune the output power by dynamically configuring the parallel combination of the power cells.

Coarsely or finely tuning the output power may include feeding back at least one operating parameter of the power cells and dynamically configuring the series or parallel combination of power cells, respectively, as a function of the at least one operating parameter. In one embodiment, the at least one operating parameter includes at least one of the following operating parameters: output voltage, output current, pressure at the power cells, temperature at the power cells, or humidity at the power cells. Generating the output power may include selecting a group of power cells to generate the output power from among multiple groups in the array of power cells. Further, selecting the group of power cells to generate the output power may include selecting a different group of power cells to generate the output power on a periodic time, random time, pseudo-random time, on-demand, or event driven basis.

In still a further embodiment of the present invention, an array of power cells may generate power by delivering power to a load at a selectable efficiency by combining surface area of power cells in selectable series or parallel combinations. Combining the surface area of power cells may include combining the surface area on a bank of power cells by bank of power cells basis or by combining the surface area on a power cell by power cell basis.

Another embodiment is a method or corresponding apparatus to operate an array of power cells. A controller or other device may generating power at a selectable efficiency for a given current density by at least one subset of power cells in the array of power cells. The example embodiment may optimize the efficiency for efficient consumption of fuel or optimize the efficiency for efficient production of heat.

In still a further embodiment, an array of power cells may be controlled by identifying faulty power cells in an array of power cells, removing the faulty power cells from service, and operating non-faulty power cells in the array of power cells to produce power.

Another method or corresponding apparatus for operating power cells includes dynamically configuring multiple power cells in an array of power cells in series and parallel combination and changing the series and parallel combination of the power cells in real time to operate the power cells in a mode selected from a group consisting of: voltage source, current source, AC power source, and audio power amplifier.

In an embodiment that can self-clean power cells in an array of power cells, an example method or corresponding apparatus includes coupling at least one first power cell to second power cells in an array of power cells and causing the second power cells to drive the at least one first power cell with a voltage to clean catalyst on the at least one first power cell.

In this example embodiment, the array may simultaneously drive a load with at least one third power cell. In another embodiment, after cleaning the catalyst, a controller may decouple the at least one first power cell from the second power cells and couple the at least one first power cell to a load. The example embodiment may also diagnose a state of contamination of the catalyst on the at least one power cell.

An embodiment of a controller used to control an array of power cells may constantly operate power cells under control of a kernel layer of processing and employ the kernel layer by a higher layer of processing to cause the power cells to produce power in a selectable manner.

In this embodiment, constantly operating the power cells under control of the kernel layer of processing includes monitoring and controlling quality and quantity of power generated by the power cells. Further, employing the kernel layer by the higher layer may include employing the kernel layer to cause the power cells to produce power according to higher functions unknown to the kernel layer, the higher functions selected from a group consisting of: cold start, sinewave output power, arbitrary waveform power output, voltage regulation, current regulation, efficiency control, and power amplifier mode.

In cold start situations, an embodiment may define a subset of the power cells to be starter cells and apply a load to the starter cells to draw current from the starter cells to generate heat at the starter cells to warm power cells surrounding the starter cells. After warming the power cells surrounding the starter cells, the embodiment may enable the power cells surrounding the starter cells to produce power.

Enabling the power cells surrounding the starter cells may include configuring the power cells surrounding the starter cells in series or parallel combination with the starter cells. The embodiment may also include monitoring temperature at the starter cells or power cells surrounding the starter cells and enabling the power cells surrounding and expanding out from the starter cells to produce power as a function of the temperature. Additionally, enabling the power cells surrounding the starter cells may include directing the power produced by the surrounding power cells to the load drawing current from the starter cells. In some embodiments, enabling the power cells surrounding the starter cells includes directing the power produced by the surrounding power cells to a different load from the load drawing current from the starter cells.

In yet another embodiment, a method or corresponding apparatus for operating an array of power cells may include configuring at least a subset of the array of power cells in series and parallel combination, tracking power usage by a load coupled to the power cells configured in series and parallel combination, and dynamically reconfiguring the power cells in series and parallel combination with more or fewer power cells from the array of power cells to provide sufficient power for the load in a manner minimizing generation of excess power unused by the load.

A controller, in yet another embodiment, may be configured to dynamically configure a subset of the array of power cells in series and parallel combination; and dynamically reconfigure the series or parallel combination of power cells to generate an arbitrary amount of output power. Dynamically reconfiguring the series or parallel combination of power cells may also include dynamically reconfiguring the power cells to produce a time varying voltage or current.

In another embodiment, a method or corresponding apparatus of operating an array of power cells includes coupling at least a subset of the power cells in series and parallel combination and dynamically reconfiguring the power cells in series or parallel combination to include more or fewer power cells generating power to generate voltage or current with an adjusted time-varying waveform to compensate for effects of a load.

For use in certain applications, such as cell phones or other applications that use multiple voltages, an embodiment of the present invention simultaneously generates multiple voltages by an array of power cells sharing a common source of stored energy.

In some embodiments, at least one of the multiple voltages is a time-varying voltage. Generating the multiple voltages may include configuring the power cells to change at least one of the voltages and, optionally, increase current capability for at least one of the multiple voltages. In at least one embodiment, at least one of the multiple voltages is a time varying waveform. In this case, electrical elements used to control electron flow from the power cells may be controlled to direct the time varying waveform to at least one power cell to decontaminate a catalyst of the at least one power cell.

BRIEF DESCRIPTION OF THE DRAWINGS

The foregoing and other objects, features and advantages of the invention will be apparent from the following more particular description of example embodiments of the invention, as illustrated in the accompanying drawings in which like reference characters refer to the same parts throughout the different views. The drawings are not necessarily to scale, emphasis instead being placed upon illustrating the principles of the invention.

FIG. 13 is a schematic plan view of a semiconductor fuel cell array in accordance with an embodiment of the present invention.

FIG. 14 is a schematic view of a fuel cell in accordance with the present invention.

FIG. 21 is an illustration of incremental volumatic increase in power density by stacking the fuel cells in accordance with an embodiment of the present invention.

FIG. 22 is an illustration of incremental gravimetric increase in power density by stacking the fuel cells in accordance with an embodiment of the present invention.

FIG. 23 is a circuit diagram illustrating prior art with respect to generation of regulated power from a battery, fuel cell, or other such device.

FIG. 24 is a plot illustrating a typical voltage-current (V-I) curve for a micro fuel cell, as well as variation with ambient conditions.

DETAILED DESCRIPTION OF THE INVENTION

A description of example embodiments of the invention follows.

Figure 1:
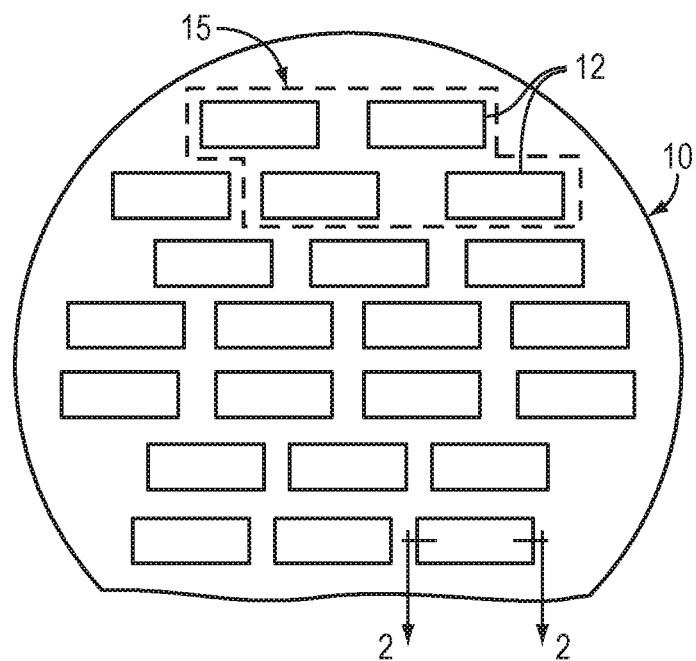
FIG. 1 is a schematic plan view of a semiconductor fuel cell array in accordance with the invention.

Referring now to FIG. 1, there is shown in plan view a conventional semiconductor wafer 10 upon which a plurality of semiconductor fuel cells 12 have been fabricated. A plurality of cells may be electrically interconnected on a wafer and provided with gases to form a power chip 15. For simplicity, fuel cells 12 and chips 15 are not shown to scale in as much as it is contemplated that at least 80 million cells may be formed on a 4" wafer. One such cell is shown in fragmented cross-section in FIG. 2. In its simplest form, each cell 12 consists of a substrate 14, contacts 16A and B, and a conductive polymer base 18 formed on both sides of a first layer 20(a) of non-conductive layered polymer support structure 20 and in intimate contact with the metal electrical contacts.

Figure 2:
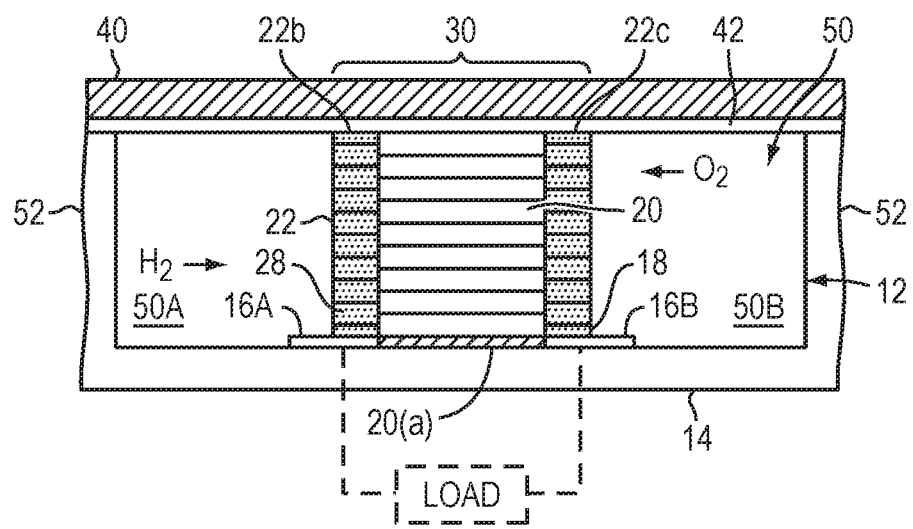
FIG. 2 is a simplified schematic cross-sectional view taken along the lines II-II of a fuel cell 12 of the invention.

A conductive polymer 22 with embedded catalyst particles 28 on both sides of the central structure 20 forms a PEM barrier separating the hydrogen gas on the left side from the oxygen gas on the right side. Etched channels 50B and 50A respectively for admittance of the $O_2$ and $H_2$ gas and a heatsink lid 40 over the cell 12 is also shown in FIG. 2.

Figure 3A:
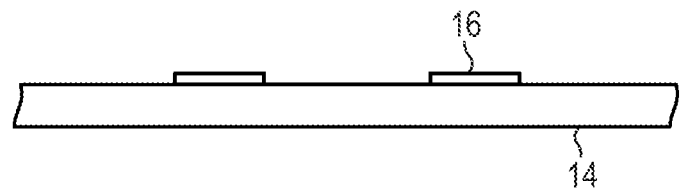
FIGS. 3(a)-(h) is a schematic sectional process view of the major steps in fabricating a PEM barrier structure 30 of the invention.

FIGS. 3a-3h are a series of schematic sectional views showing the relevant fabrication details of the PEM barrier 30 in several steps. FIG. 3a shows the bottom of a fuel cell channel which has been etched into the semiconductor substrate 14. It also shows the metal contacts 16 which are responsible for conveying the electrons out of the fuel cell 12 to the rest of the circuitry. These metal contacts are deposited by well-known photolithographic processes in the metalization phase of the semiconductor fabrication process.

Figure 3B:
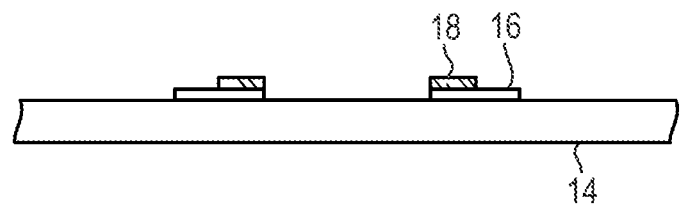

FIG. 3b shows the conductive polymer base 18 as it has been applied to the structure. Base 18 is in physical/electrical contact with the metal contacts 16 and has been adapted to attract the conductive polymer 22 of the step shown in FIG. 3a-3h.

Figure 3C:
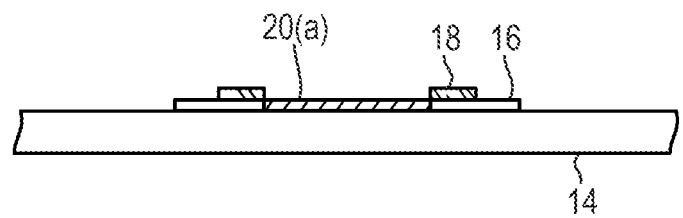

FIG. 3c shows the nonconductive polymer base 20(a) as it has been applied to the structure. It is positioned between the two conductive polymer base sites 18 and is adapted to attract the nonconductive polymer 20.

Figure 3D:
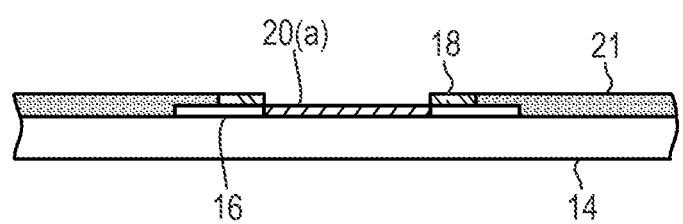

FIG. 3d shows a polymer resist 21 as applied to the structure. Resist 21 is responsible for repelling the polymers and preventing their growth in unwanted areas.

Figure 3E:
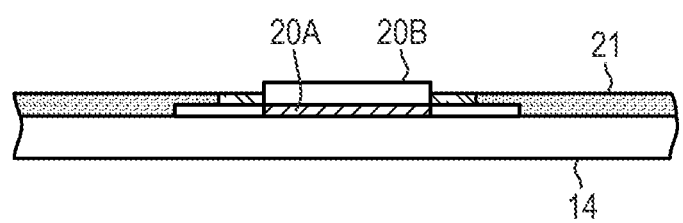

FIG. 3e shows the first layer 20B of nonconductive polymer as it has been grown on its base 20A. This is the center material of the PEM barrier. It helps support the thinner outer sides 22 when they are constructed.

Figure 3F:
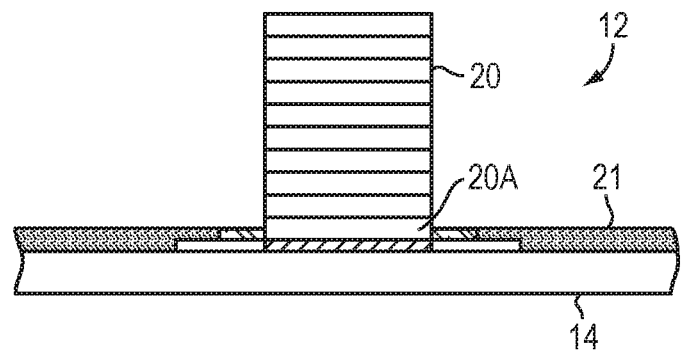

FIG. 3f shows the subsequent layers of nonconductive polymer 20 which are laid down, in a layer by layer fashion to form a vertical barrier. This vertical orientation allows for area amplification.

Figure 3G:
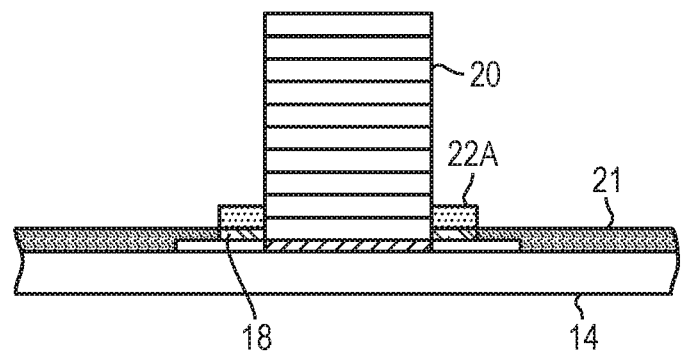

FIG. 3g shows the first layer 22a of conductive polymer grown on its base 18. This is the outside wall material with catalyst of the PEM barrier.

Figure 3H:
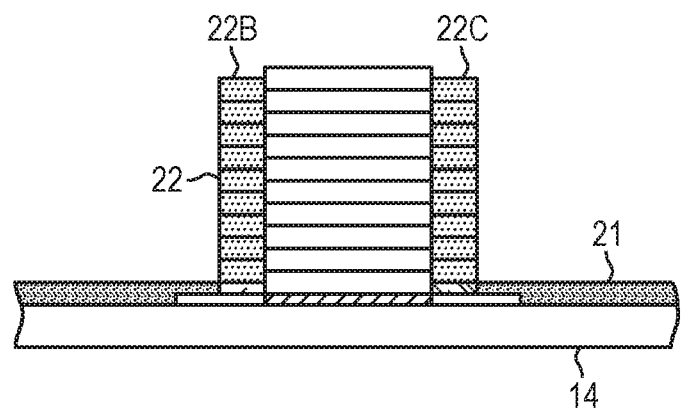

FIG. 3h shows the subsequent layers of conductive polymer 22 laid down, in a layer by layer fashion on to the structure. FIG. 2 shows the completed structure after removal of the polymer resist layer 21 and the addition of lid 40 and the pre-existing sidewalls 52 left out of FIG. 3a-3h for simplicity. This resist removal may not be necessary if layer 21 was originally the passivation layer of the final step in the semiconductor fabrication process.

Referring now to FIG. 2 again further details of the elements forming the fuel cell 12 will be explained. The protein exchange membrane is shown generally at 30 forms a barrier between the fuel $H_2$ and the oxidant $O_2$.

The PEM barrier 30 is made up of three parts of two materials. There is the first outside wall 22B, then the center 20, and finally the second outside wall 22C. It is constructed with a center piece 20 of the first material in contact with the two outside walls which are both made of the second material.

The material 20 forming the center piece is preferably an ionic polymer capable of passing the hydrogen ions (protons) through from the hydrogen side to the oxygen side. It is electrically nonconductive so that it does not, effectively, short out the power cell across the two contacts 16A and 16B. It may be made of Nafion® or of a material of similar characteristics. An external load 5 as shown in dotted lines may be coupled across the contacts to extract power.

The second material 22, forming the two outside walls, is also a similar ionic polymer capable of passing the hydrogen ions. In addition, it is doped with nano catalyst particles 28 (shown by the dots), such as, platinum/alloy catalyst and is also electrically conductive.

By embedding the catalyst particles 28 into the polymer 22, maximum intimate contact is achieved with the PEM 30. This intimate contact provides a readily available path which allows the ions to migrate freely towards the cathode electrode 16B. Catalysis is a surface effect. By suspending the catalytic particles 28 in the polymer 22, effective use of the entire surface area is obtained. This will dramatically increase the system efficiency.

By making the second material 22 electrically conductive, an electrode is produced. The proximity of the electrode to the catalytic reaction affects how well it collects electrons. This method allows the catalytic reaction to occur effectively within the electrode itself. This intimate contact provides a readily available path which allows the electrons to migrate freely towards the anode 16A. This will allow for the successful collection of most of the free electrons. Again, this will dramatically increase the system efficiency.

In addition to the electrical and chemical/functional characteristics of the PEM 30 described above, there are some important physical ones that are described below:

This self assembly process allows for the construction of a more optimum PEM barrier. By design it will be more efficient.

First, there is the matter of forming the separate hydrogen and oxygen path ways. This requires that the PEM structure to be grown/formed so that it dissects the etched channel 50 fully into two separate channels 50A, 50B. This means that it may be patterned to grow in the center of the channel and firmly up against the walls of the ends of the power cell. It may also be grown to the height of the channel to allow it to come into contact with an adhesive 42 on the bottom of lid 40.

Second, there is the matter of forming a gas tight seal. This requires that the PEM structure 30 be bonded thoroughly to the base structures 18 and 20A, the substrate 14 and the end walls (not shown) of the power cell and to an adhesive 42 which coats the lid 40. By proper choice of the polymers, a chemical bond is formed between the materials they contact in the channel. In addition to this chemical bond, there is the physical sealing effect by applying the lid 40 down on top of the PEM barrier. If the height of the PEM 30 is controlled correctly, the pressure of the applied lid forms a mechanical "O ring" type of self seal. Growing the PEM 30 on the substrate 14 eliminates any fine registration issues when combining it with the lid 40. There are no fine details on the lid that require targeting.

Figure 4:
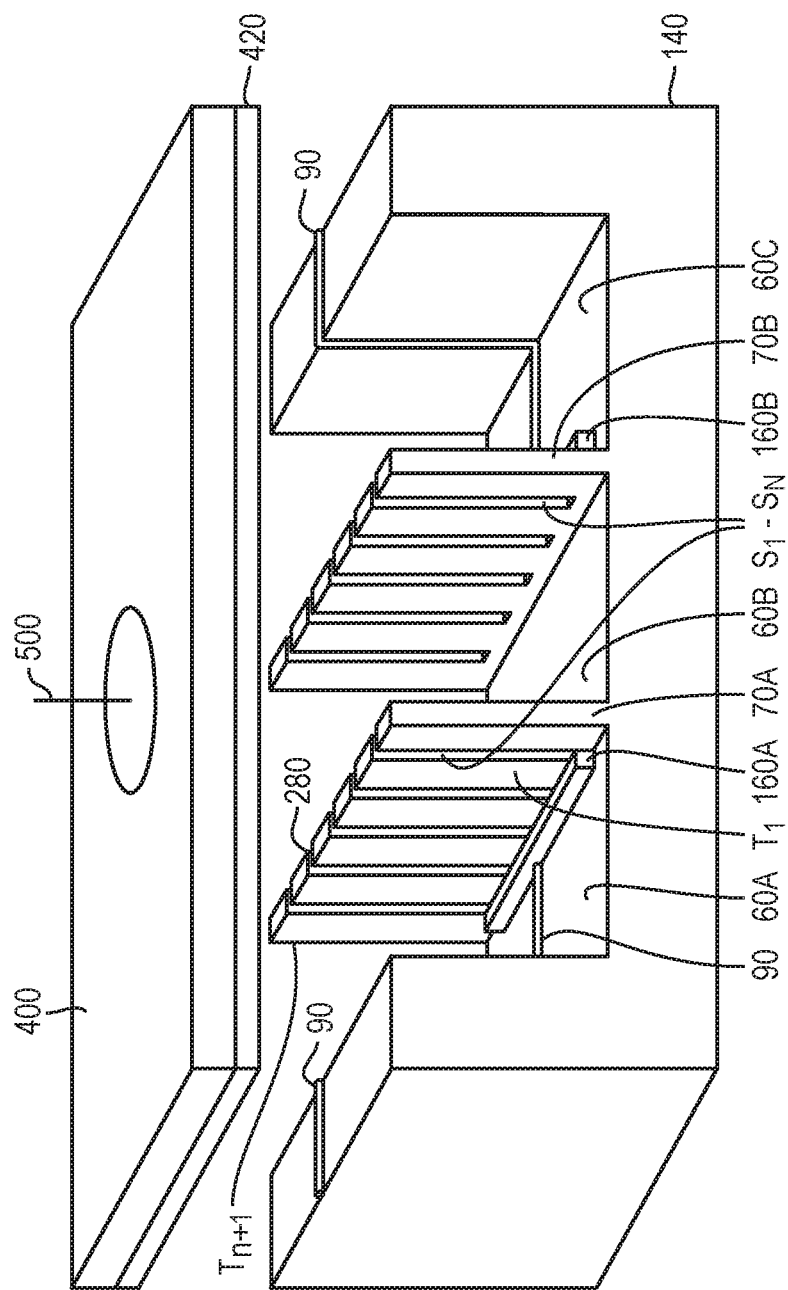
FIG. 4 is a cross-sectional schematic view illustrating an alternate cast PEM barrier invention.

Turning now to FIG. 4, there is shown in simplified perspective an alternate embodiment of a PEM barrier involving a casting/injecting process and structure.

Using MEMS machining methods three channels 60A, 60B and 60C are etched into a semiconductor substrate 140. The outside two channels 60A and 60C are separated from the middle channel 60B by thin walls 70A, 70B. These walls have a plurality of thin slits $S_1$ - - - $S_n$ etched into them. The resultant tines $T_1$ - - - $T_{n+1}$ have a catalyst 280 deposited on them in the area of the slits. At the bottom of these thin walls, 70A, 70B, on the side which makes up a wall of an outside channel 60A, 60C, a metal electrode 160A, 160B is deposited. A catalyst 280 is deposited on the tines after the electrodes 160 are in place. This allows the catalyst to be deposited so as to come into electrical contact and to cover to some degree, the respective electrodes 160 at their base. In addition, metal conductors 90 are deposited to connect to each electrode 160, which then run up and out of the outside channels.

A lid 400 is provided with an adhesive layer 420 which is used to bond the lid to the substrate 140. In this way, three separate channels are formed in the substrate; a hydrogen channel 60A, a reaction channel 60B, and an oxygen channel 60C. In addition, the lid 400 has various strategically placed electrolyte injection ports or holes 500. These holes 500 provide feed pathways that lead to an electrolyte membrane of polymer material (not shown) in the reaction channel 60B only.

The structure of FIG. 4 is assembled as follows:

First, the semiconductor fabrication process is formed including substrate machining and deposition of all electrical circuits.

Next, the lid 400 is machined and prepared with adhesive 420. The lid 400 is bonded to the substrate 140. Then, the electrolyte (not shown) is injected into the structure.

The thin walls 70A, 70B of the reaction channel 60B serve to retain the electrolyte during its casting. The slits $S_1$ - - - $S_N$ allow the hydrogen and oxygen in the respective channels 60A, 60B access to the catalyst 280 and PEM 300. Coating the tines $T_1$ - - - $T_{1+n}$ with a catalyst 280 in the area of the slits provides a point of reaction when the $H_2$ gas enters the slits. When the electrolyte is poured/injected into the reaction channel 60B, it fills it up completely. The surface tension of the liquid electrolyte keeps it from pushing through the slits and into the gas channels, which would otherwise fill up as well. Because there is some amount of pressure behind the application of the electrolyte, there will be a ballooning effect of the electrolyte's surface as the pressure pushes it into the slits. This will cause the electrolyte to be in contact with the catalyst 280 which coats the sides of the slits $S_1$ - - - $S_N$. Once this contact is formed and the membrane (electrolyte) is hydrated, it will expand even further, ensuring good contact with the catalyst. The $H_2/O_2$ gases are capable of diffusing into the (very thin, i.e. 5 microns) membrane, in the area of the catalyst. Because it can be so thin it will produce a more efficient i.e. less resistance ($I^2R$) losses are low. This then puts the three components of the reaction in contact with each other. The electrodes 160A and 160B in electrical contact with the catalyst 280 is the fourth component and provides a path for the free electrons [through an external load (not shown)] while the hydrogen ions pass through the electrolyte membrane to complete the reaction on the other side.

Figure 5:
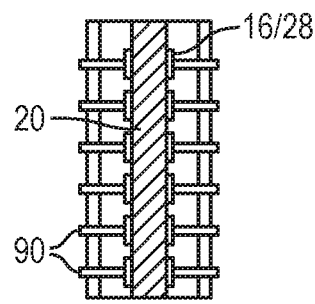
FIG. 5 is a sectional view of a PEM structure embodiment.
Figure 6:
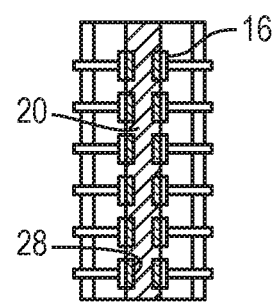
FIG. 6 is a sectional view of an alternate of the PEM structure.
Figure 7:
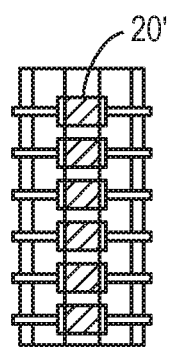
FIG. 7 is a sectional view of another alternate PEM structure.

Referring now to the cross-sectional views of FIGS. 5-7, various alternate configurations of the PEM structure 30 of the invention will be described in detail. In FIG. 5, the central PEM structure 20 is formed as a continuous non-conductive vertical element, and the electrode/catalyst 16/28 is a non-continuous element to which lead wires 90 are attached. FIG. 6 is a view of an alternate PEM structure in which the catalyst 28 is embedded in the non-conductive core 20 and the electrodes 16 are formed laterally adjacent the catalyst. Lastly, in FIG. 7, the PEM structure is similar to FIG. 5 but the center core $20^1$ is discontinuous.

Figure 8:
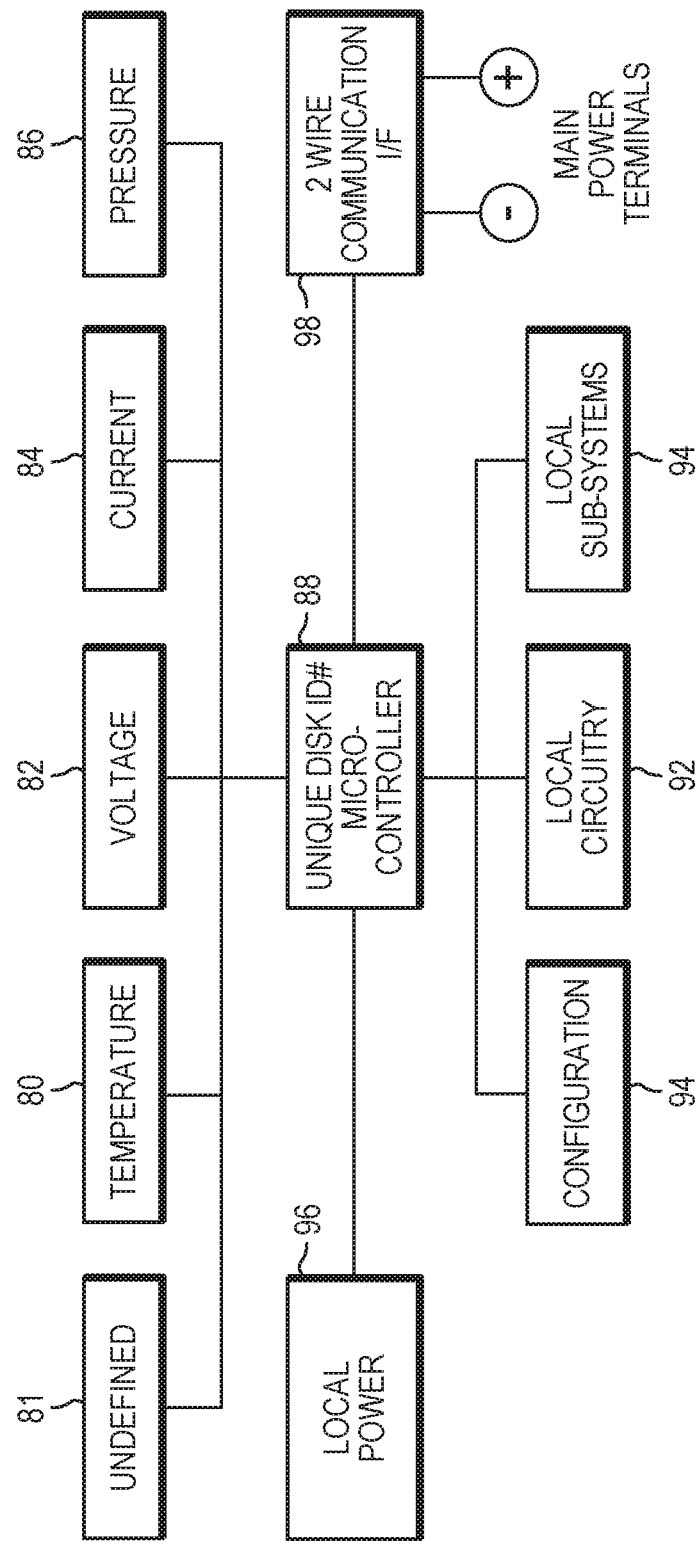
FIG. 8 is a block diagram of circuitry which may be integrated onto a fuel cell chip.

FIG. 8 is a schematic block diagram showing some of the possible circuits that may be integrated along with a microcontroller onto the semiconductor wafer 10 to monitor and control multiple cells performance. Several sensor circuits 80, 82, 84 and 86 are provided to perform certain functions.

Temperature circuit 80 provides the input to allow the micro processor 88 to define a thermal profile of the fuel cell 12. Voltage circuit 82 monitors the voltage at various levels of the configuration hierarchy or group of cells. This provides information regarding changes in the load. With this information, the processor 88 can adjust the system configuration to achieve/maintain the required performance. Current circuit 84 performs a function similar to the voltage monitoring circuit 82 noted above.

Pressure circuit 86 monitors the pressure in the internal gas passages 50A, 50B. Since the system's performance is affected by this pressure, the microprocessor 88 can make adjustments to keep the system running at optimum performance based on these reading. An undefined circuit 81 is made available to provide a few spare inputs for the micro 88 in anticipation of future functions.

In addition, configuration circuit 94 can be used to control at least the V*I switches to be described in connection with FIG. 9. The output voltage and current capability is defined by the configuration of these switches. Local circuitry 92 is provided as necessary to be dynamically programmed, such as the parameters of the monitoring circuits. These outputs can be used to effect that change. Local subsystems 94 are used by the micro 98 to control gas flow rate, defect isolation and product removal. A local power circuit 96 is used to tap off some part of the electricity generated by the fuel cell 12 to power the onboard electronics. This power supply circuit 96 will have its own regulation and conditioning circuits. A two-wire communications I/F device 98 may be integrated onto the chip to provide the electrical interface between communicating devices and a power bus (not shown) that connects them.

The microcontroller 8 is the heart of the integrated electronics subsystem. It is responsible for monitoring and controlling all designated system functions. In addition, it handles the communications protocol of any external communications. It is capable of "in circuit programming" so that its executive control program can be updated as required. It is capable of data storage and processing and is also capable of self/system diagnostics and security features.

Figure 9:
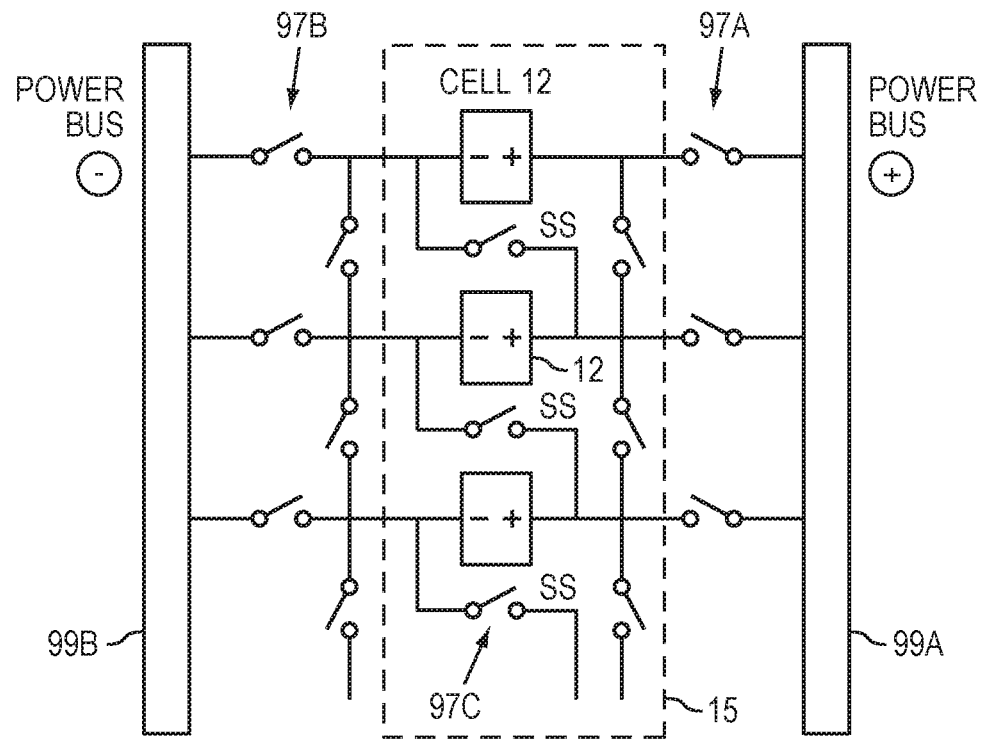
FIG. 9 is a schematic of the wiring for an integrated control system for the operation of individual cells or groups of cells.

Referring now to FIG. 9, further details of the invention are shown. In this embodiment, the individual power cells $12_1$, $12_2$ - - - $12_4$ are formed on a wafer and wired in parallel across power buses 99A and 99B using transistor switches 97 which can be controlled from the microprocessor 88 of FIG. 8. Switches 97B and 97A are negative and positive bus switches respectively, whereas switch 97C is a series switch and switches 97D and 97E are respective positive and negative parallel switches respectively.

This allows the individual cells or groups of cells (power chip 15) to be wired in various configurations, i.e., parallel or series. Various voltages are created by wiring the cells in series. The current capacity can also be increased by wiring the cells in parallel. In general, the power profile of the power chip can be dynamically controlled to achieve or maintain a "programmed" specification. Conversely, the chip can be configured at the time of fabrication to some static profile and thus, eliminate the need for the power switches. By turning the switches on and off and by changing the polarity of wiring one can produce both AC and DC power output.

To implement a power management subsystem, feedback from the power generation process is required. Circuitry can be formed directly on the chip to constantly measure the efficiencies of the processes. This feedback can be used to modify the control of the system in a closed loop fashion. This permits a maximum level of system efficiency to be dynamically maintained. Some of these circuits are discussed next.

The quality of the power generation process will vary as the demands on the system change over time. A knowledge of the realtime status of several operational parameters can help make decisions which will enable the system to self-adjust, in order to sustain optimum performance. The boundaries of these parameters are defined by the program.

For example, it is possible to measure both the voltage and the current of an individual power cell or group of power cells. The power output can be monitored and if a cell or group is not performing, it can be removed if necessary. This can be accomplished by the power switches 97 previously described.

An average power level can also be maintained while moving the active "loaded" area around on the chip. This should give a better overall performance level due to no one area being on 100% of the time. This duty cycle approach is especially applicable to surge demands. The concept here is to split the power into pieces for better cell utilization characteristics.

It is expected that the thermal characteristics of the power chip will vary due to electrical loading and that this heat might have an adverse effect on power generation at the power cell level. Adequate temperature sensing and an appropriate response to power cell utilization will minimize the damaging effects of a thermal build up.

The lid 40 is the second piece of a two-piece "power chip" assembly. It is preferably made of metal to provide a mechanically rigid backing for the fragile semiconductor substrate 14. This allows for easy handling and provides a stable foundation upon which to build "power stacks", i.e., a plurality of power chips 15 that are literally stacked on top of each other. The purpose is to build a physical unit with more power.

Figure 10:
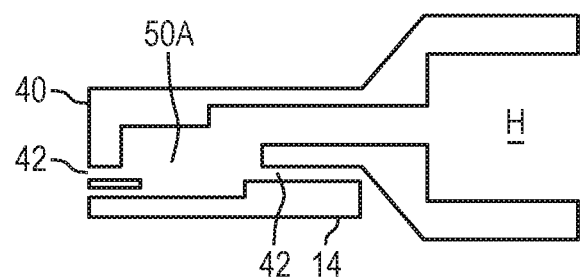
FIG. 10 is a schematic side view of a manifold system for a fuel cell.

FIG. 10 illustrates how the fuel 50A and oxidant/product channels 50A (and 50B not shown) may be etched into the surface of the substrate 14. These troughs are three sided and may be closed and sealed on the top side. The lid 40 and adhesive 42 provides this function of forming a hermetic seal when bonded to the substrate 14 and completes the channels. A matrix of fuel supply and oxidant and product water removal channels is thereby formed at the surface of the substrate.

The lid 40 provides a mechanically stable interface on which the input/output ports can be made. These are the gas supply and water removal ports. The design may encompass the size transition from the large outside world to the micrometer sized features on the substrate. This is accomplished by running the micrometer sized channels to a relatively much larger hole H. This larger hold will allow for less registration requirements between the lid and substrate. The large holes in the lid line up with the large holes in the substrate which have micrometer sized channels also machined into the substrate leading from the large hole to the power cells.

Each wafer may have its own manifolds. This would require external connections for the fuel supply, oxidant and product removal. The external plumbing may require an automated docking system.

Figure 11:
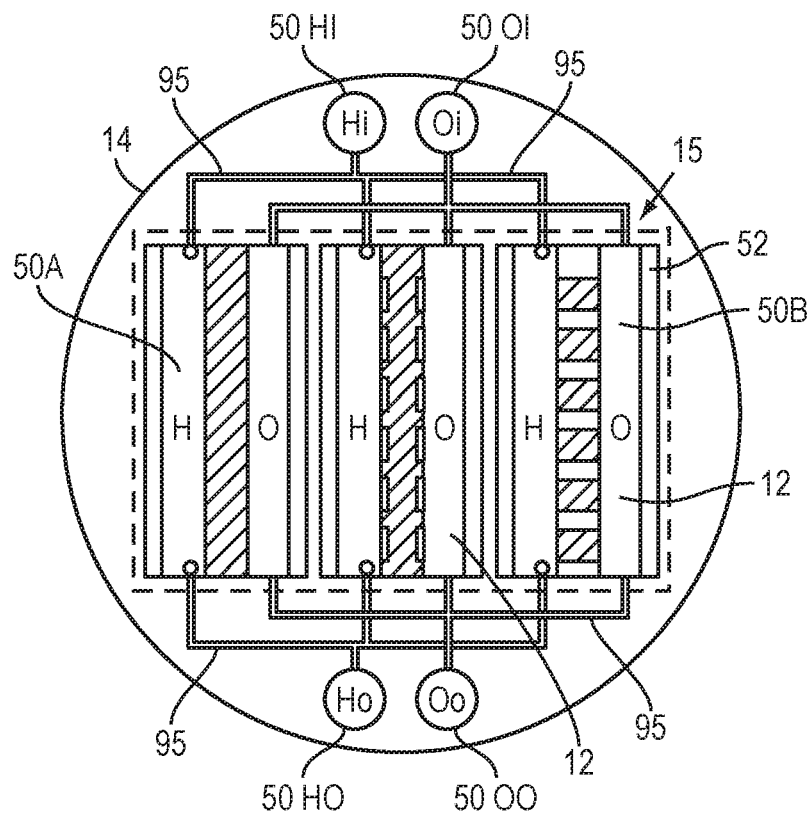
FIG. 11 is a schematic plan view of a plurality of cells arranged side-by-side on a wafer to form a power chip and stocked on top of each other to form a power disc.
Figure 12:
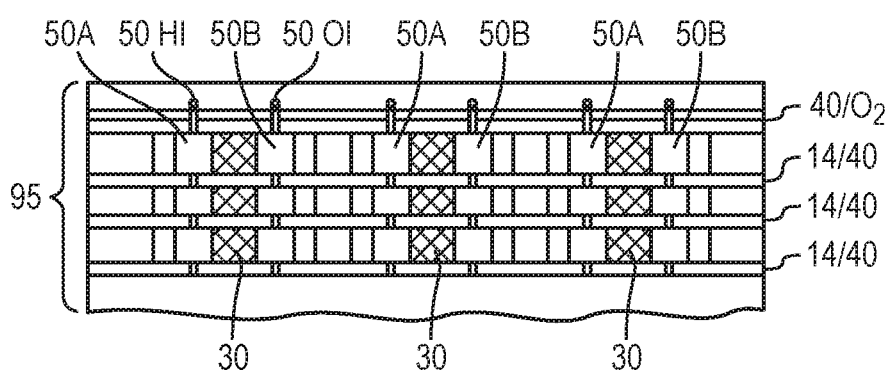
FIG. 12 is a fragmented side-view of FIG. 11.

FIGS. 11 and 12 illustrates one of many ways in which several cells 12 (in this example three cells side-by-side can be formed on a wafer 14 to form a power chip 15. Power disks can be stacked vertically upon each other to form a vertical column with inlet ports, 50HI, 50OI respectfully coupled to sources of hydrogen and oxygen respectively. The vertical column of wafers with power chips formed therein comprises a power stack (93).

FIG. 12 illustrates how stacking of a number of power discs 15 may be used to form power stacks (93) with appreciable power. The use of the word "stacking" is reasonable for it suggests the close proximity of the wafers, allowing for short electrical interconnects and minimal plumbing. In reality, the stacking actually refers to combining the electrical power of the wafers to form a more powerful unit. They need only to be electrically stacked to effect his combination. However, it is desirable to produce the most amount of power in the smallest space and with the highest efficiencies. When considering the shortest electrical interconnect (power bussing) alternatives, one should also consider the possibility of using two of the main manifolds as electrical power busses. This can be done by electrically isolating these manifold/electrical power buss segments and using them to convey the power from each wafer to the next. This reduces the big power wiring requirements and permits this function to be done in an automated fashion with the concomitant increased accuracy and reliability.

A desirable manifold design would allow for power disc stacking. In this design the actual manifold 95 would be constructed in segments, each segment being an integral part of the lid 40. As the discs are stacked a manifold (tube) is formed. This type of design would greatly reduce the external plumbing requirements. Special end caps would complete the manifold at the ends of the power stack.

In summary of the disclosed embodiment thus far, one of the primary objects of this invention is to be able to mass produce a power chip 15 comprised of a wafer 10 containing multiple power cells 12 on each chip 15 utilizing quasi standard semiconductor processing methods. This process inherently supports very small features. These features (power cells), in turn, are expected to create very small amounts of power per cell. Each cell will be designed to have the maximum power the material can support. To achieve any real substantially power, many millions will be fabricated on a single power chip 15 and many power chips fabricated on a "power disc" (semiconductor wafer 10). This is why reasonable power output can be obtained from a single wafer. A 10 uM×10 uM power cell would enable one million power cells per square centimeter. The final power cell topology will be determined by the physical properties of the constituent materials and their characteristics.

The basic electro-chemical reaction of the solid polymer hydrogen fuel cell is most efficient at an operating temperature somewhere between 80 to 100 C. This is within the operating range of a common semiconductor substrate like silicon. However, if the wafers are stacked additional heat-sinking may be required. Since a cover is needed anyway, making the lid 40 into a heatsink for added margin makes sense.

The fuel and oxidant/product channels are etched into the surface of the semiconductor substrate. These troughs are three-sided and may be closed and sealed on the top side. The lid 40 provides this function. It is coated with an adhesive to form a hermetic seal when bonded to the semiconductor substrate and completes the channels. This forms a matrix of fuel supply and oxidant and product water removal channels at the surface of the semiconductor substrate. The power cells two primary channels are themselves separated by the PEM which is bonded to this same adhesive. Thus, removing any fine grain is helpful in achieving alignment requirements.

Power Cell and Power Chip Architecture

It should be understood that the power cells described above may include a membrane having a three-dimensional geometric structure that encompasses a volume and a cover coupled to the membrane to separate a first flow path from a second flow path at the membrane. Herein, "a power cell" and "fuel cell" are synonymous and used interchangeably. The power cell may also include an anode catalyst layer, a cathode catalyst layer on the cover. Optionally, the power cell may include a substrate having holes for flow of fuel or oxidant to the catalyst. Another embodiment of the present invention is a power chip. The power fuel comprises an array of the power cells of the first embodiment with a manifold in gaseous communication with the first flow paths or at least one of the second flow paths to distribute the fuel or oxidant. The power chip also includes terminals electrically coupled to the first and second catalyst to provide an interface to energy generated by the power cells. The electrical interconnect may extend between the power cells and switches, fuses, or metal links for the purpose of configuring the array or a subset of the array and interfacing with an external load.

The configuration of the power chip may be programmable and may include control electronics elements, such as switches. The power chip may further include bond pads and package supporting stacks of the power chips.

Another embodiment of the present invention is a power disk that comprises an array of the fuel cells described in the first embodiment with the substrate electrically interconnecting electrodes with catalyst and optionally to an external load. The electrical interconnect may extend between the fuel cells and switches, fuses, or metal links in a configurable manner. The configuration of the power chip may be programmable. The power disk may further include bond pads and package supporting stacks of the power chips.

Yet in another embodiment of the present invention is the power stack. The power stack comprises an array of the power disks with a plurality of the power disks, packaging including an electrical interconnection, packaging including a parallel gas flow interconnect, and a system of manifold(s) enclosing the array of fuel cells to distribute the fuel or oxidant.

Other embodiments may include combinations of the following which shall be described in further details: a fuel cell with selected plan view geometric shape(s) (e.g., circle, square, serpentine), a castellation of wall, a corrugation (fins on wall), a catalyst on cover, a cover structure "low power" and "high power, a bidirectional operation means (electrolyzer and fuel cell), and a generalized micro-scale chemical reactor on a chip.

FIG. 13 shows a plan view of a conventional semiconductor wafer 1305 upon which a plurality of semiconductor fuel cells have been fabricated. Upon this wafer 1305 are constructed a plurality of power chips 1310 using, with a few exceptions described below, standard and well-established semiconductor and micro-electrical mechanical systems fabrication methods. For simplicity, the power chips 1310 are not shown to scale.

After manufacture and wafer-level testing, the power chips may be separated and packaged as individual power-generation devices, each containing one copy of the integrated circuit that is being produced. Each one of these devices is called a "die". The dimensions of each individual die may be 1 cm$^2$ or smaller or larger as dictated according to the needs of the application of the power chip.

It should be understood that the substrate 1305 may be other forms of substrate, such as metal, glass, silicon carbine and so forth.

FIG. 14 describes the elements of a power chip 1410. Each power chip includes several subcomponents. Each power chip can be constructed on a substrate 1405, such as a standard silicon wafer, upon which are constructed a large plurality of fuel cells 1412 by means of various MEMS fabrication steps. Metal layers 1416, 1415a, and 1415b are applied to the silicon and etched to form a suitable electrical interconnection network among the power cells 1412. Suitable insulation layers 1420, following conventional semiconductor practices, interleave the metal layers to provide electrical insulation and chemical, mechanical and environmental protection.

Bond pads 1425 are constructed at the edges of the power chip 1410, again following conventional practices, and provide a means of electrical connection between the power chip 1410 to external circuits (not shown). Bond leads (not shown) may connect to a circuit board using customary chip-on-board methods, or to contacts (not shown) at the edge of a molded package which facilitates stacking of multiple power chips as described below.

In addition, the silicon area underneath and between the power cell structures 1412 of the power chip 1410 may contain control electronics circuit elements 1430. These circuit elements 1430 include, but are not limited to, embedded control circuits, RAM or FLASH or ROM memory, logic in, for example, digital Application Specific Integrated Circuit (ASIC) form, A/D, sense and switching devices, which, taken together, may supervise, control, optimize and report to external devices and/or other fuel cells upon the operation of the power chip 1410.

Figure 15:
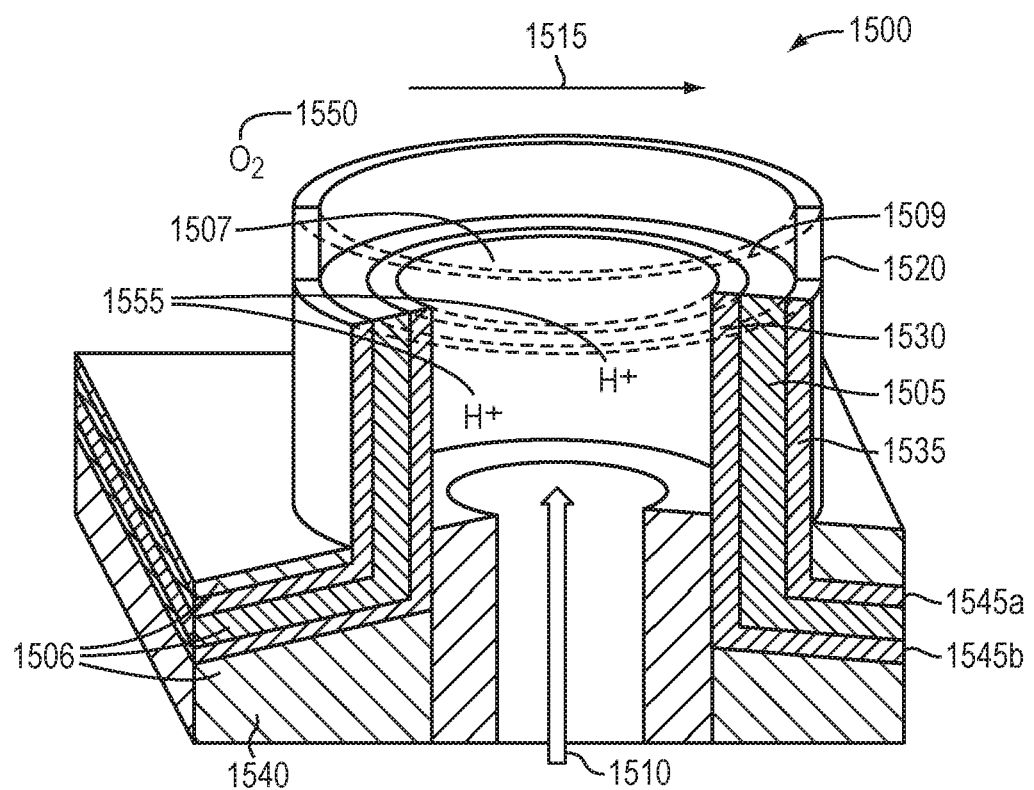
FIG. 15 is a simplified schematic cross-sectional view of the fuel cell of FIG. 14 of the present invention.

FIG. 15 shows a perspective view of a vertical cross section of an embodiment of an individual fuel cell 1500. In accordance with one embodiment of a fuel cell of the present invention, a Proton Exchange Membrane (PEM) wall 1505 is configured to form a three-dimensional geometric structure, defining a volume 1507 of a first flow path 1510. That is, in the example of FIG. 15, the PEM wall 1505 encompasses a volume 1507 in shape of, for example, cylindrical shape and defines a portion of the first flow path. A cover 1520 is coupled to the top of the three dimensional geometrical structure formed by the PEM wall 1505 structure creating a closed chamber and separating the first flow path 1510 from a second flow path 1515 at the PEM wall 1505. While coupling the cover 1520 to the PEM wall 1505 seals one end of the volume 1507, the opposite end of the volume 1507 closer to the entrance of the first flow path 1510 is open, thereby, accessible to a flow of oxidant or fuel.

The cover 1520 may made of a gas impermeable material to prevent shorting out between oxidant and fuel and can be made from a different material or the same material from that of the PEM wall 1505. The PEM wall 1505 is preferably an ionic polymer capable of passing the hydrogen ions (protons) through from the hydrogen side to the oxygen side. The PEM wall 1505 is electrically nonconductive so that it does not, effectively, electrically short out the fuel cell 1500 across an anode 1530 and cathode 1535 on opposite sides of the PEM wall 1505. The PEM wall 1505 may be made of Nafion® or of a material of similar characteristics. A load (not shown) may be coupled across contacts (e.g. metal wires 1545a, 1545b) electrically connected to the anode 1530 and cathode 1535 to extract power during operation of the fuel cell 1500. Additionally, the PEM wall 1505 can be doped with catalyst particles, such as platinum/alloy catalyst that are electrically conductive.

In one embodiment, the power cell includes a substrate 1540, which can support the fuel cell 1500, as described above. However, the substrate 1540 is an optional feature for the fuel cell 1500. In other words, because the PEM wall 1505 is a three-dimensional structure, the PEM wall 1505 can be an autonomous structure that can stand upright by itself; therefore, the substrate 1540 is not a necessary component for the fuel cell 1500 of the present invention. When the substrate 1540 is employed, the PEM wall 1505 can be coupled to the substrate at a location through which the fuel or oxidant can flow into the volume 1507. Further separating the first flow path 1510 and the second flow path 1515, the cover 1520 is now coupled to PEM wall 1505 by a method commonly known by one skilled in the art.

In one embodiment, the cover 1520 can be attached using an appropriate combination of heat, solvent, adhesive, and sonic welding and/or downward pressure. For example, it can be patterned and etched. All these methods that are familiar in semiconductor manufacturing practices can be applied. For example, PEM wall 1505 is bonded thoroughly to the substrate 1540 to form a gas tight seal by an adhesive. Alternatively, the cover 1520 and PEM wall 1505 can be attached by forming a chemical bond between the materials, for example, using a polymer. In addition to this chemical bond, there is the physical sealing effect by applying the cover 1520 down on the top 1509 of the PEM wall 1505. If the height of the PEM wall 1505 is controlled correctly, the pressure of the applied cover can form a mechanical "O-ring" type of self seal. Growing the PEM wall 1505 on the substrate 1540 can eliminate any fine registration issues when combining it with the cover.

In some embodiments, the cover 1520 being in contact with the top of the three-dimensional structure can be made "active" (i.e., having electrodes covered with respective catalyst on each side in similar configuration as the cylinder walls), thereby increasing active surface area for production of electricity. Furthermore, it should be understood that a third material (not shown), non-gas permeable, can be constructed to the top of the PEM wall 1505, and the cover 1520 can be affixed to the PEM wall 1505 via the third material. For example, a spacer (not shown) can be placed on top 1509 of the PEM wall 1505 so that the cover 1520 is not in physical contact with any part of the PEM wall 1505 while maintaining gaseous communication with the first flow path 1510 for production of electricity.

In another embodiment, depending upon the specific sequence of process steps employed in fabrication, the catalyst coating may extend to one or both sides of the cover as well, further increasing the reactive surface area of the device. Alternatively, the first layer of the cover can be provided with an adhesive layer which is used to bond the cover to the top of the three-dimensional structure shown in FIG. 15.

Continuing to refer to the fuel cell 1500 shown in FIG. 15, the metal 1545*a* and metal 1545*b* are two separate metal layers separated by insulation layers 1506. Metal 1545*a* is connected to the fuel cell cathode 1535, and metal 1545*b* is connected to the fuel cell anode 1530. The anode 1530 and the cathode 1535 are separated by a layer of the PEM wall 1505.

In one embodiment, the catalyst 1530 and 1535 are embedded on the sides of the PEM wall 1505. By embedding the catalyst, maximum intimate contact is achieved with the PEM wall 1505. Catalysis is a surface effect. This intimate contact provides a readily available path which allows the ions to migrate freely towards the cathode 1535. By suspending the catalysis in the PEM wall 1505, effective use of the entire surface area is obtained. This can dramatically increase the system efficiency.

Gaseous fuel (e.g. hydrogen) 1585 (i) can be introduced into the volume 1507 through hole(s) 1512 in the substrate 1540 facilitating the first flow path 1510 at the fuel cell 1500 and (ii) is reduced by contact with the anode catalyst 1530. Electrons resulting from this reaction travel through the conductive catalytic layer to the metal 1545*b* and, in turn, to the load (not shown). Protons resulting from the reaction travel through the PEM wall 1505 to the cathode 1535. Oxidant 1550 (e.g. oxygen) available via the second flow path 1515 at the cathode 1535 at the fuel cell 1500 from ambient air 1555 combines with the protons flowing through the PEM wall 1505 and electrons arriving from the load via metal 1545*a* to produce water vapor.

Alternatively, the anode 1530 and cathode 1535 can be assembled in the opposite configuration, where the anode 1530 is connected to one metal 1545*a*, and the cathode 1535 is connected to the other metal 1545*b*. In such a configuration, gaseous fuel is introduced via the second flow path 1515, and the oxidant is introduced via the first flow path 1510.

The PEM material can be initially deposited on the substrate or the wafer by means of spin coating, spraying, dipping, or other methods conventionally used in semiconductor manufacturing. The PEM material can then be photolithographically patterned and etched to form the wall contours shown as the PEM wall 1505 in FIG. 15. The catalyst layers 1530 and 1535 may be applied to the PEM as a coating, again using conventional semiconductor fabrication methods with an appropriate combination of sputtering, evaporating, spraying, transfer printing, and immersion. The resulting catalyst layer may have a plurality of sub layers, constructed specifically to support the conflicting requirements of large surface area to contact the ambient gas and to maintain (i) ionic conductivity to support proton transfer to the PEM and (ii) electrical conductivity to support electron transfer to the metal layers on the substrate. Due to the multiple layers of the catalyst, effective use of the entire surface is obtained.

Although FIG. 15 shows a fuel cell of cylindrical form, other shapes are possible, depending on performance characteristics desired for a particular application. For example, the shapes shown in plain view in FIGS. 16A-16D, or combinations or extension of them, may be employed.

Figure 16A:
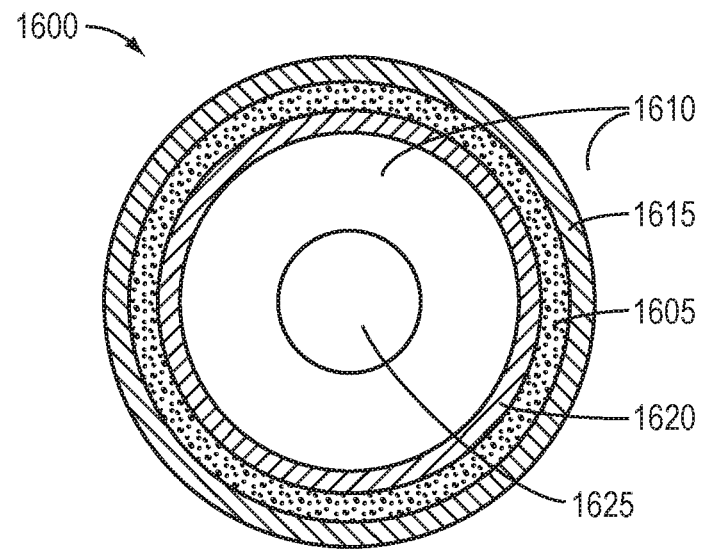
FIGS. 16A-16D are schematic cross-sectional views of the fuel cell in accordance with embodiments of the present invention.

FIG. 16A shows a similar cylindrical structure 1600 as that of shown in FIG. 15 in a simplified schematic cross-sectional plan view of the power chip without a cover. The cylindrical structure 1600 with a circular cross-section area includes of a substrate 1610, a PEM wall 1605, which is positioned between catalyst layers 1615, 1620 serving as a cathode and anode, respectively, in one embodiment. Formed in the center of the cylindrical structure 1600 is a flow path 1625 for flowing fuel or oxidant.

Figure 16B:
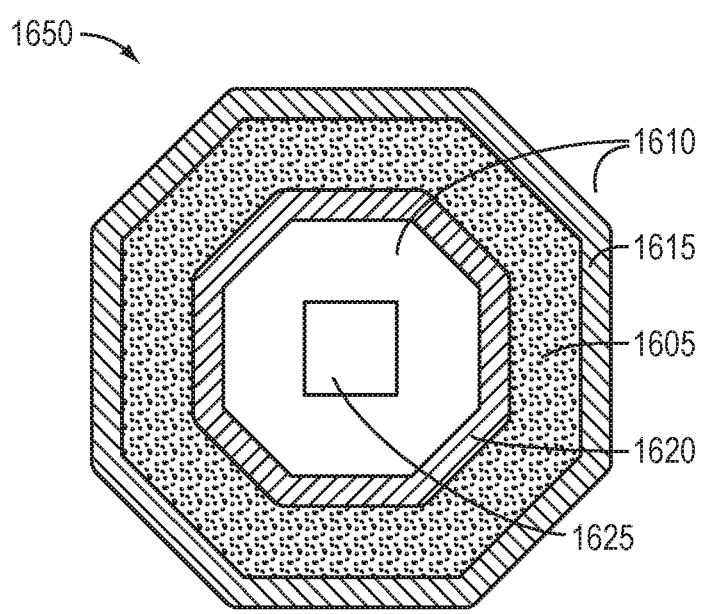

FIG. 16B shows the same components as that of FIG. 16A but in a non-circular cross-sectional plan view of a structure 1650, which permits more reactive surface area (i.e. wall length multiplied by height) per unit of footprint area than does the cylindrical structure with a circular cross-sectional area similar to the one shown in FIG. 16A. However, the non-cylindrical shape may be at the expense of less volume available for flow of fuel or oxidant around the cathode if a high density array of non-cylindrical fuel cells is constructed.

Figure 16C:
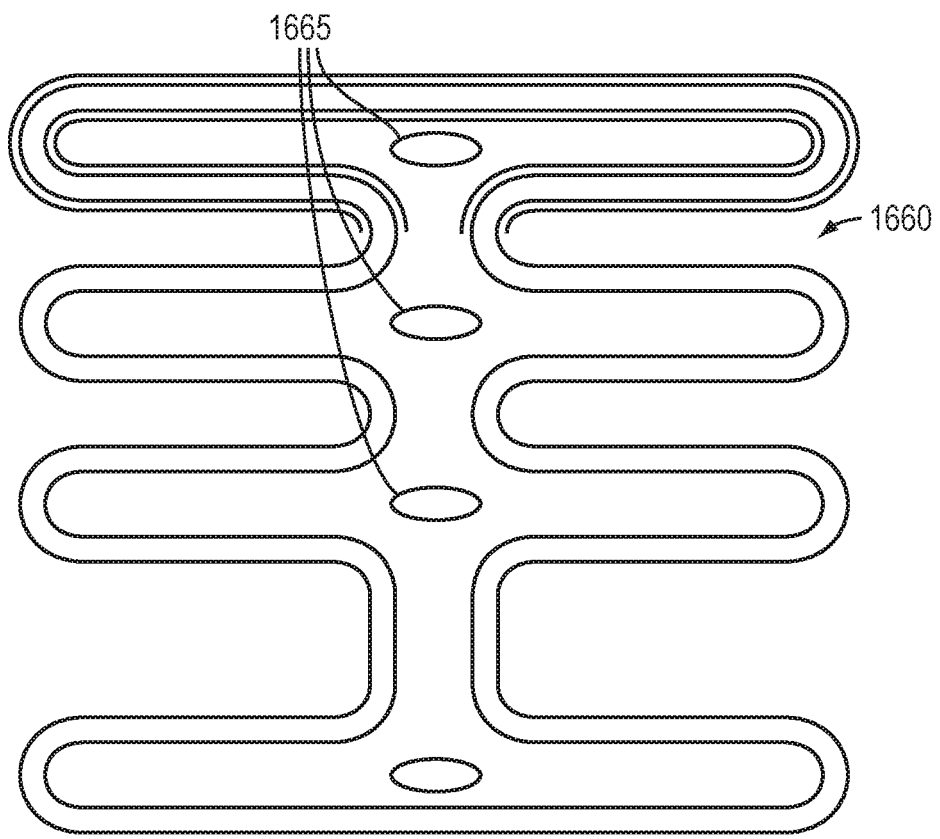

FIG. 16C is an example of a curvilinear construction 1660 including the same components as that of the cylindrical and rectangular counterparts. The curvilinear construction 1660 offers an even higher ratio of reactive surface area per unit footprint area than the rectangular and cylindrical constructions. Furthermore, the curvilinear construction 1660 can have one or more flow paths 1665 facilitating flow of fuel or oxidant as shown in FIG. 16C.

Figure 16D:
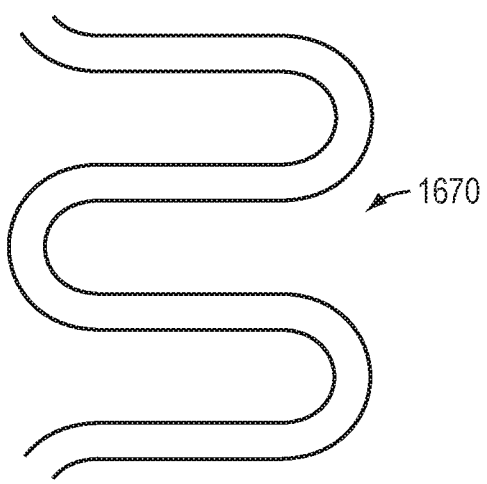

FIG. 16D is an example of fuel cell construction 1670 having a serpentine shape in plan view.

Figure 17:
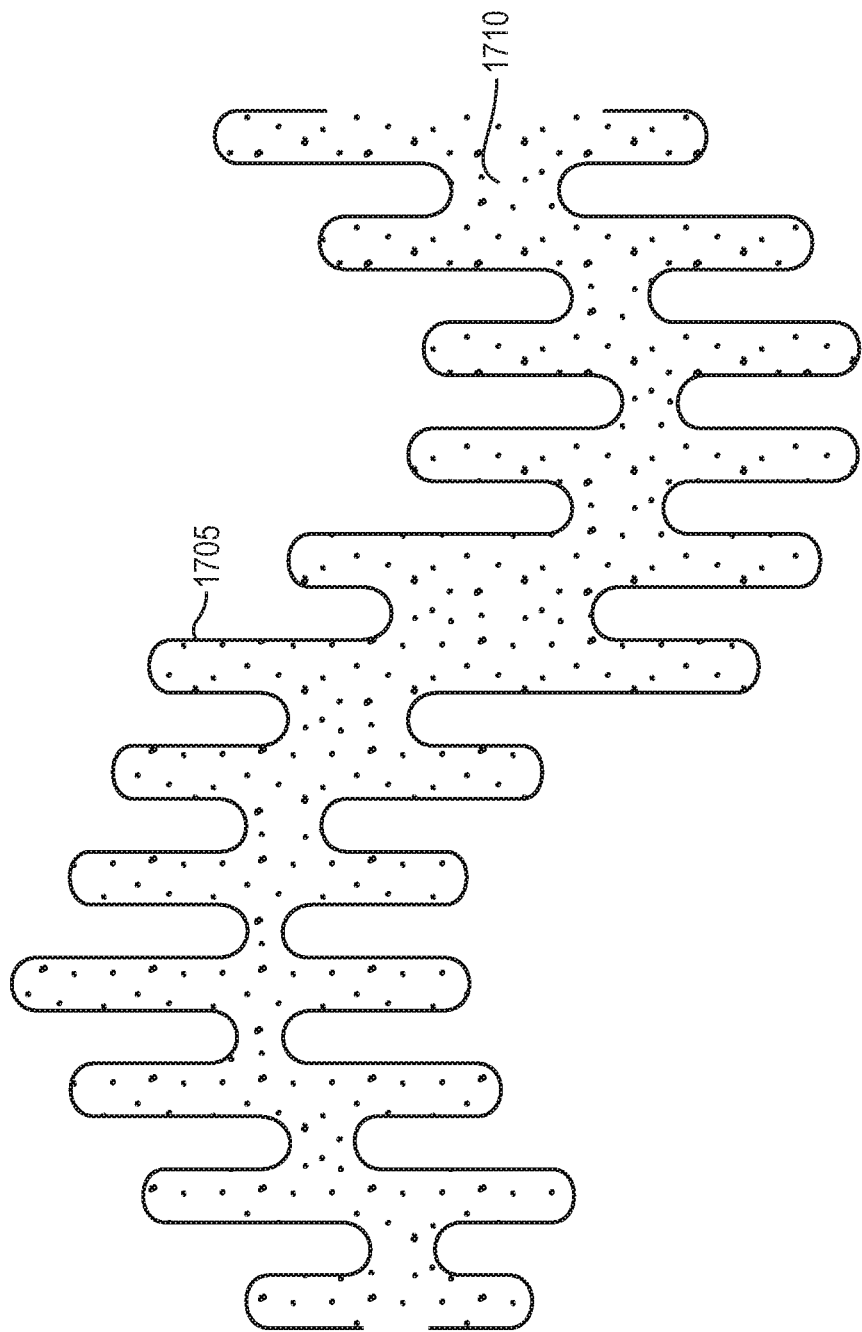
FIG. 17 is a schematic plan view of a PEM surface with "fins" to increase the active areas in accordance with an embodiment of the present invention.

FIG. 17 is another cross-sectional diagram that indicates a further extension which is possible by etching fins 1710 onto the castellated surface. This embodiment shows a section of a PEM wall 1705 from above, which could be applied to any part of any of the general shapes shown in FIGS. 16A-16D. The fins 1710 can achieve a dramatic further increase in surface area. If the aspect ratio of the fins is too high, however, the fins may be less effective because of the increasing effective resistance of the proton conduction path. Furthermore, there may be a limit on the gains achievable from this method depending on the characteristics of the etching process employed. Note that the hydrogen may be either dead-ended or flowing; oxygen flows in as well as out for water removal via, for example, a manifold that is connected to a fuel cell having the PEM 1710 with the fins 1705.

Figure 18A:
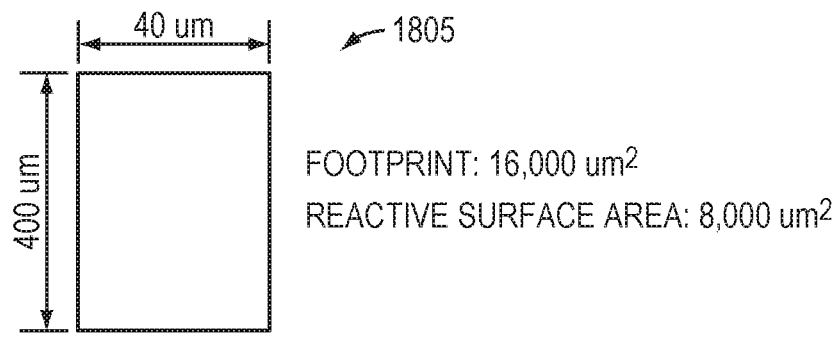
FIGS. 18A-18C are illustrations of comparing footprint areas between a typical two-dimensional fuel cell and fuel cell designs in accordance with embodiments of the present invention.
Figure 18B:
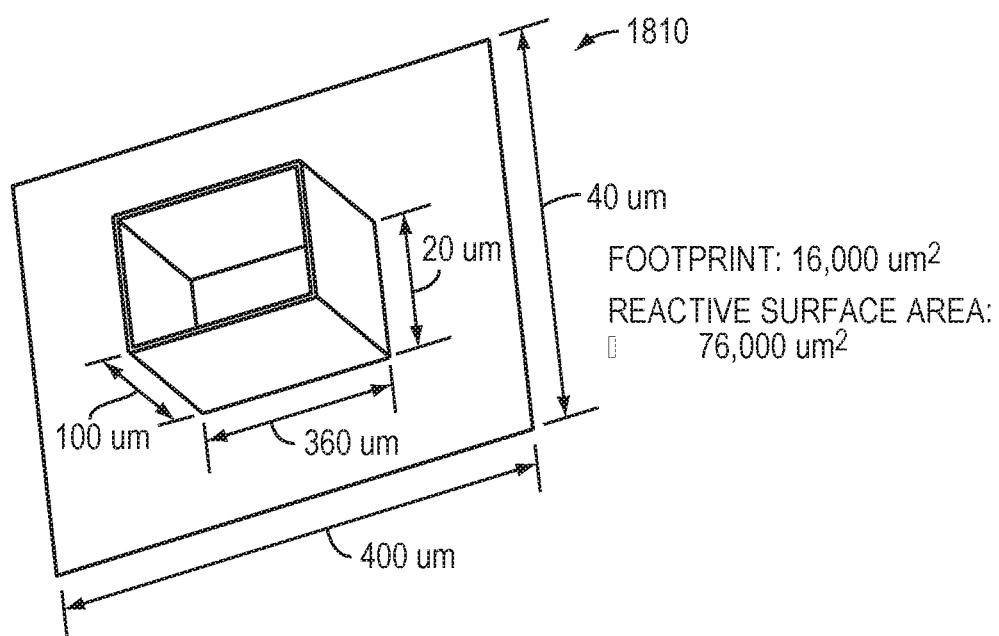
Figure 18C:
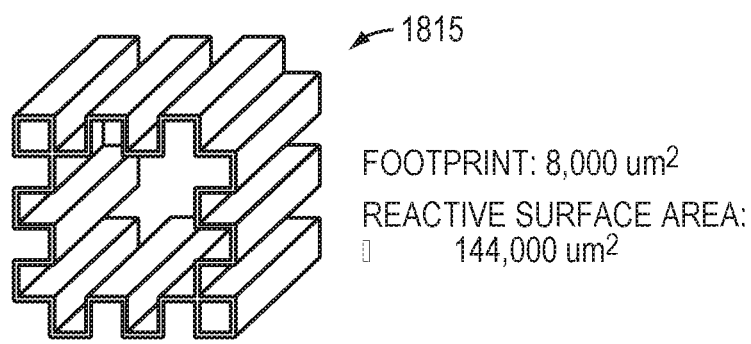

FIGS. 18A through 18C are plan view diagrams showing how the reactive surface area of the device, which is used in achieving high power density, is further increased. The reactive surface area is increased using the constructions described above and can be further increased, as described immediately below. FIG. 18A shows a standard planar PEM 1805 typical of prior art planar fuel cells, which, for example, might have dimensions of 40 um by 400 um, with 16,000 $\mu m^2$ foot-print and reactive surface area of 8000 $\mu m^2$. In FIG. 18B, creating a rectangular, three-dimensional PEM 1810 structure in accordance with an embodiment of the present invention on this same footprint yields 76,000 $um^2$, or more than 4 times that of the planar PEM of the FIG. 18A. FIG. 18C shows how a castellation of the PEM wall 1815 can again double the surface area, producing 8 times the surface area of a planar design because the reactive surface area increases to 144,000 $um^2$. Since the cost of a semiconductor device tends to increase in proportion to the silicon "footprint" area employed, this high multiple results in correspondingly higher effective power density and lower cost per watt generated.

Figure 19A:
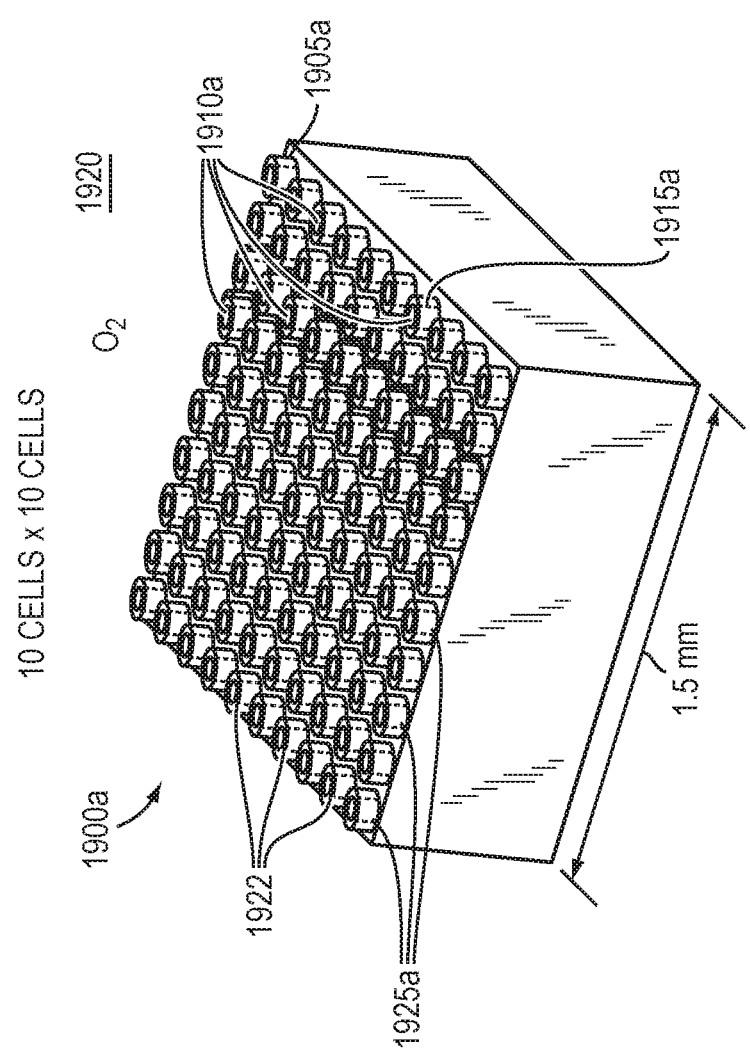
FIGS. 19A and 19B are schematic plan views of the cover configuration of the fuel cell in accordance with an embodiment of the present invention.
Figure 19B:
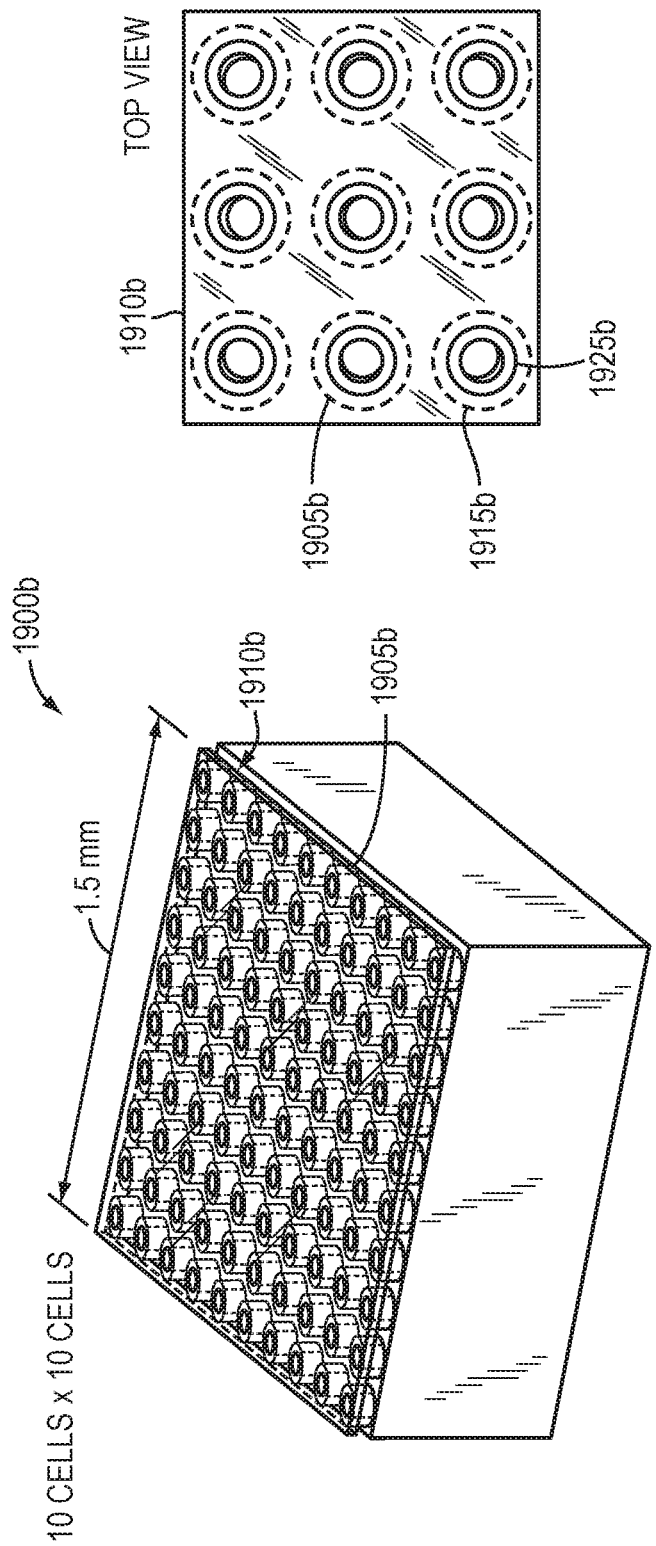

FIGS. 19A and 19B are diagrams that show a useful variation of the fuel cell design. As described above in reference to FIG. 1, an embodiment of the present invention is an array of fuel cells electrically interconnected and provided with gases and oxidants to separate flow paths to form a power chip. The fuel cells interconnected to form the power chip can include an array of any embodiment of fuel cells disclosed herein. The power chip may further include at least one plenum in gaseous communication with flow paths for distributing fuel or oxidant and one pair of terminals electrically coupled to the anode catalyst of at least a subset of the array of power cells.

FIG. 19A is a diagram that depicts a power chip 1900a including an array of fuel cells 1905a with a plurality of membranes 1922 encompassing to three-dimensional geometric volumes (i.e., cylindrical), in the interior of the fuel cells 1905a. Each PEM wall 1922 is coupled to a cover 1910a, sealing the PEM wall 1922 and rendering each fuel cell 1905 dead-ended. Fuel is then flown into the three-dimensional geometric volumes of PEM wall 1922 to be in gaseous communication with anode catalyst 1915a. Because cathode catalyst 1925a is exposed to open air 1920, the cathode catalyst 1925a effectively has access to oxidant (e.g., oxygen) in the open air 1920 for reacting the fuel and oxidant at the power chip 1900a to generate energy. The fuel cells of the power chip 1900a can be divided into subsets, each subset controlled by enabling and disabling electron flow to or from the subset.

FIG. 19B is a diagram of power chip 1900b that illustrates an alternative cover configuration to the cover configuration in FIG. 19A. Here, the cover 1910b is the "negative" of the cover 1910a in FIG. 19A. Instead of having a plurality of covers as shown in FIG. 19a, the power chip 1900b may use one contiguous cover to be coupled to the membranes of the fuels cells. In such configuration, a flow path through the interior of the cylinders 1905b is not dead-ended so that the power cell 1905b can more effectively remove reaction by-products. In this embodiment, the cathode 1925b and anode 1915b may be interchanged so that water or other byproduct formed at the cathode may be removed more readily.

A variation of the aforementioned designs may be useful in high-power systems. In contrast to the configuration of FIG. 13, the substrate or wafer (also referred to herein as a power disk) is not designed to be divided and packaged in small units. In one embodiment, the power disk can include (1) an array of any embodiment of fuel cells disclosed herein, (2) at least one plenum in gaseous communication with flow paths of the fuel cells to distribute the fuel and oxidant, (3) at least one pair of terminals electrically coupled to the anode and cathode catalyst of at least a subset of the power cells to provide an interface to energy generated by the power cells, and (4) at least one bus power electrically coupled to the terminals. The metal layer interconnections and control electronics (not shown) may be configured to connect to individual fuel cells or substrate-wide. In one embodiment, the power disk can further include switches to interconnect the power chips in an electrically selective manner. In a preferred embodiment, the power disk can also include electronics to control the switches. It should be noted that when the array of power cells is coupled to a substrate, the plenum is configured to distribute the fuel or oxidant with substantially uniform pressure. The plenum may be provided with at least one outlet so that, for example, a byproduct of the reaction between the fuel, oxidant and the power cells can be removed. A plurality of these power disks may then be stacked in an electrically parallel connection, forming a power stack.

In one embodiment of the power chip, instead of electrical interconnect by wires or circuitry, the fuel cells are electrically connected by a coat or film of metal on both sides of the membranes. The coat of metal is in electrical communication with a terminal at one edge of the power chip, where the terminal is connected to an external load.

In another embodiment of a power stack, the power stack can include a substrate on which at least one power chip is coupled. The power chip can be any embodiment of power chip disclosed herein. Yet another embodiment of a power chip can include a substrate, an array of any embodiment of power cells disclosed herein, a pair of electrodes coupled to respective cathode and anode catalyst, and a pair of power disk buses electrically coupled to the respective first electrode and the respective second electrode.

In one embodiment of a power stack, the power stack can include a power stack a structure, a plurality of power disks connected to the structure, and power stack terminals associated with the power stack structure and configured to be electrically coupled to the disk terminals.

Figure 20A:
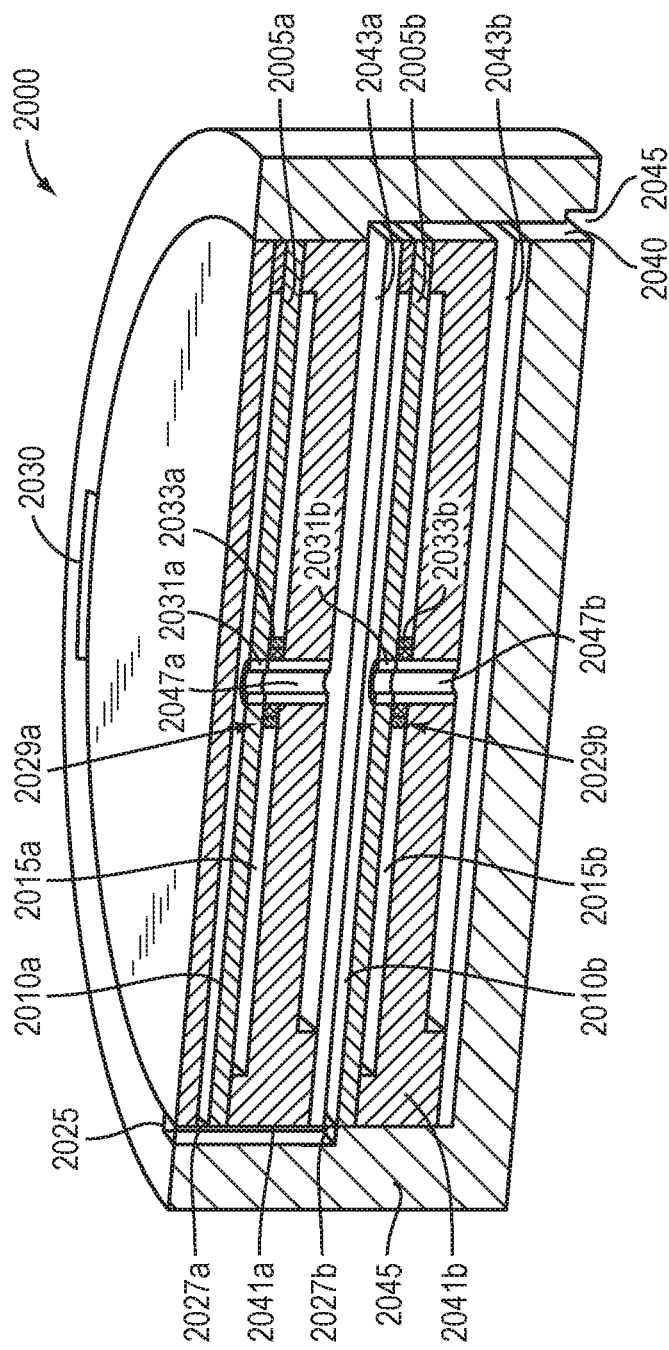
FIGS. 20A and 20B are schematic plan view of a power stack in accordance with an embodiment of the present invention, and a cross-sectional schematic view illustrating the hierarchical construction of an exemplary power stack formed of multiple power disks, each of which containing many power chips.

In one embodiment of the power stack, individual power disks 2005a, 2005b may be stacked such a way that the flows of oxidant and fuel facilitated by separate manifold as shown in FIG. 20A. For example, power disks 2005a, 2005b are fitted into a power stack structure 2045 provided with a system of manifolds to provide paths for distributing fuel and oxidant to reach power disks. Power disks 2005a, 2005b are positioned between upper plenums 2010a, 2010b and lower plenums 2015a, 2015b. FIG. 20A shows that each power disk 2005a, 2005b includes one single individual power cell 2029a, 2029b for illustrative purposes. Therefore, it should be understood that while not shown in FIG. 20A, each power disk 2005a, 2005b can include an array of power cells with other components for making a functional power disk.

Continuing to refer to FIG. 20A, the power stack is provided with a first input chase 2025 for an entry point for fuel or oxidant. The first input chase 2025 has openings 2027a, 2027b so that the fuel or oxidant can flow into upper plenums 2010a, 2010b. For example, once the flow of oxidant reaches the upper plenums 2010a, 2010b, the oxidant is in contact with the cathode catalyst 2031a, 2031b of the power cells 2029a, 2029b, which is coupled to substrates 2041a, 2041b. Concurrently, a flow of fuel is entered via a second input chase 2030, which is opened to the lower plenums 2015a, 2015b. Here, the fuel makes contact with an anode catalyst 2033a, 2033b, triggering a reaction between the fuel, oxidant and catalyst for generating electrons. Each power disk 2005a, 2005b can include electrodes electrically coupled to the catalyst for electron transfer. Alternatively, the anode and cathode catalyst can be assembled in the opposite configuration where the components 2031a, 2031b are the anode catalyst, and the components 2033a, 2033b are the cathode catalyst. In such a configuration, fuel is introduced via the first input chase 2025, and oxidant is introduced via the second input chase 2030.

Furthermore, the flow path starting at the first input chase 2025 disclosed in FIG. 20A is provided with an exit path. For example, once the spent fuel or oxidant passes through a flow path 2047a, 2047b after reacting with respective catalyst, the fuel or oxidant flows to an exit plenum 2043a, 2043b. Passing through the exit plenums 2043a, 2043b, the spent fuel or oxidant reaches an output chase 2040, which is provided with an exit 2045. In one embodiment, this exit passage via the exit plenums 2043a, 2043b and via the output chase 2040 provides an outlet for removing byproduct that is produced by the reaction between the fuel, oxidant and the fuel cells.

Continuing to refer to FIG. 20A, the fuel or oxidant flow can be substantially parallel to each power disk, and relatively little pressure drop may be encountered. Because the individual reaction sites are extremely small, the stochiometric amounts of reactant required at each site are very small. Dead-ended, diffusion-based flow can be used very satisfactorily in many situations.

Figure 20B:
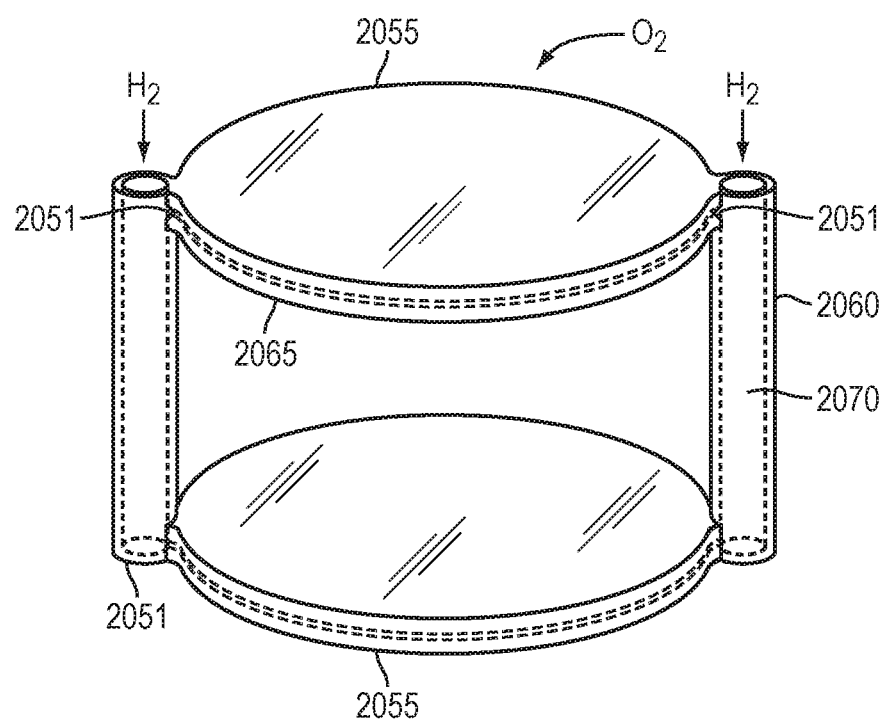

In FIG. 20B is a diagram of another embodiment of a power stack. A plurality of power disks 2055 are coupled to a power stack structure 1560, which, in this embodiment, is formed of two or more hollow paths. The power stack structure 2060, which may include stiffener (not shown) connected to both hollow posts of the example structure, is configured to provide a fuel (e.g. hydrogen) flow path(s) 2070 (shown as dashed lines). The flow path(s) 2070 are in gaseous communication with a power disk entrance 2051 through which the fuel can flow into each power disks 2055 via at least one disk manifold 2065. Because the power disks 2055 are exposed to ambient air, the power disks 2055 have access to oxidant (i.e. oxygen) in the air. As such, without a deliberate supply of oxidant through an oxidant flow in the power stack structure 2060 and manifold in the power disks 2055, the power stack can sufficiently generate energy.

Power disks which are assembled according to such an arrangement can generate substantial power. FIGS. 21 and 22 illustrate examples.

FIG. 21 includes a sequence of fuel cell structures and associated dimensions that show how 10 KW per liter of volume can be obtained based on a small amount of power density per reactive surface area.

FIG. 22 includes other diagrams with dimensions and weight that show a similar calculation for watts/kg.

Controlling an Array of Power Generators

Power cells, such as fuel cells, generally possess a source impedance, and, hence, the voltage the devices can deliver is a function of current being supplied. As a result, as a load demands more current, the load tends to decrease the supply voltage that can be created by placing a number of fuel cell devices in series. For example, with fuel cells having an open circuit potential of 0.9 volts and a maximum current output capability of 1 milliampere (mA) at 0.4 volts, a series connection of 12 such devices provides 4.8 volts at a maximum power output of 4.8 mW, and a series connection of 6 such devices supplies 5.4 volts at zero mW output. A power supply capacity of 1 ampere can be created by connecting 1,000 series-connected columns of such 1 mA devices together in parallel, assuming no internal losses.

Most electronic components require voltage regulation to within some tolerance, e.g., 5 volts±10%. In some prior art systems, voltage regulation is accomplished by external voltage regulators or other similar power conditioning circuits.

In some embodiments, an arrangement of power cells automatically switches the number of series devices, obviating need for external power regulators and, thereby, increasing energy efficiency, reducing generated heat, reducing circuit board space requirements, and reducing total cost of a system.

It is characteristic of fuel cells and many other power generators that their power conversion efficiency is higher at low power levels because there is less power dissipation inside the device. Depending on a shape of a voltage-current (V-I) curve describing a power cell or equivalent characteristic, there may be a power level offering optimum efficiency. Typically for fuel cells, the optimum efficiency is as little voltage drop as possible, hence minimum current. In this case, a trade-off exists between fuel efficiency and the number of power devices, hence, system cost and size.

Thus, an example optimal control technique for fuel cells according to some embodiments of the present invention may include a coarse control loop, which causes the number of series devices in each column to be adjusted so that the voltage is within tolerance for the actual load, and a fine control loop, which adds or subtracts the number of columns of such devices that are connected in parallel to adjust the voltage further by moving the system up or down the V-I curve to supply the desired current.

Further, in embodiments employing a feedback control system, a control technique may take into account individual, arrays, or banks of cells, which, when switched into or out of the power generating circuit, possess a transient response over time. Thus, a filter or other control law may be used in feedback loop(s) to ensure stable operation of the feedback control system in the presence of load transients.

Further, the characteristics of the fuel cell devices, and, consequently, coefficients within a feedback filter or other control law, may depend upon the state of the fuel cell devices at preceding times or, ambient conditions of temperature, humidity, and pressure.

Example methods disclosed herein can be extended (i) to control current (i.e., constant current source rather than constant voltage source) delivery of multiple voltages or currents to support loads, such as cellular telephones, PDAs, and laptop computers, which typically require multiple voltages, and (ii) to track a time-varying set-point voltage rather than a constant set-point voltage. The tracking feature can be used, for example, to produce a 60 Hz sinusoidal power output directly and efficiently or used as an audio amplifier to drive a speaker in a cellular telephone directly and efficiently.

In some applications, it is useful to allocate power generated among available fuel cell devices in a manner making efficient use of fuel while simultaneously delivering a required power profile to the load. In portable power applications, such as laptop computers, PDAs, and cellular telephones, power requirements involve multiple voltages, each corresponding current varying with time, and often involving significant transients in power requirement and a very large peak/average ratio. A similar requirement characterizes larger applications, such as power sources for automobiles and buses.

Commercial success of fuel cell power systems is expected to be determined by energy storage density (watt-hours/kilogram and watt-hours per liter), peak and average power density (watts/liter and watts/kilogram), and cost ($/watt, $/watt-hour). These metrics may be applied to the complete system, including fuel storage, fuel delivery, and the fuel cells themselves.

Accordingly, an embodiment of the present invention includes a method or corresponding apparatus to control operation of an assembly of many small fuel cells, each generating a small fraction of total power generated by the entire assembly, in such a manner that fuel consumption over time is minimized, power output to a load is maintained with required regulation of voltage and/or current at one or multiple voltages, and load transients are supported within required tolerance. In some embodiments, a control system employing the method or corresponding apparatus takes into account variation of fuel cell performance with temperature, humidity, and available gas pressures of both fuel and oxidant (e.g., due to variation with altitude), and adjusts control strategies, accordingly.

Another embodiment provides a method or corresponding apparatus to control, such as optimally control, aggregate operation of an assembly of many small power generators, where those generators may be fuel cells, micro-batteries, photo-electric, piezo-electric, other ambient vibration-driven devices, or any other source of power whose efficiency depends upon a level of operation according to some characteristic that is generally analogous to a battery discharge curve or a fuel cell V-I curve. The control of the aggregate operation may be performed by optimal control principles or other form of control principles.

Again, although the specifics of the following disclosure refer to fuel cells, the concepts, apparatus, or methods described should be interpreted as applying to any such small or relatively small power generating device.

FIG. 23 shows a conventional, prior-art power supply circuit 2300 using a fuel cell stack or battery as a prime power source 2301. A regulator 2302 is employed to maintain a target voltage 2303 at a load 2304, where the target voltage is a voltage level within a range required for proper operation of the load 2304, such as 5 Vdc±0.5 v. The regulator(s) are employed because typically the voltage of the prime power source 2301 varies with load in such a way that the target voltage cannot otherwise be maintained. The regulator may be a three-terminal linear regulator, or any of several topologies of switching regulator (boost, buck, buck-boost) as commonly known in the art. A filter capacitor 2305 is typically employed to buffer transients caused by the load 2304 and absorb power supply noise generated by the transients.

FIG. 24 is an illustration of a voltage-current (V-I) curve 2400 typical of a micro-fuel cell. The curve 2400 expresses a variation of output voltage with current, or, implicitly, variation of output voltage with load impedance, in accordance with Ohm's Law. As is well known in the art, a fuel cell typically has three regions of operation: activation energy dominated 2406, internal resistance dominated 2407, and mass transport dominated 2408. The entire curve 2400 tends to shift with temperature, as indicated by a dashed line curve 2409 and with gas pressure and humidity. The voltage value at I=0 current is referred to as an Open Circuit Potential 2410.

Parallel Switching

Figure 25:
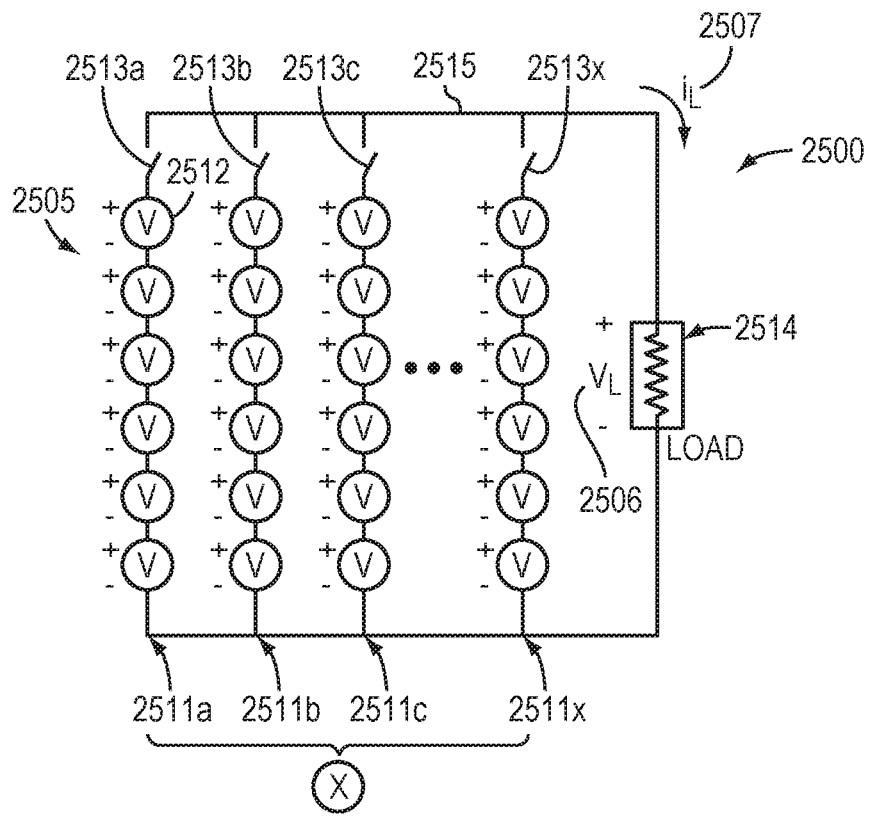
FIG. 25 is an example showing inter-connection topology of a series-parallel, switched arrangement of fuel cells.

With the V-I curve characteristics in mind, consider a circuit topology 2500 shown in FIG. 25 which includes an array 2505 of fuel cells 2512, each having operational characteristics with a curve similar to the curve 2400 illustrated in FIG. 24.

Referring to FIG. 25, the array 2505 contains a number of series-connected columns 2511a, 2511b, . . . , 2511x of fuel cells 2512. Each column 2511a-x has a respective switch (2513a, 2513b, . . . 2513x) between the fuel cells 2512 and a power bus 2515, such that when the switches 2513a-x are closed, the corresponding series columns 2511a-x are connected in parallel with each other and a load 2514.

Consider first a situation where the leftmost switch 2513a for the leftmost column 2511a is closed and the others 2513 b-x are open. If the impedance of the load 2514 is very high, then a voltage $V_1$ across a load is close to the sum of the open circuit potentials of the individual cells comprising the series array. If the impedance of the load 2514 is lower, the current output by the fuel cells 2512 in the leftmost column 2511a in this example, which substantially is equivalent to a load current, $I_1$, increases, and the voltage generated by the column 2511a of fuel cells 2512 decreases in accordance with the sum of the individual device V-I curves. Next, consider a situation where a second series column 2511b is connected by closure of its corresponding switch 2513b. In this situation, the current flowing through each column 2511a, 2511b is reduced by roughly half, and the voltage of each column 2511a, 2511b increases, correspondingly. Accordingly, an output voltage can be maintained within a pre-established tolerance by connecting and disconnecting columns 2511a-x of cells 2512, which leads to a steady-state variation of voltage as a function of load impedance, as shown in FIG. 26.

Figure 26:
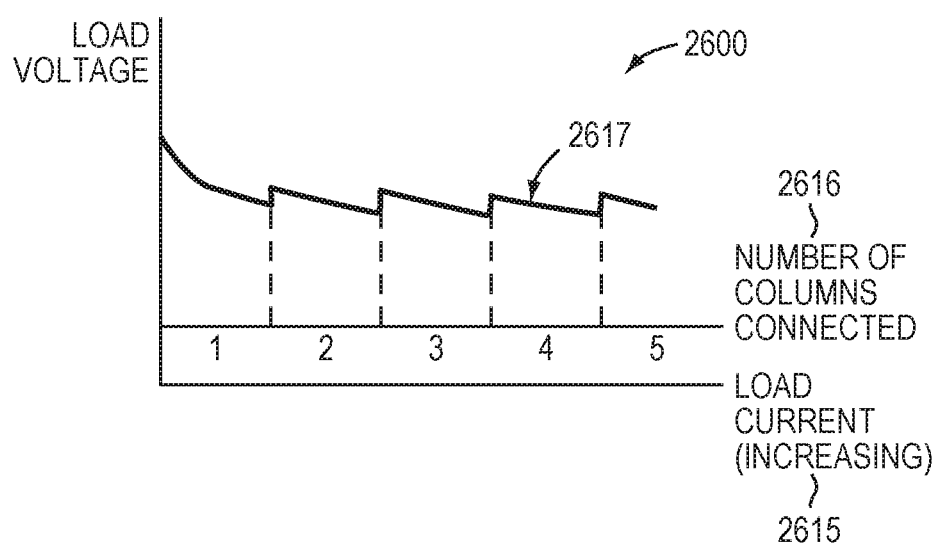
FIG. 26 is a plot showing variation of voltage with output current and with the number of columns switched into the circuit as a load impedance is decreased.

FIG. 26 is a plot illustrating a situation in which a load impedance 2614 is reduced and a load current 2615 correspondingly increases. As an increasing number of columns 2616 are switched into the circuit (e.g., array 2505 of FIG. 25), the circuit produces a saw-tooth variation in voltage 2617 as a function of current 2615.

Series Switching

In many circumstances, a useful operating range of devices is much greater than the voltage tolerance. In this case, it may be useful to switch the number of devices in each series column as well as the number of columns.

Figure 27:
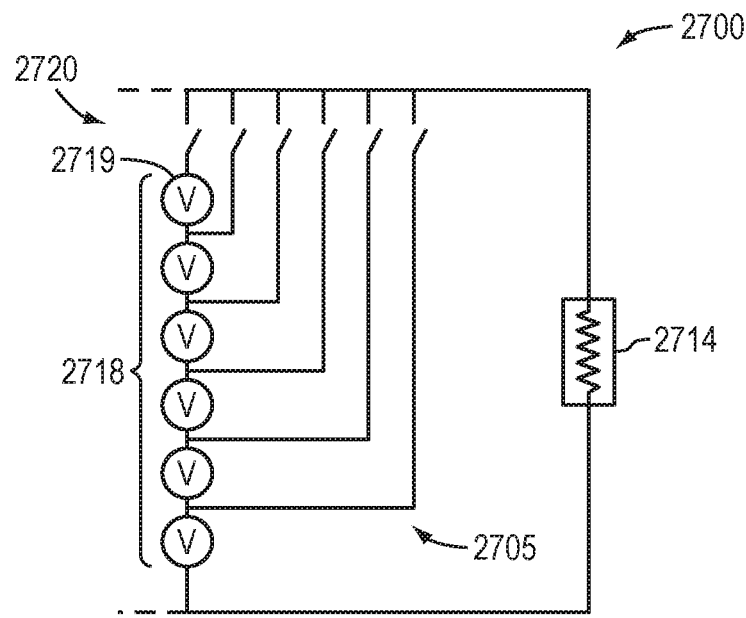
FIG. 27 is an example switching topology for a series column of a variable number of fuel cells.

FIG. 27 is a circuit topology 2700 that includes switches 2720 in a column topology 2718 that provides for selecting a varying number of series components 2719. This column topology may be repeated multiple times in a parallel column topology to drive a load 2714 with finely selectable levels of current.

Transient Response

Another consideration in the design of a control process is transient response of the individual devices. When initially switched into a load circuit, a device typically does not turn on fully instantly, but experiences a transient response over time.

Figure 28:
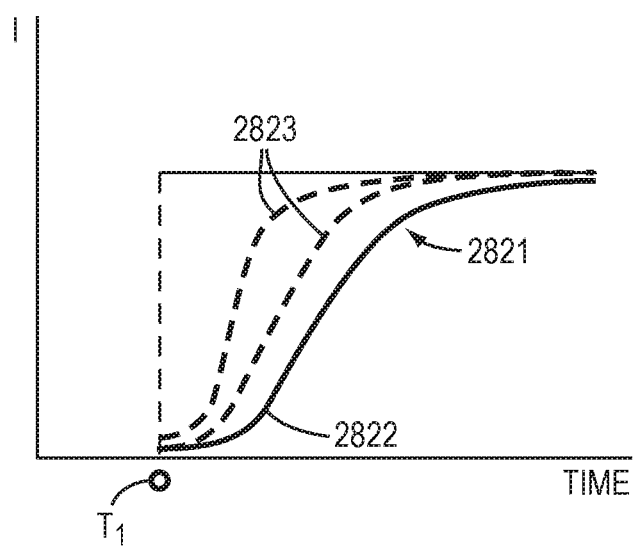
FIG. 28 is a plot illustrating a transient response typical of a fuel cell after it is switched into an operational set on state.

FIG. 28 is a plot illustrating a step function of an individual power generating device, such as a fuel cell. Connection of the power generating device to the load circuit at time T1 results in a rise in current flow that is exponential over time, illustrated by a solid line curve 2821, with a time constant that is a function of the device. There may be an initial transport lag 2822 as well, depending on the state of the device, and, in the case of a fuel cell, distribution of ions in a Proton Exchange Membrane (PEM). The initial transport lag may also be a function of temperature and inactivity (i.e., how long ago the device was previously active). A typical variation with these latter parameters is shown as dashed curves 2823.

Transient responses for a fuel cell are influenced by an ability of the fuel cell to reach equilibrium. Areas in which equilibrium is established include: i) hydration of a membrane (e.g., Nafion) in a reaction layer, ii) water balance in the reaction layer (e.g., is there residual liquid water in the pore space preventing gas from reaching catalyst?), iii) oxidant/fuel supply (e.g., is there enough reactant gasses to support the desired load?), where areas ii and iii can be related. Optimizing the operating conditions and architecture of the Proton Exchange Membrane (PEM) is a factor in minimizing the transient response of a fuel cell.

The transient response may be either positive or negative. If the membrane is conditioned correctly and the cell has been inactive for a period of time, so that water in the pore space of the reaction layer has been removed and the reacting gasses have had time to diffuse throughout the reaction layer and occupy all possible active catalyst sites that otherwise would be isolated by trapped liquid water, the transient response shows a peak power decrease with time. The decrease in power may be due to a build-up of liquid water in the pore space of the reaction layer that isolates active catalyst. Steady state power results when the accumulation of liquid water does not exceed its removal rate, but some level of water has accumulated in regions where it is not easily removed. If the system has been dehydrated or there is disruption in a reactant gas supply, then the transient shows a less than peak power and increases until steady state is reached. Once the system is at "steady state," power fluctuates depending on operating conditions and nature of construction. Thus, an ability to manage water formation and its effect on reactant gas distribution throughout the reaction layer is useful for successfully operating fuel cells.

Consequently, it is useful that a control process take account of these effects and incorporate control filtering or a control law that does not result in instability.

Figure 29:
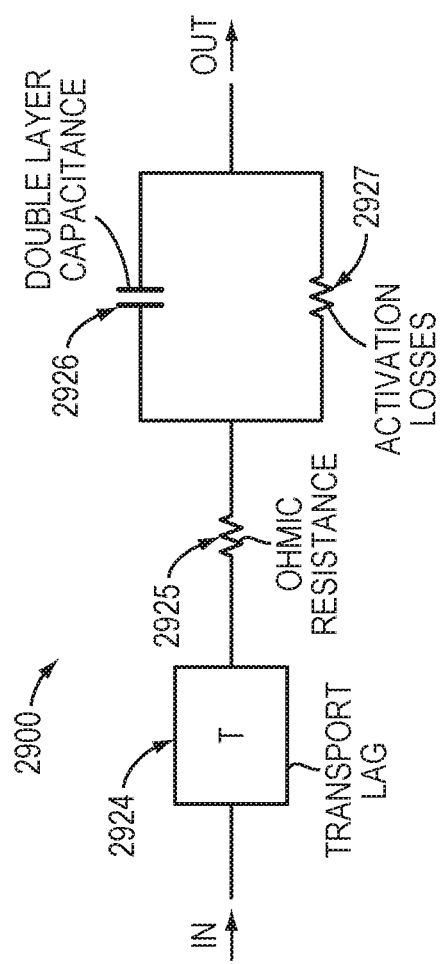
FIG. 29 is a schematic diagram illustrating a typical transfer function of a fuel cell.

FIG. 29 is an electrical model of a fuel cell illustrated as an equivalent circuit 2900 in a general form. In addition to a transport lag 2924, there is typically an ohmic source resistance 2925, a second resistance 2927 associated with activation losses, and a capacitance 2926 resulting from the charge double layer at the electrodes.

Voltage Servo-loop Structure

In some embodiments, a feedback filter or control law in the form of circuit elements or software, for example, may be used to compensate measured current by an inverse of a transfer function of the fuel cell or aggregate transfer function of multiple series or parallel fuel cells in order to optimize or otherwise operate a control loop. Characteristics of the fuel cell or other power cell device may be established through characterization of the device across temperature, humidity, pressure, and load, and incorporated into Digital Signal Processing using established methods of control theory and digital signal processing (DSP). Non-DSP devices and techniques may also be employed. Sensors may be employed in the system to provide measures of, for example, temperature and humidity values, and these values may be used to index arrays of coefficients for the DSP filter or other control law. The coefficients may be tuned adaptively, such as by means of a neural network, in which improved operation of the fuel cell under each set of ambient conditions alters linkage of neural network nodes (i.e., series-column and multiple parallel columns of fuel cells).

Figure 30:
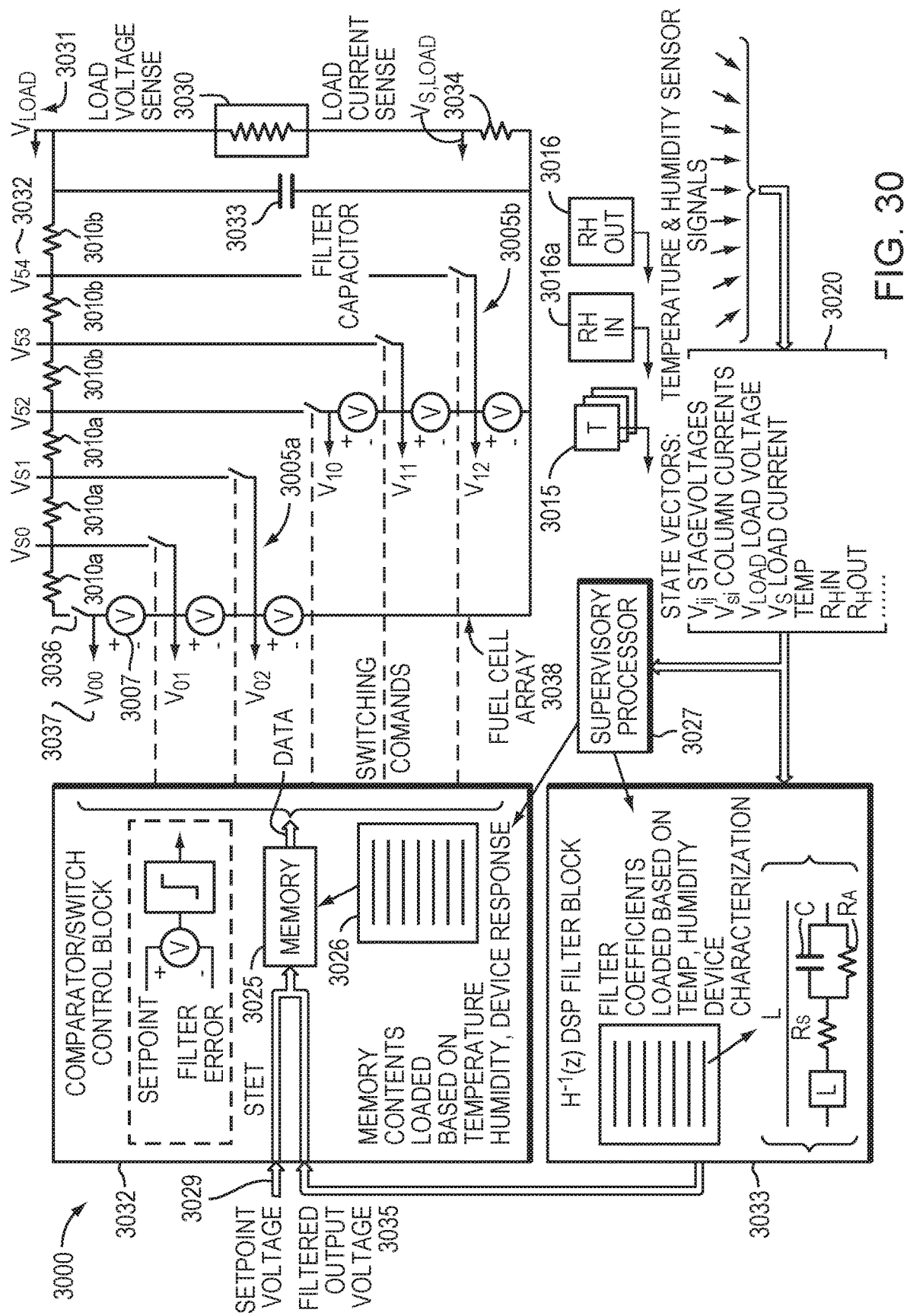
FIG. 30 is a block diagram of an example closed loop control system used to accomplish voltage regulation and optimal fuel usage for an array of fuel or power cells.

FIG. 30 is a block diagram of an example control structure to control an array of fuel cells 3038 or other forms of power cells. There may be a set-point voltage 3029 which the array 3038 delivers to a load 3030 of time-varying impedance. The voltage delivered to the load by the array 3038 may be sensed 3031 and fed back to switching logic 3032 through an appropriate filter 3033 or state space equations. This filter may operate with an input state vector 3033, including voltages sensed at various points 3037 in the array of fuel cells 3038. The input state vector 3020 may include states in the form of analog or digital representations from temperature sensor(s) 3015 and relative humidity sensors 3016a, 3016b. The DSP filter block 3033 may operate on the state vector 3020 by applying a matrix operation following customary practice, where a matrix (not shown) applied to the state vector 3020 during the matrix operation may represent an appropriately modified inverse of a discrete transfer function, H(z), describing the fuel cell array 3038 and, in some embodiments, may also account for a model of the load 3030, as understood in feedback control systems arts.

A resulting filtered output ("command") voltage 3035 from the DSP filter block 3033 and the set point voltage 3029 are together presented to the switching control block 3032, which may be conveniently implemented as a memory array in which addresses may be a function of the filtered output and set-point voltages, and data 3026 in the memory 3025 may be binary words used to control which switches 3036 in the array 3038 are on (i.e., closed) and which are off (i.e., open). In one embodiment, for example, each combination of command and set-point voltage values 3035, 3029 is mapped to exactly one location in the memory 3025, and that location contains a bit pattern (not shown) of which switches 3036 are on and which are off. The contents of the memory array may be refreshed or modified under control of a supervisory processor 3027 running a supervisory control process that controls temperature, output humidity, and other factors as noted below. The contents of the memory array may also be received from an external system (not shown).

The comparator switch control block 3032 may execute a switching process using a specific sequence of instructions executed in a computer, combinatorial logic, parallel implementation of combinatorial logic implemented in logic gates, and so forth, which may be implemented in the form of both a coarse loop, which switches the number of series components as a function of both load voltage 3031 and load current 3034, and a fine loop, which switches the number of parallel columns 3005a, 3005b active in the array 3038. The fine loop may add columns 3005a, 3005b when the filtered load voltage 3035 drops below a threshold and may remove columns 3005a, 3005b when the filtered load voltage 3035 rises above a threshold. If the system departs by more than some tolerance from an optimal or other point on the V-I curve from an energy-efficiency point of view, for example, or if it approaches a state where most of the parallel columns 3005a, 3005b are in use, then an additional row of series elements 3007 can be switched into the circuit in accordance with the coarse loop. Similarly, if the system is too lightly loaded, then a row can be removed by the coarse or fine loops.

Route Around Failed Cells

Occasionally, an individual fuel cell degrades or fails. In a series-connected column 3005a, 3005b, the total column voltage is the sum of the individual voltages of the cells at whatever current is passing through them. Since the current is the same in each, it is the current corresponding to the lowest-performing cell in the column. This situation can be detected by means of small, current-sensing resistors 3010a, 3010b in each column 3005a, 3005b of FIG. 30 to produce respective voltages 3032', or, alternatively, by sensing voltage 3037 at multiple points in the columns 3005*a*, 3005*b* and checking for uniformity. If significant non-uniformity is detected, then it is likely that one or more cells 3007 are dissipating excess energy, and the switch control block 3032 can remove them from use by "delisting" an entire row from its memory 3025, for example, as long as other columns available can meet the electrical current demand. Other techniques, such as requiring use of fewer series-column cells but using more columns, if available, may also be possible, depending on which cell in the series column is faulty.

Many applications of interest may include a battery or a capacitor to handle peak loads that exceed the capacity of the fuel cell array which must meet average load, or to meet transient requirements that exceed the response time of the cells. If the peak/average ratio of the load profile is small, then a capacitor 3038 can support transients, as shown in FIG. 26. If the peak/average ratio is high (as for example with a hard disk, or a sensor which communicates by radio every so often), then a rechargeable battery can support the peak periods in which the active surface area of the array is not sufficient to provide the peak current load. In this case, care may be taken to manage the charge/discharge cycle or the battery properly. Most battery types can support a limited number of charge/discharge cycles. The battery may thus discharge through a number of cycles before being recharged. In order to maximize battery life, this number should be as large as possible, given the excess fuel cell capacity available to recharge (i.e., peak energy and peak frequency vs. fuel cell capacity excess over non-peak load). The control process may monitor battery voltage and determine the recharge point based upon either predetermined parameters or recent historical behavior of the load.

Figure 31:
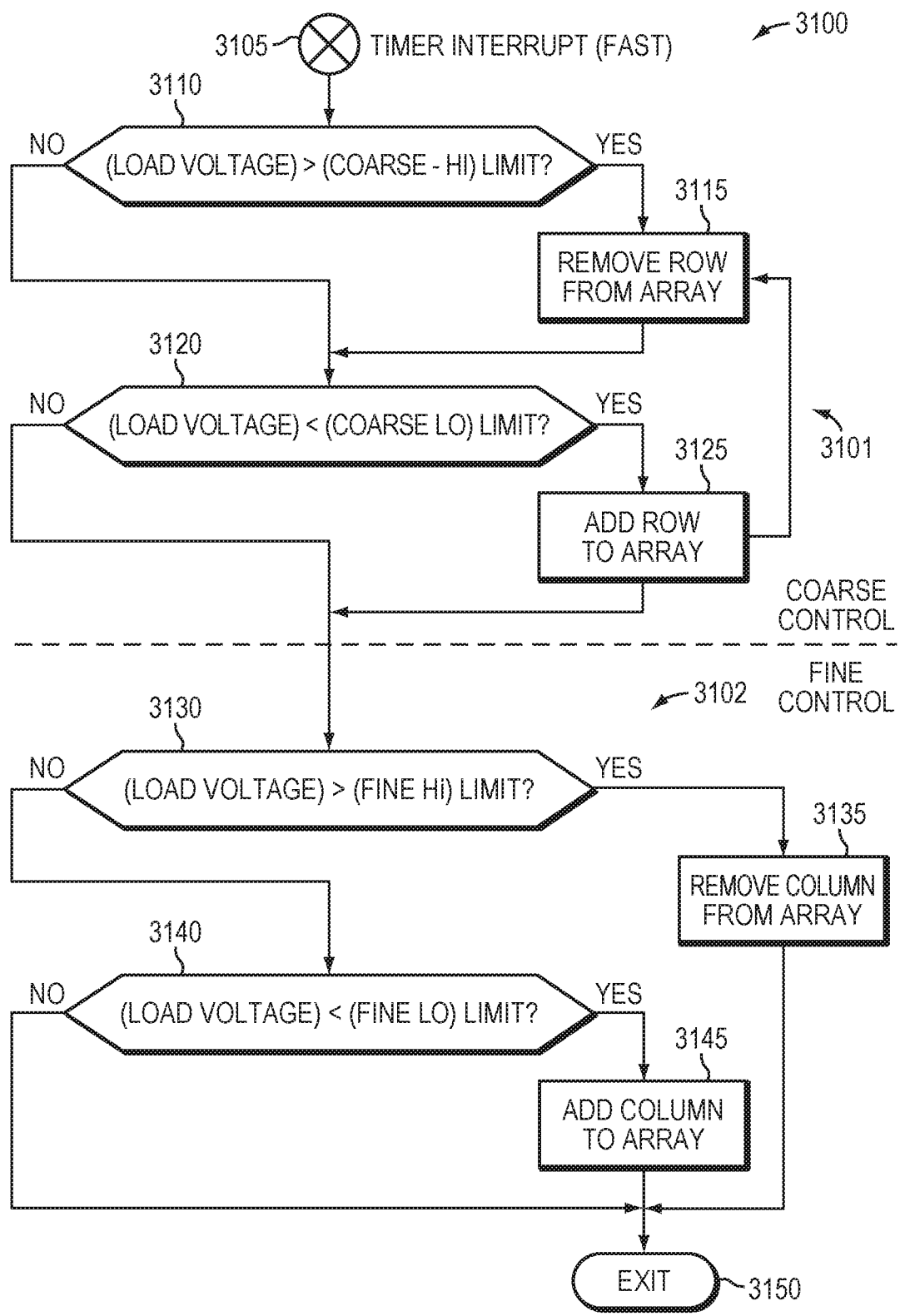
FIG. 31 is a flow chart of an example control process incorporated into a control system used to operate power cells, such as fuel cells.

FIG. 31 is a flow chart showing features of an example control process using example coarse and fine control loops. After a timer interrupt of a "fast" timer, which causes repeating the control process 3100 at a relatively fast rate, the process 3100 starts (3105). It should be understood that other forms of interrupts, such as on-demand and/or an event driven interrupt, may also cause the process 3100 to start. In a coarse portion 3101 of the process 3100, determinations are made with regard to large changes in current (or voltage) with which to drive a load. This entails removing rows from an array (3115) or adding rows to the array (3125) based on whether the load voltage is sensed as exceeding a high limit (3110) or being less than a low limit (3120). In a fine portion (3102) of the process 3100, determinations (3130, 3140) are made as to whether to remove (3135) or add (3145) parallel columns from or to the array, respectively, to remove or add current by fine amounts. The process 3100 ends (3150) thereafter.

Temperature/Humidity Servo-loop Structure

Further servo-loop considerations arise from a variation of the V-I curve with temperature, pressure, and humidity. For example, in many applications, it is preferable that air output from a Hydrogen-air fuel cell be at a humidity and temperature that does not result in condensation of vapor into water. Accordingly, a control process may first check output humidity, and, if it is too high, raise the operating temperature set-point which, for the same water output, lowers Relative Humidity (RH). Lowering the relative humidity can be accomplished by generating the same power from fewer fuel cells, which can be effectuated, for example, by altering the data 3026 in a look-up table (not shown) in the memory 3025 of the control block 3032 of FIG. 30. A separate loop may then compare the operating temperature to its set-point and make adjustments to the table, accordingly. However, fuel efficiency may best be served by keeping the operating temperature as low as possible by minimizing internal resistive losses. The temperature set-point is thus driven by the control process to be as low as possible unless this creates a humidity problem.

With some fuel cell structures, there may be an optimum concentration of power (i.e., quantity of active cells), driven by increased dissipation with increasing power versus less dissipation with higher temperature.

Basing a control loop on concentration of power can be used both to increase temperature during start-up and to maintain optimal temperature during operation. If the system is operating below its current sourcing capacity, then the control system optionally cycles through the various available columns, so the columns remain at a reasonable, uniform, average temperature.

Figure 32:
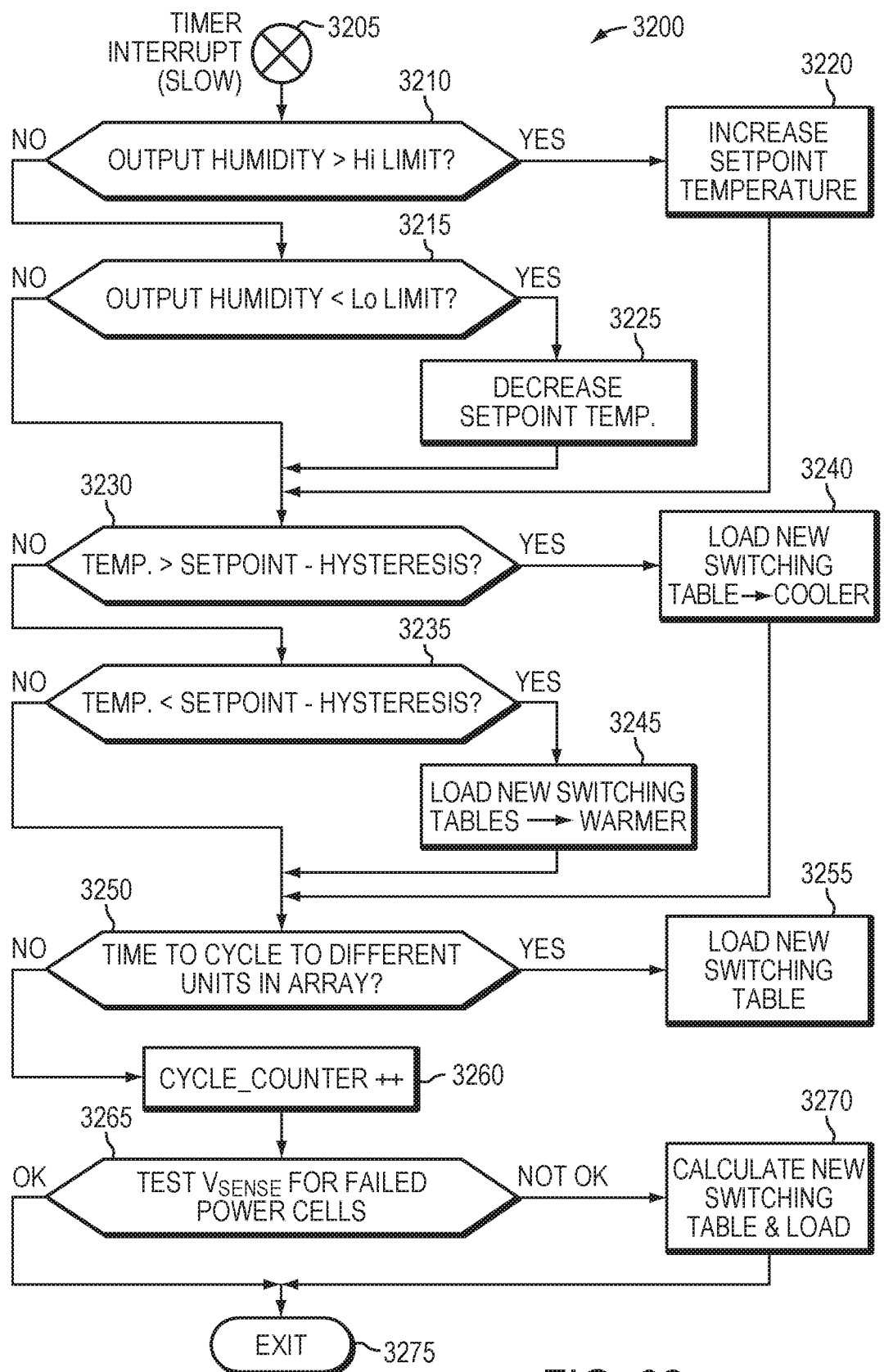
FIG. 32 is a flow chart for the control process of FIG. 9, incorporating adaptation for temperature, humidity, pressure, and device failure.

FIG. 32 is a flow diagram of an example process to change operating parameters of an array of fuel cells based on temperature or considerations presented immediately above. FIG. 32 is a flow diagram of a process 3200 that occurs at a slower rate that the process 3100 of FIG. 31. Referring to FIG. 32, a timer interrupt (slow) or other form of interrupt (3205) starts the process 3200. A determination is made as to whether an output humidity is greater than a high limit (3210). If the output humidity is less than the high limit (3210), the process 3200 compares the output humidity to a low limit (3215). If the output humidity is greater than the high limit (3210), the process 3200 increases a set point temperature (3220) to reduce the output humidity. If the output humidity is less than the low limit (3215), the process 3200 attempts to decrease the set point temperature (3225).

The process 3200 may also be configured to monitor the temperature at a set point plus, optionally, hysteresis of a temperature (3230). If the temperature is less than the set point (plus hysteresis), the process 3200 determines whether the temperature is less than the set point (minus hysteresis) 3235. If the temperature is greater than the set point (plus hysteresis) (3230), a new switching table to cool the power cells may be loaded (3240). If the temperature is less than the set point (minus hysteresis) (3235), the process 3200 may load a new switching table to cause the power cells to warm (3245) by driving the load. As previously described (i.e., less or more catalyst surface area), to warm or cool the power cells typically means that fewer or more power cells are used to drive a load.

The process 3200 may also include rotating banks of power cells or columns of power cells to drive a load. A determination of whether to cycle to different units in the array may be made (3250) through use of an internal clock or counter (not shown). If it is time (3250), the process 3200 may load (3255) a new switching table in a processor or storage area that is accessed to determine which power cells to use for driving the load. If it is not time to cycle to a different unit in the array (3250), the process 3200 increments a cycle counter (3260). Thereafter, the process 3200 tests or reads a voltage, $V_{sense}$ for failed power cells. If the power cells are determined to be functioning properly such as by monitoring an output current or voltage (3265), the process 3200 exits (3275). If the power cells are determined to be faulty (3265), the process 3200 calculates a new switching table and loads it (3270). The process 3200 exits (3275) after that.

It should be understood that the flow diagrams of FIGS. 31 and 32 are merely examples. The number of decisions, order, flow, or other aspects of the flow diagrams may be modified, changed, or otherwise set forth without departing from the scope of the example embodiments of FIGS. 31 and 32. Moreover, it should be understood that the flow diagrams may be implemented in hardware, firmware, or software. If implemented in software, the software may be written in any form of software and executed by any processor suitable to work in the context of the power generation as disclosed herein. It should also be understood that the software can be implemented in the form of instructions stored on any form of computer readable medium, such as RAM, ROM, magnetic or optical medium, and so forth loaded by a processor, and executed to cause the processor to perform the processes 3100, 3200 or variations thereof as understood in the art.

Rotation of Cells to Improve Life

A further set of decisions to consider in operating an array of fuel cells or other power generating cells may be made based on a time or time-integral of power (energy) basis to rotate active cells among a larger quantity available in an array of fuel or power cells. Rotation of active cells logic is typically executed at a less frequent rate than the voltage control loop of FIG. 31.

Power Optimization

As described in reference to FIGS. 30 and 31, a coarse voltage control loop, which changes the number of cells or banks of cells in series, can be operated in combination with a fine voltage control loop which changes the number of columns of cells or banks of cells in parallel, to control aggregate output power by an array of power cells. A reason for this choice of control of the array may be the following. A typical voltage range per device may be from 0.9 volts open circuit potential to about 0.4 volts at maximum output, and typical current may be 1 milliamp or less, depending on Reactive Surface Area (RSA) in the case of fuel cells. In this situation, series switching of power cells in a column may be best used as a coarse adjustment, and parallel switching of columns may be best used as a fine adjustment. Implementation of coarse and fine control loops is described immediately below in reference to FIGS. 33 and 34.

Figure 33:
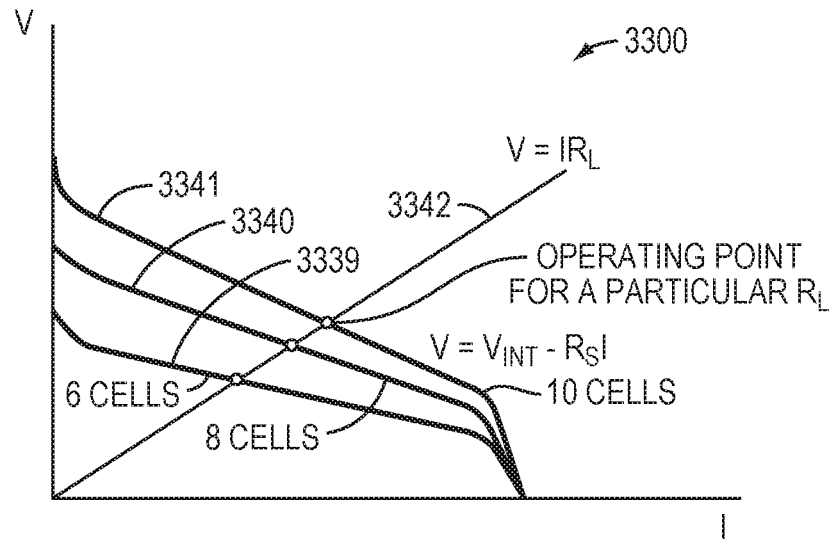
FIG. 33 is a plot that indicates how the V-I curve of an aggregate array of fuel cells varies with the number of series-connected fuel cell devices in a column.

FIG. 33 is a plot of multiple V-I curves that vary with the number of fuel cells in series combination (i.e., a column). Current through each cell in the series is the same, and the voltage adds. The V-I curve may thus be translated upward, and its slope increases because of additional source impedance introduced by each series element. Curves 3339, 3340, and 3341, in that order, represent an increase in a number of series cells. A line 3342 represents load voltage versus current according to Ohm's law, $V=IR_L$, for a particular value of load resistance $R_L$. The intersections of this line 3342 with the V-I curves are the respective operating points for that load resistance. So, addition of fuel cell(s) in series, while the load remains constant, changes the voltage and current from, for example, the intersection of load line 3342 with V-I curve 3339 to the intersection of the load line 3342 with curve 3340.

Figure 34:
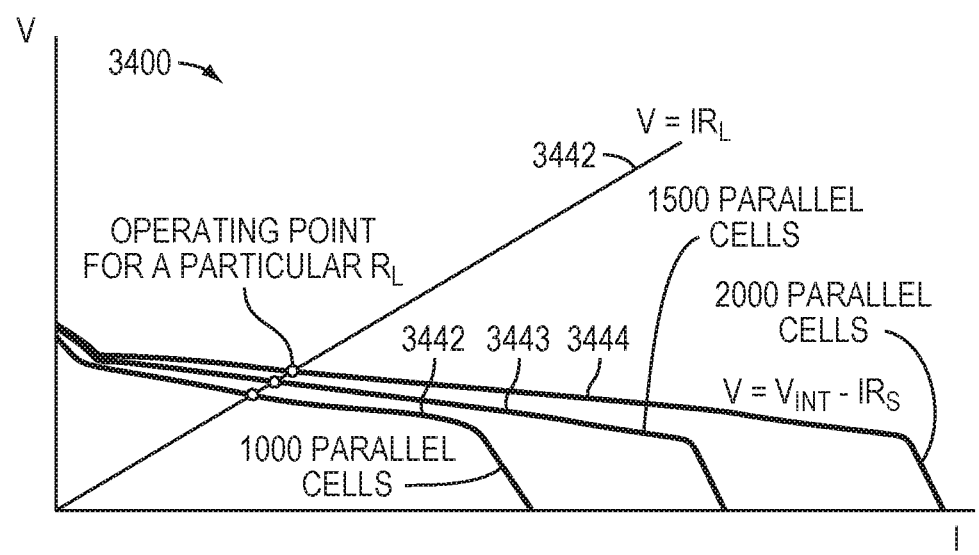
FIG. 34 is a plot that indicates how the V-I curve of an aggregate array of fuel cells varies with the number of parallel-connected fuel cell devices in a row.

FIG. 34 illustrates an effect of stacking the cells in parallel. Curves 3442, 3443, and 3444 represent increasing a number of cells in parallel. In this case, the load voltage 3442 is the same, and the current increases through the reduced source impedance.

Since the number of series devices is typically small (e.g., four to six for a 3.3 volt supply), whereas the quantity in parallel is large (e.g., 1000 for a 1 ampere supply), the change in voltage resulting from adding a column is typically far less than the change in voltage from adding a row, allowing tighter regulation.

Beyond simple voltage regulation, the system may make optimal use of energy stored in the fuel by operating the system efficiently.

Figure 35A:
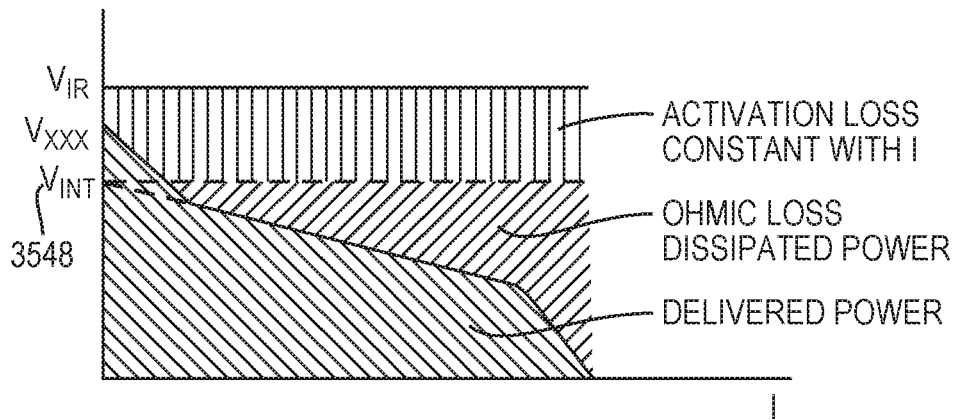
FIGS. 35A and 35B are plots that indicate total power generated, internal power dissipation, power delivered to the load, and power efficiency for a typical V-I curve.
Figure 35B:
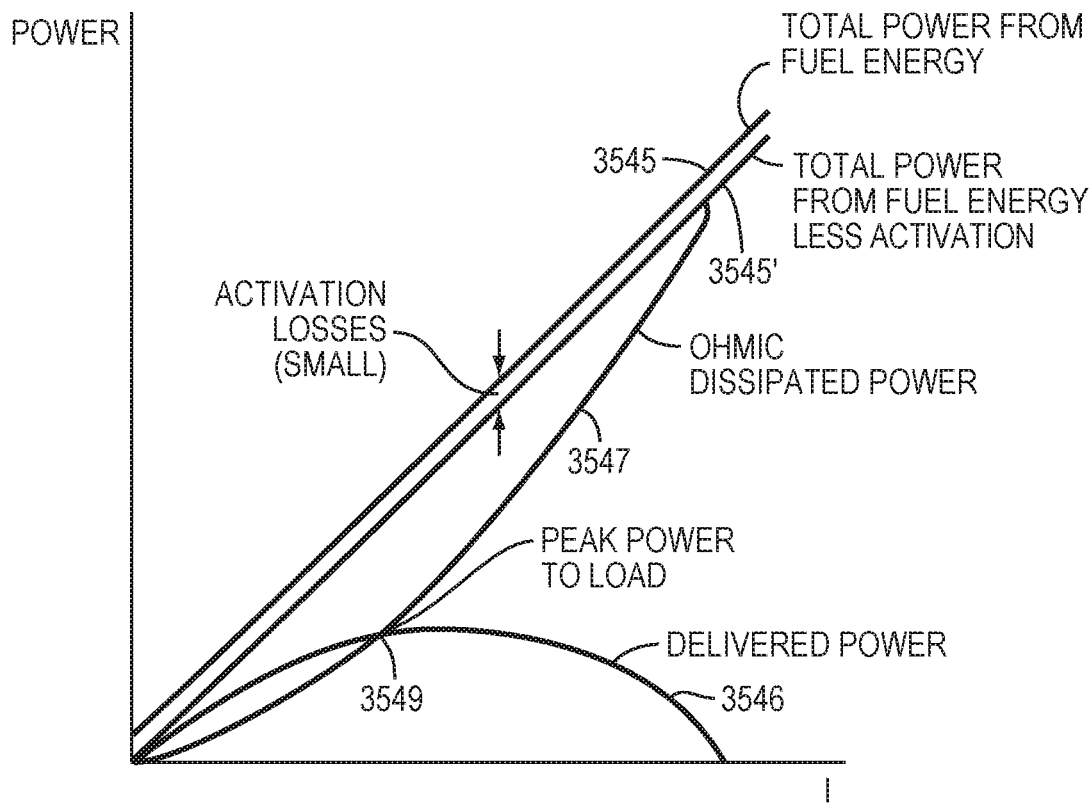

FIGS. 35A and 35B are plots that illustrate an example relationship between operating point, delivered power, and dissipated power. FIG. 35A is essentially a repeat of the V-I curve shown in FIG. 24. FIG. 35 B shows total power 3545 generated from fuel oxidation, total power exclusive of activation losses 3545', power delivered to the load 3546, and power dissipated in the device 3547. The activation energy is assumed to be constant with current I; hence, the dissipated and delivered power are governed by $V_{INT}$ 3548, the point at which an extension of the approximately linear, resistive region of the V-I curve intercepts the V-axis.

Total power 3545 to a first approximation, $$P_{TOT}=V_{INT}I+P_{ACT}$$

Excluding activation losses $P_{ACT}$, which are small and roughly constant with current I, $P_{TOT}$ is a linear function of I with a slope of 1, as shown in the FIGS. 35A and 35B.

Power delivered to the load is $$P_{del}=V(I)I$$

$$P_{del}=(V_{INT}-R_SI)I=I\,V_{INT}-I^2R_S$$

where $R_S$=the source resistance of the device.

Power dissipated in the device is:

$$P_{diss}=P_{TOT}-P_{del}=V_{INT}I-(I\,V_{INT}-I^2R_S)$$

$$P_{diss}=I^2R_S$$

For devices having a V-I curve as shown in FIG. 35A, the delivered power is quadratic in current and downward-concave, producing a maximum delivered power at a point 3549, where $P_{del}=P_{diss}$.

Optimum Power: Minimize Current per Cell

Dissipated power is quadratic in current and upward-concave, indicating that the lower the current, the less dissipation that occurs. But, lower current means proportionally more devices are required. Optimum efficiency is the ratio of delivered power to total power. Efficiency thus decreases monotonically with current.

As a practical matter, operating stability and other design factors may result in choice of a slightly higher current operating point, depending on the detailed characteristics of a particular device, which are not part of the simple model above. In a practical system, optimum efficiency may also be limited because the less current per device, the more devices and, therefore, the more cost associated with the system.

Optimum Power: Switch Smallest Possible Increments

Figure 36A:
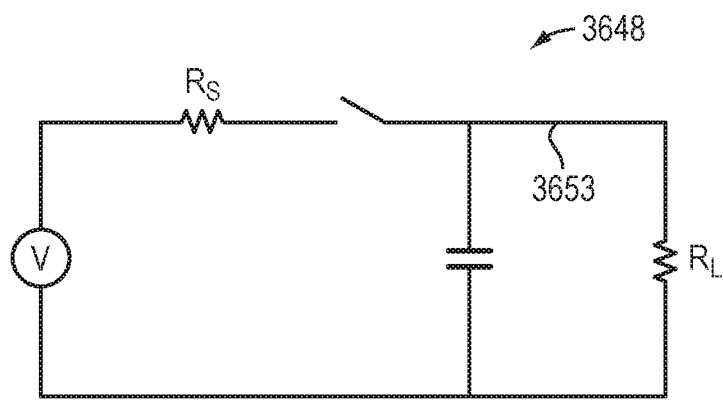
FIGS. 36A and 36B are a circuit schematic diagram and corresponding functional plot of current, respectively that illustrate energy lost through repeated on-off switching of a power cell to maintain an intermediate average value.
Figure 36B:
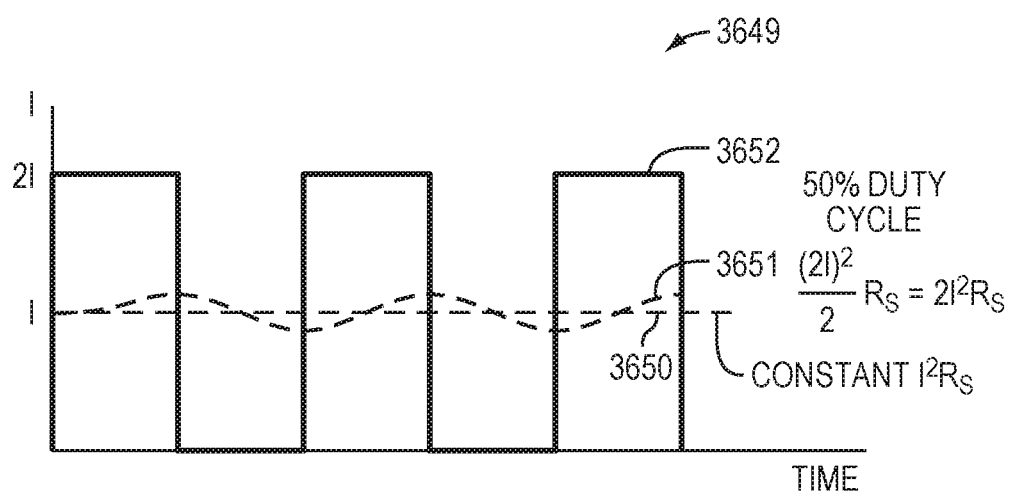

FIGS. 36A and 36B are a circuit diagram 3648 and current waveform 3649, respectively, that illustrate another lesson that may be drawn from the quadratic nature of the dissipated and delivered power. In a situation where a device is switched on and off at a 50% duty cycle to deliver average power VI by alternating between zero current and 2I current for equal time intervals, the power dissipated during the on times is four times as much for half the time, or twice as much on average. First, consider a constant current output 3650, which delivers power I2RL, and dissipates power I2Rs. Now, consider curve 3652, in which the source current to a filter capacitor is switched between 0 and 2I with a fifty percent duty cycle. The average current delivered to the load 3651 is still I, and varies only slightly at the filter capacitor output 3653. However the dissipated power is:

Pdis=(2I)2Rs/2=2 I2Rs, which is twice as much as the constant current output (3650).

In other words, in order to minimize power consumption, the control process switches as few devices as possible to maintain the set-point voltage. The example control process disclosed above does that.

Further, it follows that the smaller the individual devices, or the groups of devices which are independently switched, the more efficient the system is in its conversion of energy.

Multiple Voltage Outputs

Figure 37:
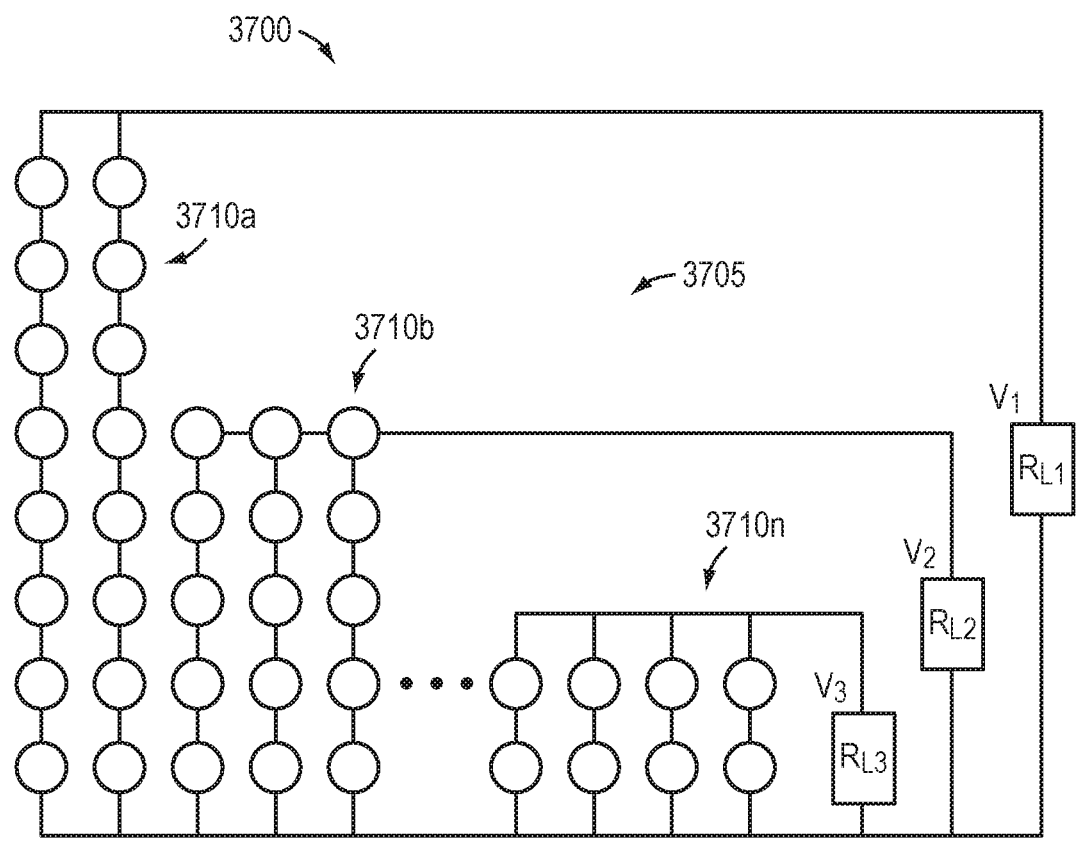
FIG. 37 is a switching topology of a fuel cell array configured to supply multiple, independently regulated voltages.

FIG. 37 is a topology of a multi-voltage supply 3700 formed from a power (e.g., fuel) cell array 3705 configured as multiple subarrays or banks 3710a, 3710b, . . . , 3710n. The multi-voltage supply 3700 is an extension of the disclosed structure, which useful in electronic devices which require multiple voltages. A modern cell phone or laptop computer, for example, contains multiple voltage regulators to provide different voltages to the display, logic hard disk, RF devices, etc. An array of micro fuel cells or other power generating cells can easily be configured to deliver such multiple voltages without incurring the power dissipation, heat generation, board cost and separate component cost associated with a conventional power conditioning system in a phone or laptop. It should be understood that the fuel cell array 3705 may be configured with extra banks (e.g., 3710n-2, 3710n-1, and 3710n) to provide redundancy, where the extra banks may be configurable to provide any of the voltages provided by primary banks. Moreover, all of the banks 3710a-n may be configurable to supply any voltages to allow for rotation of the banks for longevity purposes.

Current Source, AC Power Source, Audio Power Amplifier

Several further extensions of the basic structure are also possible: the system may be configured to maintain constant current with varying voltage (i.e., a current source instead of a voltage source, which is useful for powering certain types of sensors, for example); the system may track not a constant voltage or current but instead track a time varying set-point, thus providing an AC power source, for example, at 60 Hz for back-up power to a household; or, the system may track an audio frequency signal to form a very efficient power amplifier, for example, to drive a speaker in a cellular phone. This arrangement may be the same as the arrangement in FIG. 30 except that the constant set-point voltage 3029 is replaced with a time-varying input.

Fabrication in the Power Chip

Using the MEMs structures and fabrication methods on a silicon substrate which are described in prior Marsh patents (U.S. Pat. Nos. 6,312,846 and 6,815,110), it may be cost effective to incorporate the control system described above on the same silicon substrate as the fuel cells, with minimal increase in silicon surface area. First, a series of layers may be deposited, patterned, and etched upon the substrate, following established conventional semiconductor fabrication practice, which may produce transistor switches for the power array, voltage and current sensors, and an array of gates implementing the control process. Alternatively, a structure comprising an FPGA or embedded processor Central Processing Unit (CPU) plus memory may be employed. A Field Programmable Gate Array (FPGA) configuration or program memory may be Read Only Memory (ROM), One time Programmable (OTP) memory, or FLASH memory, as desired, depending upon the need to customize the device for different applications after manufacture. Using current CMOS fabrication methods, any of these approaches may use a silicon area, which is small compared to a 1 cm2 fuel cell array, and can easily be built on the same silicon area under the MEMs fuel cell structures.

Hierarchical Control of Power Disks, Power Stacks

For larger power sources, Marsh (U.S. Pat. Nos. 6,312, 846 and 6,815,110) notes that a plurality of power cells may be assembled on a power disk, and a plurality of power disks may be assembled into a power stack. In this situation, a hierarchical control system may be implemented, in which each power chip is controlled in accordance with an example embodiment of the invention, but with set-points determined by a similar control system that operate at the power disk level upon the individual power chips. Similarly, a plurality of power disks may be controlled to optimize their aggregate power output when they are assembled into a power stack.

Power Amplifier

Figure 38:
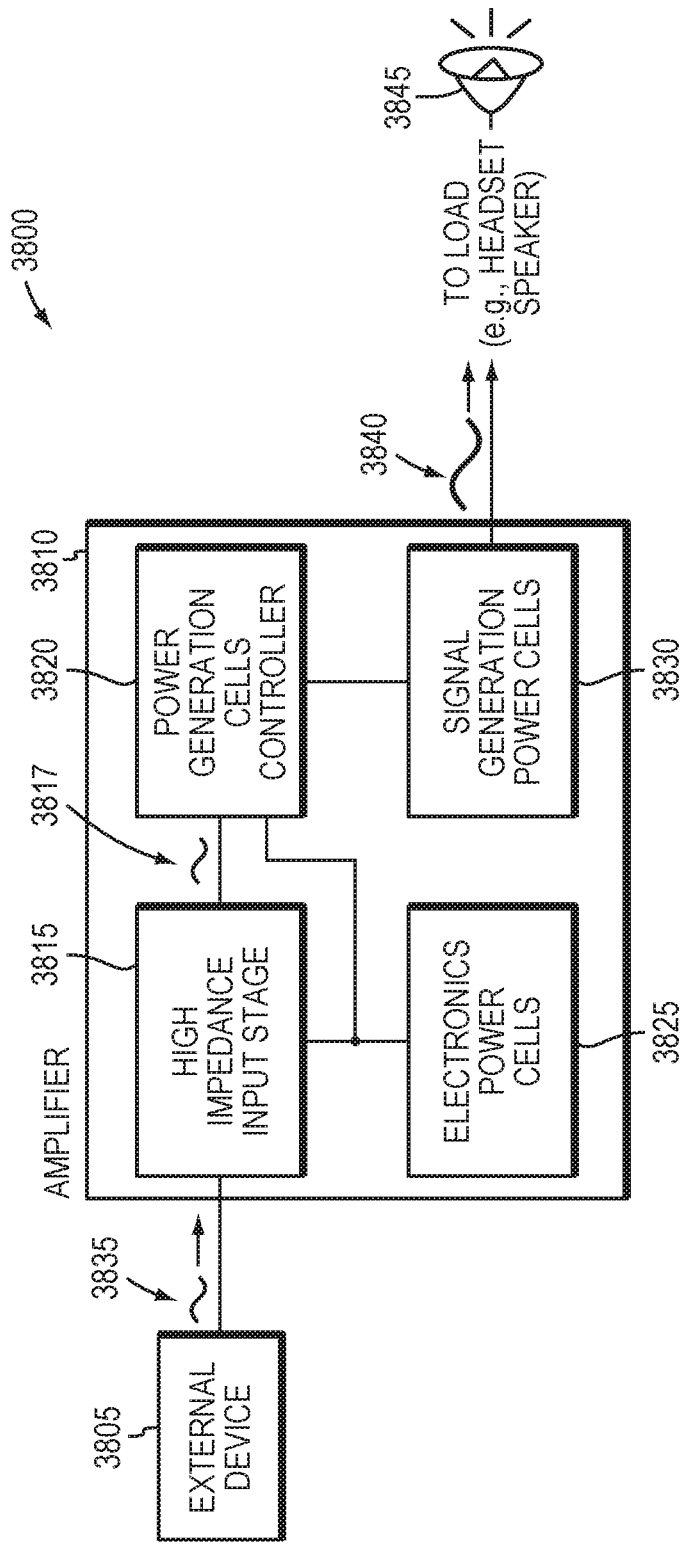
FIG. 38 is a block diagram of an array of power cells used to generate power in a power amplifier configuration.

FIG. 38 is a block diagram of a system 3800 using power generators to perform a function of an amplifier that would normally use voltage rails. In this example, an external device 3805 produces a low level voltage signal 3835 received by the amplifier 3810. The amplifier 3810 includes a high impedance input stage 3815, power generation cells controller 3820, electronics power cells 3825, and signal generation power cells 3830. The modules 3815, 3820, 3825, 3830 are interconnected in any typical manner understood in the art such as through integration on a single silicon wafer and interconnected as previously described above. The high impedance input stage 3815 and power generation cells controller 3820 are powered by the electronics power cells 3825 which provides sufficient power to operate the electronics in the amplifier 3810. The high impedance input stage 3815 provides a representation 3817 of the input waveform 3835 to the power generation cells controller 3820, which, in turn, controls the signal generation power cells 3830 in a manner to produce a voltage or current waveform 3840 as an amplified form of the input waveform 3835. The output waveform 3830 may be used to drive a load 3845, which may be a headset speaker in a cell phone, for example, or other form of load having electrical characteristics suitable to be driven by the example amplifier 3810.

Figure 39:
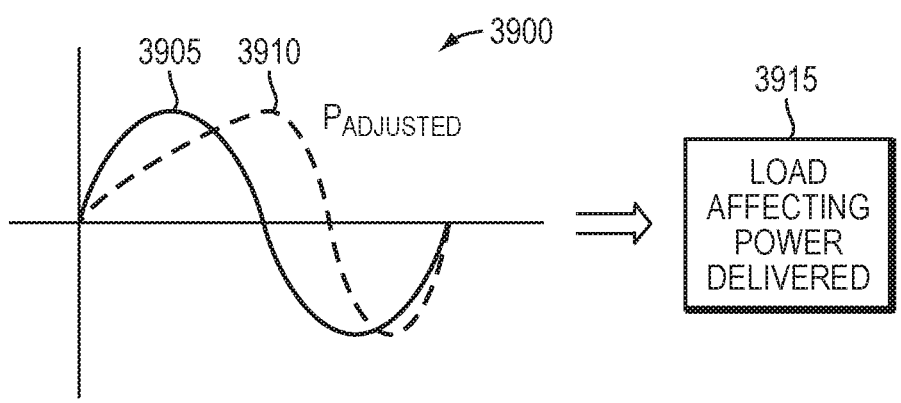
FIG. 39 is a block diagram illustrating an output waveform generated by an array of power cells controlled to adjust an output power to compensate for effects of a load.

FIG. 39 is a diagram of a pair of waveforms 3900 that illustrate an example use of the power generation cells that are controlled to produce a waveform. The pair of waveforms 3900 includes a sinusoidal power waveform 3905 and an adjusted power waveform 3910. The adjusted power waveform 3910 is produced in a shape that compensates for effects of a load 3915 waveform 3905. It should be understood that the adjusted waveform 3910 is merely an arbitrary example of an adjusted waveform that is not necessarily to scale or expected to be implemented in practice. It is should also be understood that the adjusted waveform 3910 may be used for purposes of improving a power factor or power quality as understood in the power delivery arts.

Figure 40:
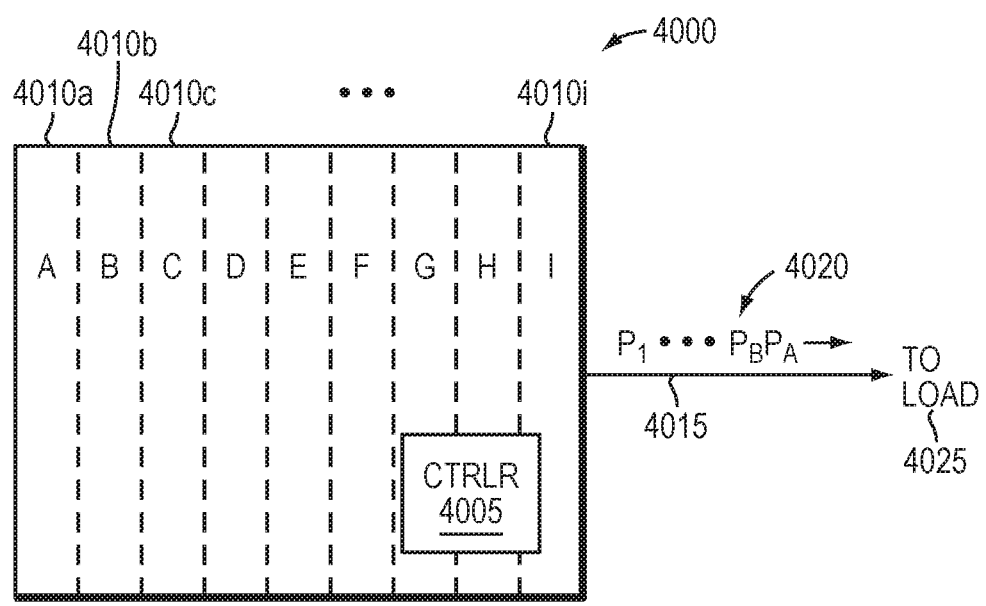
FIG. 40 is a block diagram of an example array of power cells having zones sequentially or otherwise selected to deliver power to a load.

FIG. 40 is a block diagram of an array 4000 of power cells (not shown) having A-I columns of power cells 4010a, 4010b, 4010c, . . . 4010i. The array 4000 also includes a controller 4005 either on a substrate integrated with the power cells or separate from the substrate with the power cells. In either case, the controller may be used to control which column(s) 4010a-i are used to deliver power 4020 via a bus 4015 to a load 4025. In other words, the controller 4005 may sequence through the columns 4010a-i or otherwise select columns of power cells to generate power 4020 to deliver to the load 4025. In the example embodiment, the controller 4005 sequentially steps from columns A-I to generate power and accordingly, the power 4020 is delivered in a corresponding order (i.e., column A 4010a has power Pa delivered first, column B 4010b next delivers power Pb, . . . , and finally column I 4010i delivers power PI).

Figure 41:
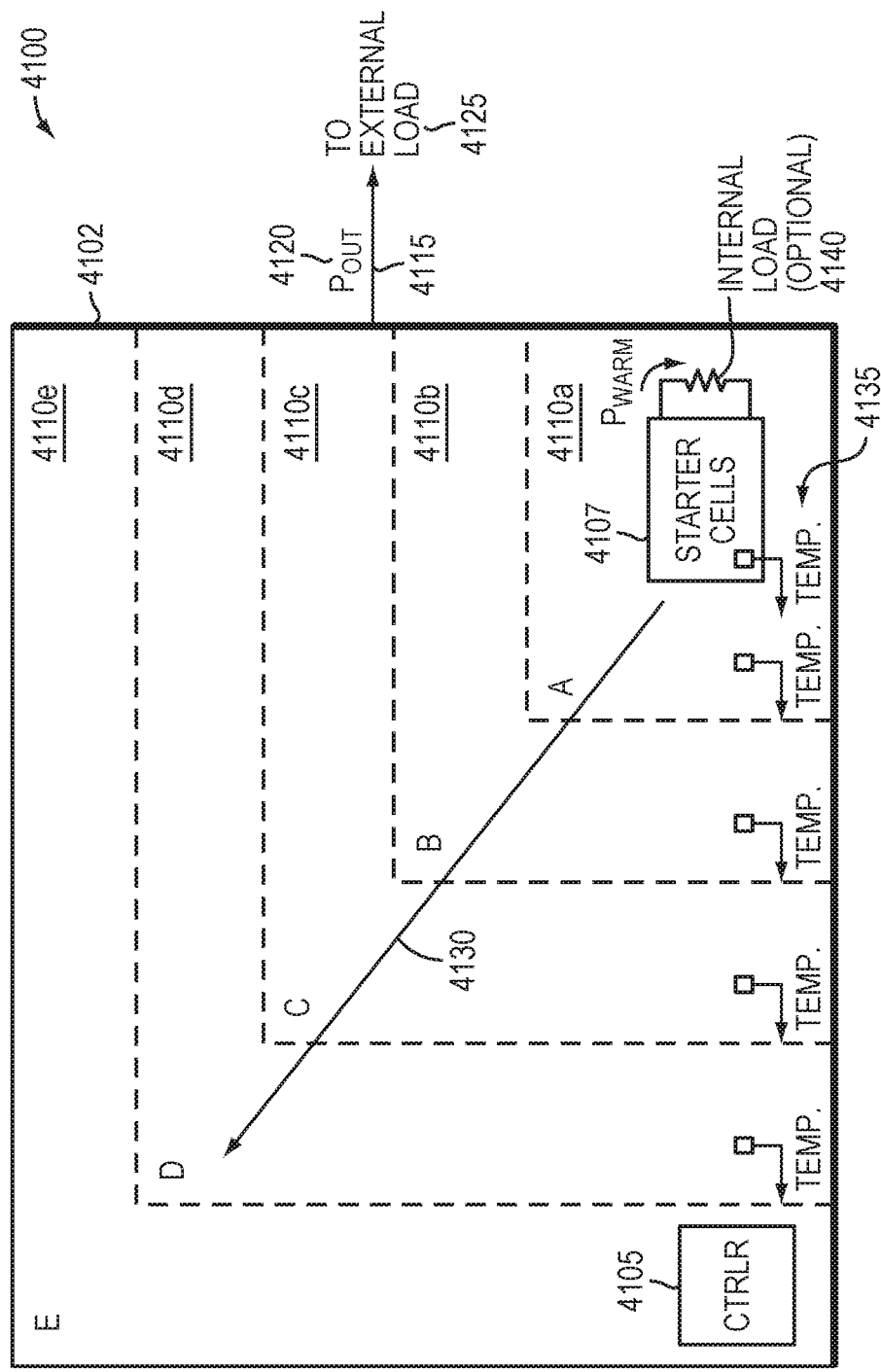
FIG. 41 is a block diagram of an array of power cells operated in a manner to warm up the power cells during an example start-up sequence.

FIG. 41 is a block diagram that illustrates a case in which a power generation system 4110 includes a controller 4105 associated with an array of power cells 4107, 4110a-e. In this example, starter cells 4107 are caused first to generate power Pout 4120 via a bus 4115 to an external load 4125 to cause the starter cells 4107 to generate heat so as to warm surrounding, and outwardly extending, power cells 4110a. Alternatively, the starter cells 4107 may be caused to deliver power Pwarm 4122 to an optional internal load 4140 on the same substrate 4102 as the array of power cells. This allows the starter cells 4107 to warm up without having to be connected to an external load 4125. It should be understood that the location of the starter cells 4107 may be set in other locations among power cells in the array 4110a-e, such as more centric to warm power cells in any of four directions.

In operation, the controller 4105 may receive temperature feedback 4135 from the starter cells. As the temperature increases, as determined by the controller 4105 as a function of the temperature feedback 4135, the controller 4105 may engage power generation cells 4110a surrounding the starter cells 4107. Then, as the surrounding cells 4110a warm, the controller 4105 may engage a next set of power cells 4110b surrounding the starter cells 4110a to engage and produce power 4120 to deliver to the external load 4125 via the bus 4115. This process may continue until all of the power generation cells 4110a-e are activated to generate power 4120 to deliver to the external load 4125.

It should be understood that the progression, as represented by an arrow 4130, may not be diagonal as illustrated but, instead, each of the zones 4107 and 4110a-e may be vertical sectors of power cells as illustrated in FIG. 40 or FIG. 30. In whichever embodiment is selected, it should be understood that the starter cells 4107 may be driven with a low efficiency to generate heat efficiently to have a rapid warm up time, and each of the subsequent subsets of power cells that are activated may also be driven with a given efficiency to have a rapid or normal rate of warming to match a given profile for starting the power cells for use in a given environment.

Figure 42:
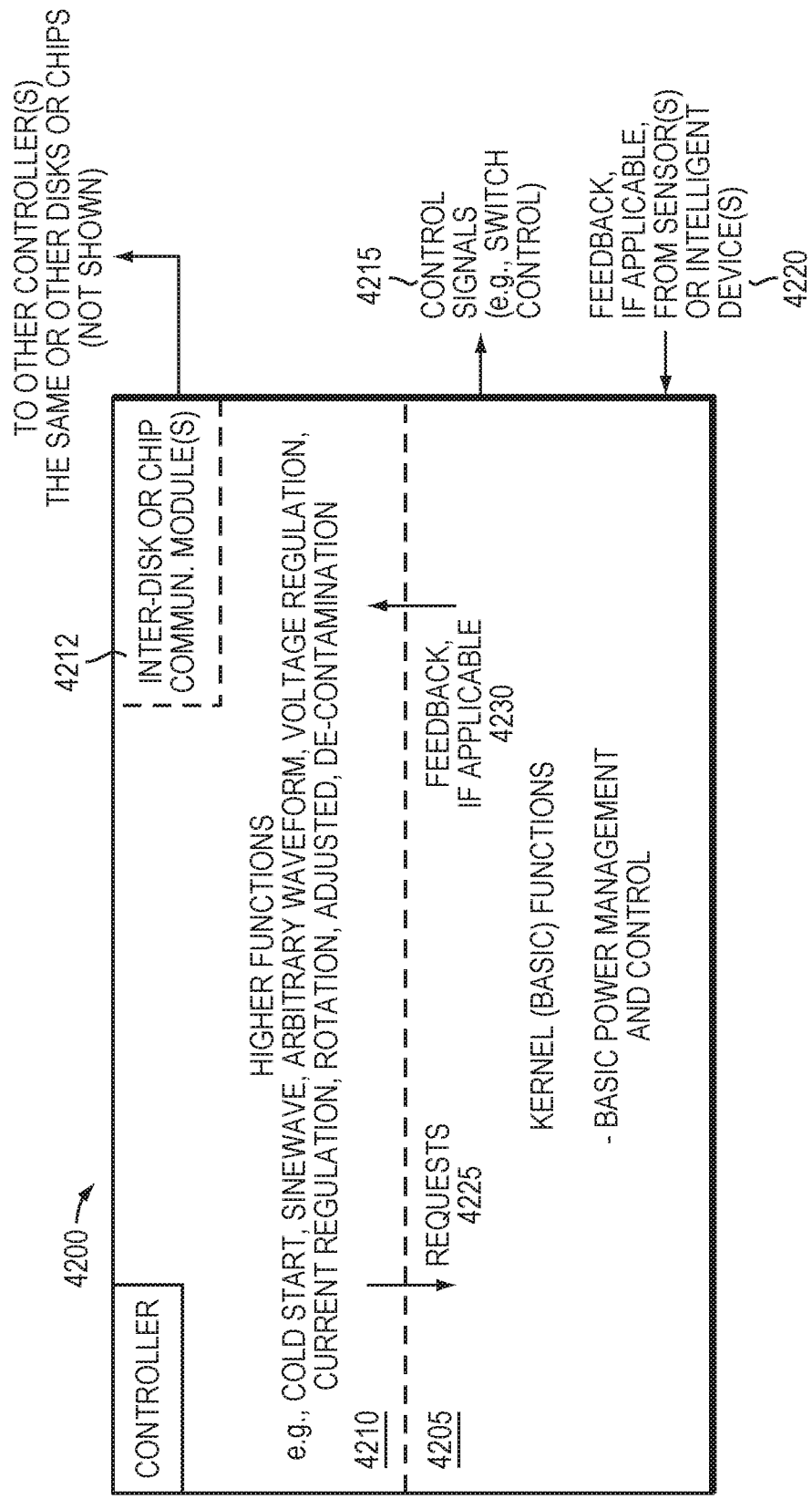
FIG. 42 is a functional diagram of a controller having kernel (basic) functions and higher functions configured to employ the kernel functions.

FIG. 42 is a block diagram of a controller 4200 with two levels of functions, kernel functions 4205 and "higher" functions 4210. The kernel functions 4205 may be basic power management and control functions that are used, for example, to map voltage levels to corresponding switch closures and also convert power requests into a number of rows in column(s) and/or parallel columns to produce the power by selecting which switches to close to configure series and parallel combinations of power cells. Other basic functions may also be employed within the kernel functions 4205.

The higher functions 4210 may include functions that provide intelligent control of the power cells. Examples of higher functions include cold start, sinewave control, arbitrary waveform control, voltage regulation, current regulation, rotation of power cells, adjustment, and decontamination. Vibration, as discussed below in reference to FIG. 43 may also be an example of a higher function as assist with accelerating correction of a "flooding" event.

In one example embodiment, the controller 4200 has the higher functions 4210 provide requests 4225 to the kernel functions 4205 to perform one of the aforementioned functions or other high level functions. In turn, the kernel functions 4205 present control signals 4215 to switches or other control elements, such as fuel or oxidant flow control elements (e.g. MEMs switches), to execute the requests 4225. Feedback 4220 may be returned to the kernel functions 4205, which, in turn, present the feedback 4230 in a form suitable for reading by the higher functions 4210. Alternatively, the feedback 4220 may be presented directly to the higher functions 4210.

It should be understood that the controller 4200 may be segmented in other ways and include other functions suitable for use with a single power cell or array of power cells.

The controller 4200 may also include inter-controller or intra-or inter-power disk/chip communication module(s) 4212 to allow multiple controllers to act in a unified or distributed manner. Inter-disk/chip communications may also provide support for redundancy or vast arrays of virtually unlimited numbers of power cells.

Figure 43:
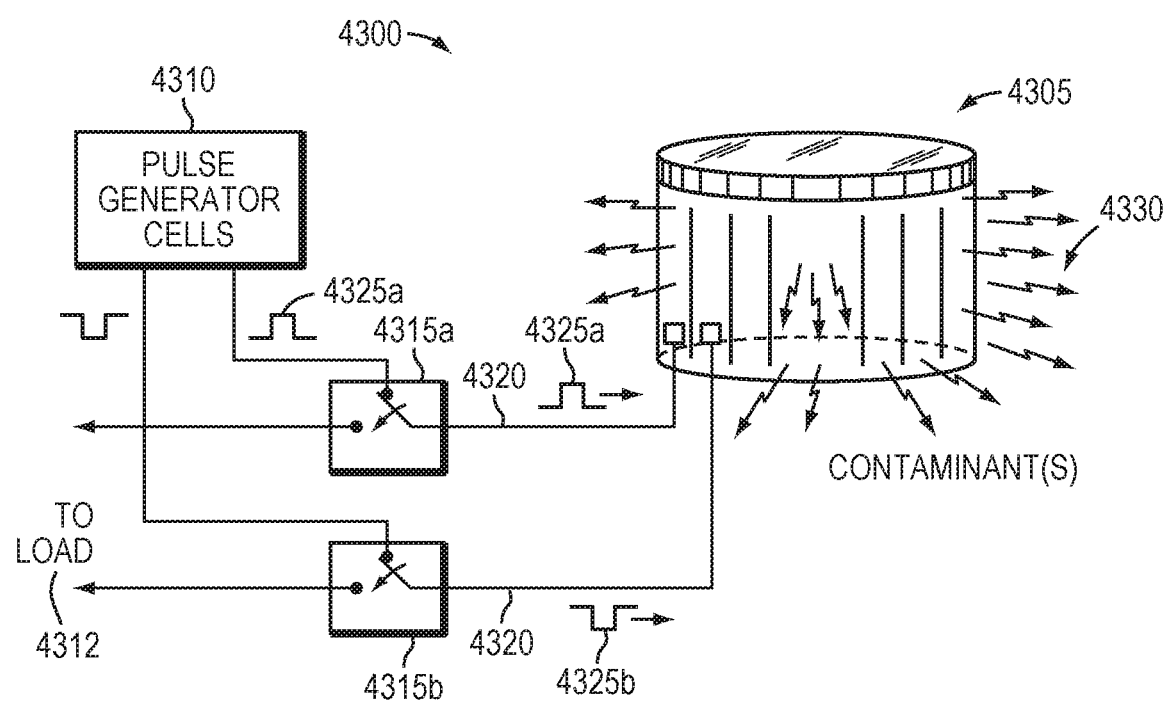
FIG. 43 is a schematic diagram of a power cell being connected to other power cells that generate a pulse or other waveform to clean contaminants from the cell receiving the pulse or other waveform.

FIG. 43 is a schematic diagram of a system 4300 that includes a power cell 4305, electrically coupled to a pulse generator 4310, formed with power cells or, optionally, an electronic pulse generator, through a pair of switches 4315a, 4315b. The switches 4315a, 4315b are utilized in this embodiment to switch the power cell 4305 from delivering power to a load 4312 to receiving a pulse 4325a or pulses 4325a, 4325b from the pulse generator 4310. It should be understood that the pulse generator 4310 may be any form of signal generator to produce a typical or atypical waveform, such as a sinewave, chirp, or other waveform.

The purpose of the pulse 4325a is to apply a voltage or current to catalyst on the sides of the walls. By driving the catalyst with the pulses 4325a, 4325b, contaminant that may have settled on the catalyst may be ejected, as represented by multiple arrows 4330 projecting outward from the power cell. It should be understood that a similar set of a multiple arrows 4330 may also be occurring inside the volume encompassed by the power cell 4305, but not shown for ease of understanding how the decontamination process works. Further, it should be understood that either pulse 4325a, 4325b may also be a reference level, such as a ground potential, to decontaminate one catalyst side more than the other.

Additionally, a 1 volt or other low voltage waveform may be used to cause a catalyst coated membrane, which may be a very thin film, used to form the power cell 4305 to vibrate. Vibration may be used to accelerate a removal of a flood condition that can impair power generation by the power cell 4305. To that end, the power cell 4305 may be specially designed in thickness, height, diameter, catalyst thickness, segmented, or other physical parameter, to increase its ability to vibrate. Moreover, vibration (or heat) may be used to increase energy for use in causing, accelerating or otherwise affecting a reaction taking place in at the power cell 4305, and the power cell 4305 may be driven at amplitude(s) or offsets at single-or multi-frequencies to improve energy delivery or reduction for a particular reaction or step in a reaction.

In terms of testing, the power cell 4305 has an electrical impedance, similar to a capacitor, since it has two "plates" (outside and inside walls of the membrane) in the form of electrically conductive catalyst. The impedance can be used for automated testing, where a controller can be employed to switch electrical paths from the power cell 4305 to pins at an edge of a power chip or disk connected to a capacitance meter. In this way, a vast array of power cells can be quickly tested or diagnosed.

Further, a control program implemented in a custom gate array or ASIC hierarchical structure in which a plurality of power cells are controlled as in an array of microprocessor generators described above and assembled to create a power disk, where similar processes control allocation of power generation to power cells on the disk. In some embodiments, the hierarchical structure in which a plurality of power disks are controlled and assembled to create a power stack, where similar processes control the allocation of power generation to power disks in the stack.

It should be understood that any of the aforementioned control filters, control laws, or alternative control laws, such as optimal control, fuzzy logic, neural networks, H-infinity control, and so forth, can be executed in the form of software in a processor to control the operation of power generation. Hardware or firmware implementations may also be employed. The control program may, in addition to the control described above, optionally be adaptive to power cell characteristics over time as individual or banks of devices age over time. The control program may also be modified or upgraded after field installation or manufacturing to give previously identical devices different operating characteristics intended for different applications.

In one embodiment, the array of micro-power generators may be configured as a hybrid system including a rechargeable battery, capacitor, photovoltaic, vibration-harvesting generator, etc. The battery charging cycle may be configured to enhance long battery life.

Electro-chemical Application of Power Cells

One embodiment of another aspect of the invention is a method of reacting reaction components. One example method includes electro-chemically reacting reaction components on opposite sides of at least one membrane encompassing a respective volume in a presence of at least one catalyst. The method referred to here can be facilitated any embodiment of power cells, power chip, power disk or power stack disclosed herein.

Figure 44:
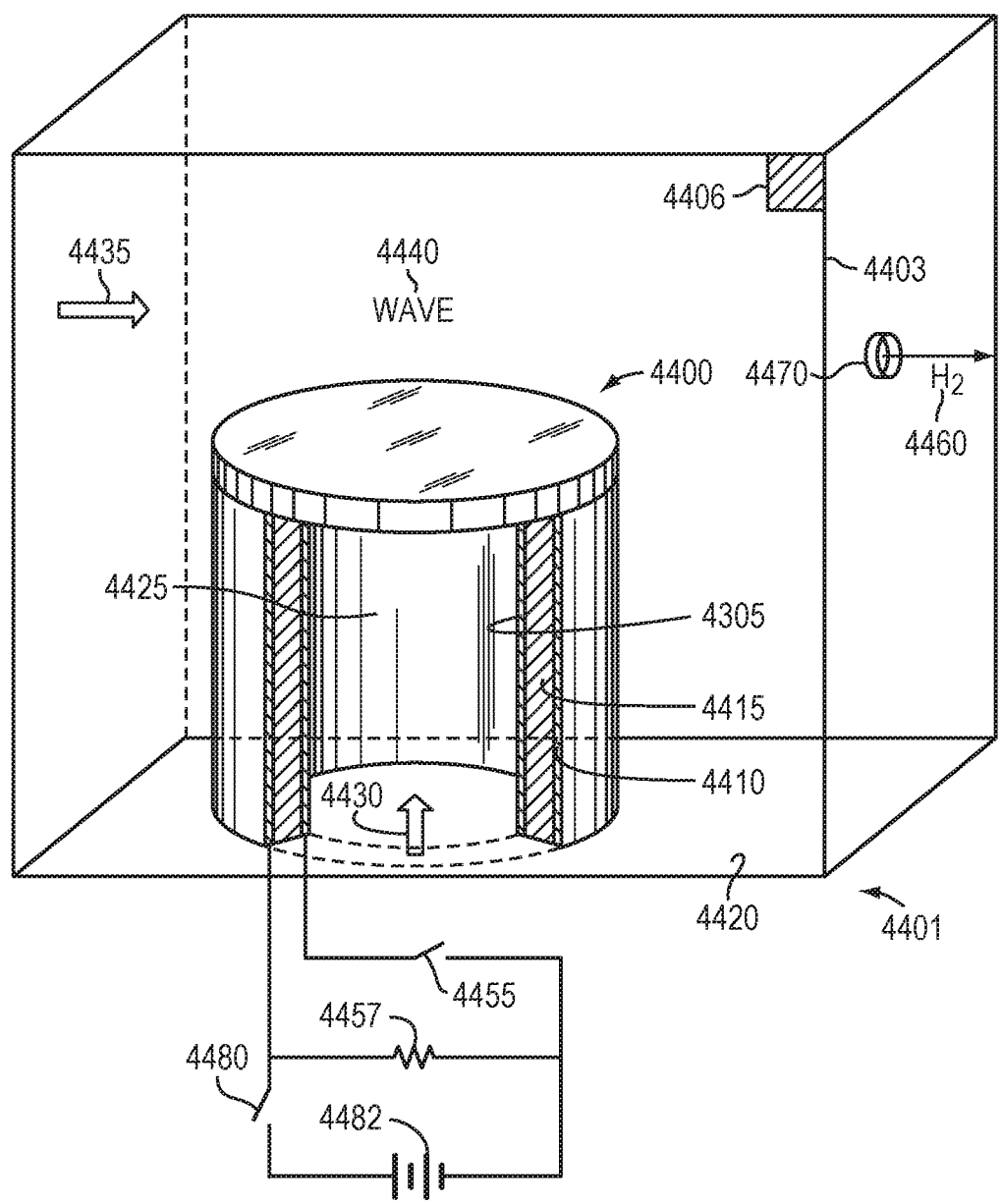
FIG. 44 is a schematic plan view of a power cell for conducting electro-chemical reaction.

FIG. 44 illustrates an example of this embodiment of the method in the invention. A power cell 4400 includes the same or similar components as the ones described above in reference to other power cells, including anode catalyst 4405, cathode catalyst 4410, and a membrane 4415 (e.g., an ion or proton exchange membrane). The power cell 4400 can be coupled to a substrate 4420, through which a reaction component can flow as indicated by an arrow 4440. The membrane 4415 referred herein can be laminate of a non-woven fabric and a membrane, such as an ion exchange membrane or an proton exchange membrane. Similar to the power cells configured to form a three-dimensional geometric structure, the membrane encompasses a volume 4425. In micro-power cell applications, the volume 4425 may be less than one cubic millimeter. In other applications, the volume 4425 may be less than one cubic centimeter, one cubic meter, or even less than one cubic micrometer. An electrical circuit that includes a switch 4455 and a load 4457 may be connected to the cathode 4410 and anode 4405. In conjunction with another reaction component 4445 in or on the opposite side of the separator 4415, the power cell 4400 can induce an electrochemical reaction. For example, the power cell 4400 can be used for performing use of electrolysis of water to produce a hydrogen:

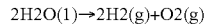

$2H2O(l) \rightarrow 2H2(g) + O2(g)$

Electrolysis of water can be conducted by passing current generated by the power cell 4400 through drop(s) of water 4440 (in practice a saltwater solution increases the reaction intensity making it easier to observe). Hydrogen gas is seen at the cathode 4410 using platinum electrodes, and oxygen bubbles at the anode 4405, also using platinum electrodes. If other metals are used as the anode, there is a chance that the oxygen will react with the anode instead of being released as a gas. For example using iron electrodes in a sodium chloride solution electrolyte, iron oxide is produced at the anode, which reacts to form iron hydroxide. Other industrial uses include electrometallurgy, the process of reduction of metals from metallic compounds to obtain the pure form of metal using electrolysis. For example, sodium hydroxide in its metallic form is separated by electrolysis into sodium and hydrogen, both of which have important chemical uses. Also this example method can be applied to manufacture aluminium, lithium, sodium, potassium, or aspirin. Another practical use of electrolysis by a power cell is anodization. It makes the surface of metals resistant to corrosion. For example, ships in water are saved from being corroded by oxygen in water by this process, which is done with the help of electrolysis. This process is also used to make surfaces more decorative.

Furthermore, the hydrogen gas that is generated by the electrolysis of water can be used to fuel other additional reaction. For example, the hydrogen gas 4460 can be flown through an exit 4470 and collected as a fuel.

While the use of electrolysis described above is provided in a context of a power cell, such method can also be applied to an array of power cells, a power disk, or power disk, or power stack.

Another embodiment of the method further includes applying a potential difference for conducting an electro-chemical reaction. Continuing to refer to FIG. 44, by turning on a switch 4480, the power cell 4400 can be electrically connected to a battery 4482. However, the battery 4480 is for illustrative purposes. Therefore, other form of power can be applied to the power cell 4400 such as DC, AC, fixed frequency, arbitrary waveform or any combination thereof.

Applying a potential difference to an anode and a cathode can induce a electro-chemical reaction. For example, a power cell that includes a membrane made of material such as Nafion®, can vibrate when a current, such as a sinusoidal, pulse, chirp, or other waveform, is applied therethrough. As such, applying a potential difference through the power cell 4400 can induce or enhance an electro-chemical reaction such as for generating heat (i.e., at the membrane 4415), and converting a physical state (i.e., liquid, pseudo-solid, gas, pseudo-liquid, or solid) to anther physical state, and changing a profile of the potential difference during difference stages of a reaction or within a single stage of a reaction. When the potential difference is applied to an array of power cells, it is also possible to apply the potential difference to a subset of the array in thermal proximity to the subject that is generating heat.

It is also possible to employ a sensor to monitor the electro-chemical reaction. For example, the system 4401 can include a sensor 4406 for measuring the level of hydrogen gas inside of a housing 4403 during the electrolysis of water. In turn, the system can be equipped with a feed back system by monitoring feedback of a metric associated with the reaction (e.g., concentration or temperature) or power cells (e.g., temperature or pressure) to a typical reaction. Monitoring of the electro-chemical reaction using the feedback system can be useful to adjust, regulate and/or control an electro-chemical reaction as a function at least one metric. Metrics can include temperature, pressure, humidity, time, concentration of at least one of the reaction components, for example. Further, one can regulate when and how to apply the potential difference. For example, an electro-chemical reaction can decelerate or accelerate by decreasing or increasing the potential difference, respectively, in typical reaction.

Furthermore, a product of an electro-chemical reaction can be outputted using such manner as extracting, expelling, draining, releasing or venting another electro-chemical reaction can follow during or after the first electro-chemical reaction. Introducing at least one other reaction component during or after the first electro-chemical reaction can trigger a new electro-chemical reaction or be used in a next stage of the ongoing electro-chemical reaction. And the product of the new electro-chemical reaction can be also outputted in a similar manner as the earlier electro-chemical reaction.

While this invention has been particularly shown and described with references to example embodiments thereof, it will be understood by those skilled in the art that various changes in form and details may be made therein without departing from the scope of the invention encompassed by the appended claims.

What is claimed is:

1. A method of operating power cells, comprising:
    constantly operating power cells under control of a kernel layer of processing that monitors and controls power generated by the power cells, the kernel layer being within a controller; and
    employing the kernel layer by way of requests to the kernel layer by a higher layer of processing within the controller to cause the power cells to produce power in a selectable manner.

2. The method according to claim 1, wherein the kernel layer of processing monitors and controls quality and quantity of power generated by the power cells.

3. The method according to claim 1, wherein employing the kernel layer by way of requests to the kernel layer by the higher layer of processing includes employing the kernel layer to cause the power cells to produce power according to higher functions unknown to the kernel layer, the higher functions selected from a group consisting of: cold start, sinewave output power, arbitrary waveform power output, voltage regulation, current regulation, efficiency control, and power amplifier mode.

4. The method according to claim 1, wherein constantly operating the power cells under control of the kernel layer of processing includes mapping voltage levels to corresponding switch closures or converting power requests into a number of rows in columns and/or parallel columns to produce the power by selecting which switches to close to configure series and parallel combinations of power cells.

5. The method according to claim 1, wherein constantly operating the power cells under control of the kernel layer of processing includes receiving feedback from at least one sensor or intelligent device and presenting the feedback to the higher layer of processing.

6. The method according to claim 1, wherein constantly operating the power cells under control of the kernel layer of processing includes presenting control signals to switches or other control elements to execute requests from the higher layer of processing.

7. The method according to claim 1, wherein employing the kernel layer by way of requests to the kernel by a higher layer of processing includes employing the kernel layer to start generation of power by multiple power cells by:
    defining a subset of the power cells to be starter cells;
    applying a load to the starter cells to draw current from the starter cells to generate heat at the starter cells to warm power cells surrounding the starter cells; and
    after warming the power cells surrounding the starter cells, enabling the power cells surrounding the starter cells to produce power.

8. The method according to claim 7, wherein enabling the power cells surrounding the starter cells includes configuring the power cells surrounding the starter cells in series or parallel combination with the starter cells.

9. The method according to claim 7, further including monitoring temperature at the starter cells or power cells surrounding the starter cells and enabling the power cells surrounding and expanding out from the starter cells to produce power as a function of the temperature.

10. The method according to claim 7, wherein enabling the power cells surrounding the starter cells includes directing the power produced by the surrounding power cells to the load drawing current from the starter cells.

11. The method according to claim 7, wherein enabling the power cells surrounding the starter cells includes directing the power produced by the surrounding power cells to a different load from the load drawing current from the starter cells.

* * * * *